(12) United States Patent
Iwai et al.

(10) Patent No.: US 9,829,085 B2
(45) Date of Patent: Nov. 28, 2017

(54) BICYCLE SPROCKET

(71) Applicant: Shimano Inc., Sakai, Osaka (JP)

(72) Inventors: Toru Iwai, Osaka (JP); Makoto Souwa, Osaka (JP); Tetsu Nonoshita, Osaka (JP); Toyoshi Yoshida, Osaka (JP)

(73) Assignee: Shimano Inc., Osaka (JP)

( * ) Notice: Subject to any disclaimer, the term of this patent is extended or adjusted under 35 U.S.C. 154(b) by 520 days.

(21) Appl. No.: 14/140,848

(22) Filed: Dec. 26, 2013

(65) Prior Publication Data
US 2014/0335987 A1    Nov. 13, 2014

Related U.S. Application Data

(63) Continuation-in-part of application No. 13/888,539, filed on May 7, 2013.

(51) Int. Cl.
*F16H 55/30* (2006.01)
*B62M 9/10* (2006.01)

(52) U.S. Cl.
CPC ............. *F16H 55/303* (2013.01); *B62M 9/10* (2013.01)

(58) Field of Classification Search
CPC ............................... F16H 55/12; F16H 55/303
USPC ............................................ 474/78, 158–164
See application file for complete search history.

(56) References Cited

U.S. PATENT DOCUMENTS

| 3,719,103 | A | * | 3/1973 | Streander | ............... F16H 55/18 74/440 |
| 3,999,445 | A | * | 12/1976 | Liautaud | ........... B29C 45/14311 29/893.3 |
| 4,630,498 | A | * | 12/1986 | Santi | ..................... B21D 53/28 29/893.33 |
| 4,633,556 | A | * | 1/1987 | Santi | ..................... B21D 53/28 29/416 |
| 5,852,951 | A | * | 12/1998 | Santi | ..................... F16H 55/06 264/273 |
| 5,865,699 | A | * | 2/1999 | Leini | ..................... B27B 17/08 29/527.2 |

(Continued)

FOREIGN PATENT DOCUMENTS

CN 201313616 Y 9/2009
CN 201914398 U 8/2011
(Continued)

*Primary Examiner* — William E Dondero
*Assistant Examiner* — Mark K Buse
(74) *Attorney, Agent, or Firm* — Global IP Counselors, LLP

(57) ABSTRACT

A bicycle sprocket includes a sprocket body, and a plurality of sprocket teeth. At least one of the sprocket teeth includes a first layered member, a second layered member and a third layered member. The first layered member has a first axial surface and a second axial surface. The second layered member is attached to the first axial surface such that the first and second layered members overlap each other in an axial direction as viewed parallel to a rotational axis of the sprocket body. The third layered member is attached to the second axial surface such that the first and third layered members overlap each other in the axial direction as viewed parallel to the rotational axis of the sprocket body. The first layered member has a specific gravity that is less than those of the second layered member and the third layered member.

73 Claims, 19 Drawing Sheets

(56) References Cited

U.S. PATENT DOCUMENTS

| | | | | |
|---|---|---|---|---|
| 6,883,397 | B2* | 4/2005 | Kimizuka | B29C 33/44 74/460 |
| 7,481,729 | B2* | 1/2009 | Andel | F16H 55/06 474/162 |
| 7,931,553 | B2* | 4/2011 | Tokuyama | B62M 9/10 474/144 |
| 7,959,529 | B2* | 6/2011 | Braedt | B62M 9/10 474/152 |
| 7,967,709 | B2* | 6/2011 | Emura | B62M 9/105 474/160 |
| 2004/0053722 | A1* | 3/2004 | Oertley | F16H 55/12 474/162 |
| 2004/0092352 | A1* | 5/2004 | Chiang | B62M 9/10 474/160 |
| 2006/0163515 | A1* | 7/2006 | Ruschke | A61M 39/26 251/149.7 |
| 2007/0089555 | A1* | 4/2007 | Tomoda | B29C 45/16 74/443 |
| 2008/0273016 | A1* | 11/2008 | Helgesen | A47L 15/4293 345/173 |
| 2010/0081530 | A1 | 4/2010 | Crump et al. | |
| 2013/0143704 | A1* | 6/2013 | Blank | B62M 9/10 474/161 |
| 2013/0180807 | A1* | 7/2013 | Iwai | F16D 65/12 188/26 |
| 2014/0331530 | A1* | 11/2014 | Masanek, Jr. | B60R 13/105 40/209 |
| 2015/0020627 | A1* | 1/2015 | Palfai | F02B 75/28 74/421 R |
| 2015/0020629 | A1* | 1/2015 | Koszewnik | F16H 55/08 74/445 |
| 2015/0093595 | A1* | 4/2015 | Asakawa | C10M 107/38 428/640 |
| 2015/0217834 | A1* | 8/2015 | Iwai | B62M 9/105 474/152 |

FOREIGN PATENT DOCUMENTS

| | | |
|---|---|---|
| DE | 202010009082 U1 | 11/2011 |
| DE | 202010009083 U1 | 11/2011 |
| EP | 1375334 A1 | 1/2004 |
| JP | 62-23187 U | 2/1987 |
| TW | M356692 U | 5/2009 |

* cited by examiner

BICYCLE SPROCKET

CROSS-REFERENCE TO RELATED APPLICATIONS

This application is a continuation-in-part application of U.S. patent application Ser. No. 13/888,539, filed on May 7, 2013. The entire disclosure of U.S. patent application Ser. No. 13/888,539 is hereby incorporated herein by reference.

BACKGROUND

Field of the Invention

This invention generally relates to a bicycle sprocket. More specifically, the present invention relates to a bicycle sprocket with a multi-layered structure.

Background Information

In recent years, bicycle component manufacturers have been manufacturing bicycle transmissions that have more available speeds to the rider. As the available speeds in the bicycle transmission increases, the number of sprockets installed on the rear wheel also usually increases. While sprockets can be made thinner, a minimum spacing between adjacent sprockets is required to accommodate the chain. Moreover, a rear end of a conventional bicycle frame only has a limited amount of space for mounting the wheel and a rear sprocket assembly. Thus, there is a desire to increase the number gears without changing the dimensions of the conventional bicycle frame. Accordingly, various attempts have been made in order to increase the maximum number of sprocket that can be installed on a rear hub assembly. For example, some multiple sprocket assemblies use a spider (sprocket support), which supports a plurality of ring-shaped sprocket wheels. By using a spider, a light metal such as aluminum, etc., is generally used for the spider, while various types of steel materials are used for the sprockets to provide adequate strength.

SUMMARY

Generally, the present disclosure is directed to various features of a bicycle sprocket with a multi-layered structure. Thus, one object of the present disclosure is to provide a bicycle sprocket with a multi-layered structure.

In accordance with a first aspect of the present invention, a bicycle sprocket is provided that basically includes a sprocket body, and a plurality of sprocket teeth. The sprocket body has a rotational axis. The sprocket teeth extend radially outwardly from an outer periphery of the sprocket body. At least one of the sprocket teeth includes a first layered member, a second layered member and a third layered member. The first layered member has a first axial surface and a second axial surface opposite to the first axial surface. The second layered member is attached to the first axial surface of the first layered member such that the first and second layered members overlap each other in an axial direction as viewed parallel to the rotational axis. The third layered member is attached to the second axial surface of the first layered member such that the first and third layered members overlap each other in the axial direction as viewed parallel to the rotational axis. The first layered member has a specific gravity that is less than those of the second layered member and the third layered member. According to the first aspect of the present invention, it is possible to effectively save weight of the bicycle sprocket while maintaining necessary rigidity.

In accordance with a second aspect of the present invention, the bicycle sprocket according to the first aspect is configured so that each of the first, second and third layered members has an axial thickness more than or equal to 0.1 mm. According to the second aspect of the present invention, it is possible to effectively obtain necessary rigidity of each of the first, second and the third layered members.

In accordance with a third aspect of the present invention, the bicycle sprocket according to the first aspect is configured so that the first and second layered members do not overlap each other in a radial direction as viewed perpendicularly to the rotational axis, and the first and third layered members do not overlap each other in the radial direction as viewed perpendicularly to the rotational axis. According to the third aspect of the present invention, it is possible to effectively manufacture the bicycle sprocket by simply attach each of the second and third layered members to the first layered members in the axial direction.

In accordance with a fourth aspect of the present invention, the bicycle sprocket according to the first aspect is configured so that the sprocket body includes the first layered member, the second layered member and the third layered member. According to the fourth aspect of the present invention, it is possible to further effectively save weight of the bicycle sprocket because the layered structure extends from the sprocket teeth to the sprocket body.

In accordance with a fifth aspect of the present invention, the bicycle sprocket according to the first aspect is configured so that the first layered member is made of a material selected from the group consisting of aluminum, titanium, magnesium and beryllium. According to the fifth aspect of the present invention, it is possible to effectively save weight of the bicycle sprocket because of such light weight metallic materials.

In accordance with a sixth aspect of the present invention, the bicycle sprocket according to the first aspect is configured so that the first layered member is made of non-metallic material. According to the sixth aspect of the present invention, it is possible to select lightweight materials to realize further save weight of the bicycle sprocket.

In accordance with a seventh aspect of the present invention, the bicycle sprocket according to the sixth aspect is configured so that the non-metallic material of the first layered member includes resin. According to the seventh aspect of the present invention, it is possible to select lightweight materials to realize further save weight of the bicycle sprocket because of resin.

In accordance with an eighth aspect of the present invention, the bicycle sprocket according to the seventh aspect is configured so that the non-metallic material of the first layered member is fiber-reinforced material. According to the eighth aspect of the present invention, because of the fiber-reinforced material, it is possible to select lightweight materials to realize further save weight of the bicycle sprocket while maintaining necessary rigidity.

In accordance with a ninth aspect of the present invention, the bicycle sprocket according to the first aspect is configured so that the second and third layered members are made of iron. According to the ninth aspect of the present invention, it is possible to effectively obtain necessary rigidity of the bicycle sprocket because of high rigidity of iron.

In accordance with a tenth aspect of the present invention, the bicycle sprocket according to the ninth aspect is configured so that the second and third layered members are made of stainless steel. According to the tenth aspect of the present invention, it is possible to effectively prevent rust of the bicycle sprocket because of characteristic of stainless steel while obtaining necessary rigidity of the bicycle sprocket because of high rigidity of steel.

In accordance with an eleventh aspect of the present invention, the bicycle sprocket according to the fifth aspect is configured so that the second and third layered members are made of iron. According to the eleventh aspect of the present invention, it is possible to effectively save weight of the bicycle sprocket because of such light weight metallic materials of the fifth aspect while maintaining necessary rigidity because of high rigidity of iron.

In accordance with a twelfth aspect of the present invention, the bicycle sprocket according to the eleventh aspect is configured so that the second and third layered members are made of stainless steel. According to the twelfth aspect of the present invention, it is possible to effectively prevent rust of the bicycle sprocket because of characteristic of stainless steel while obtaining necessary rigidity of the bicycle sprocket because of high rigidity of iron besides effectively saving weight of the bicycle sprocket because of such light weight metallic materials of the fifth aspect.

In accordance with a thirteenth aspect of the present invention, the bicycle sprocket according to the sixth aspect is configured so that the second and third layered members are made of iron. According to the thirteenth aspect of the present invention, it is possible to effectively obtain necessary rigidity of the bicycle sprocket because of high rigidity of iron besides the advantage of the sixth aspect of the present invention.

In accordance with a fourteenth aspect of the present invention, the bicycle sprocket according to the thirteenth aspect is configured so that the second and third layered members are made of stainless steel. According to the fourteenth aspect of the present invention, it is possible to effectively prevent rust of the bicycle sprocket because of characteristic of stainless steel besides of the advantage of the thirteenth aspect of the present invention.

In accordance with a fifteenth aspect of the present invention, the bicycle sprocket according to the first aspect is configured so that the first layered member and the second layered member are attached to each other by diffusion bonding, and the first layered member and the third layered member are attached to each other by diffusion bonding. According to the fifteenth aspect of the present invention, it is possible to firmly attach each of the second and third layered members to the first layered member.

In accordance with a sixteenth aspect of the present invention, the bicycle sprocket according to the first aspect is configured so that the first layered member and the second layered member are attached to each other with an adhesive, and the first layered member and the third layered member are attached to each other with an adhesive. According to the sixteenth aspect of the present invention, it is possible to inexpensively attach each of the second and third layered members to the first layered member.

In accordance with a seventeenth aspect of the present invention, the bicycle sprocket according to the seventh aspect is configured so that the first layered member and the second layered member are attached to each other by an integral molding process, and the first layered member and the third layered member are attached to each other by an integral molding process. According to the seventeenth aspect of the present invention, it is possible to effectively and quickly manufacture the bicycle sprockets.

In accordance with an eighteenth aspect of the present invention, the bicycle sprocket according to the first aspect is configured so that the plurality of sprocket teeth includes the first layered member, the second layered member and the third layered member. According to the eighteenth aspect of the present invention, it is possible to further save weight of the bicycle sprocket while maintaining necessary rigidity.

In accordance with a nineteenth aspect of the present invention, the bicycle sprocket according to the first aspect is configured so that the second layered member has a specific gravity that is equal to that of the third layered member. According to the nineteenth aspect of the present invention, it is possible to effectively improve weight distribution of the bicycle sprocket.

In accordance with a twentieth aspect of the present invention, the bicycle sprocket according to the first aspect is configured so that the at least one of the sprocket teeth further includes a coating layer formed on a radially end surface of the first layered member. According to the twentieth aspect of the present invention, it is possible to improve wear resistance of the first layered member.

In accordance with a twenty-first aspect of the present invention, the bicycle sprocket according to the twentieth aspect is configured so that the coating layer is an intermetallic compound layer. According to the twenty-first aspect of the present invention, it is possible to effectively improve wear resistance of the first layered member.

In accordance with a twenty-second aspect of the present invention, the bicycle sprocket according to the twenty-first aspect is configured so that the intermetallic compound layer is made of aluminum, and one of nickel and iron. According to the twenty-second aspect of the present invention, it is possible to effectively improve wear resistance of the first layered member.

In accordance with a twenty-third aspect of the present invention, the bicycle sprocket according to the twentieth aspect is configured so that the coating layer is a plated layer. According to the twenty-third aspect of the present invention, it is possible to effectively improve wear resistance of the first layered member.

In accordance with a twenty-fourth aspect of the present invention, the bicycle sprocket according to the twenty-third aspect is configured so that the coating layer is a nickel-plated layer. According to the twenty-fourth aspect of the present invention, it is possible to effectively improve wear resistance of the first layered member.

In accordance with a twenty-fifth aspect of the present invention, the bicycle sprocket according to the tenth aspect is configured so that the second and third layered members have Vickers hardness larger than or equal to 400 (HV), respectively. According to the twenty-fifth aspect of the present invention, it is possible to effectively obtain necessary rigidity of the second and third layered members.

In accordance with a twenty-sixth aspect of the present invention, the bicycle sprocket according to the fifth aspect is configured so that the first layered member is made of quenched aluminum. According to the twenty-sixth aspect of the present invention, it is possible to effectively improve rigidity of the first layered member.

In accordance with a twenty-seventh aspect of the present invention, the bicycle sprocket according to the first aspect is configured so that the first layered member extends radially inwardly from an inner periphery of the sprocket body, and the first layered member has an axially projecting portion and an axially recessed portion. The axially projecting portion and the axially recessed portion are positioned radially inwardly from the inner periphery of the sprocket body. According to the twenty-seventh aspect of the present invention, it is possible to provide bicycle sprockets which are easily attached to each other to form a multiple bicycle sprocket assembly.

In accordance with a twenty-eighth aspect of the present invention, the bicycle sprocket according to the twenty-seventh aspect is configured so that the first layered member has a bicycle hub engaging profile at a location of a radially inner end of the first layered member. According to the twenty-eighth aspect of the present invention, it is possible to provide a multiple rear sprocket assembly which is lightweight and has sufficient rigidity.

In accordance with a twenty-ninth aspect of the present invention, the bicycle sprocket according to the first aspect is configured so that the sprocket body has an axially projecting portion and an axially recessed portion. The axially projecting portion and the axially recessed portion are positioned at the sprocket body. According to the twenty-ninth aspect of the present invention, it is possible to provide bicycle sprockets which are easily attached to each other to form a multiple bicycle sprocket assembly.

In accordance with a thirtieth aspect of the present invention, a multiple sprocket assembly is provided that basically includes a plurality of the bicycle sprockets according to the twenty-seventh aspect. The axially projecting portion of one of the bicycle sprockets mates with the axially recessed portion of an adjacent one of the bicycle sprockets adjacent to the one of the bicycle sprockets while the bicycle sprockets are attached to each other. According to the thirtieth aspect of the present invention, it is possible to provide a multiple bicycle sprocket assembly which is lightweight and has sufficient rigidity.

In accordance with a thirty-first aspect of the present invention, a multiple sprocket assembly is provided that basically includes a plurality of the bicycle sprockets according to the first aspect, and a sprocket support member to which the bicycle sprockets are mounted. According to the thirty-first aspect of the present invention, it is possible to provide a multiple bicycle sprocket assembly which is lightweight and has sufficient rigidity.

In accordance with a thirty-second aspect of the present invention, the multiple sprocket assembly according to the thirty-first aspect is configured so that the sprocket support member has a unitary one-piece structure. According to the thirty-second aspect of the present invention, it is possible to provide a multiple bicycle sprocket assembly which is lightweight and has sufficient rigidity.

In accordance with a thirty-third aspect of the present invention, a multiple sprocket assembly is provided that basically includes a plurality of the bicycle sprockets according to the twenty-ninth aspect. The axially projecting portion of one of the bicycle sprockets mates with the axially recessed portion of an adjacent one of the bicycle sprockets adjacent to the one of the bicycle sprockets while the bicycle sprockets are attached to each other. According to the thirty-third aspect of the present invention, it is possible to provide a multiple bicycle sprocket assembly which is lightweight and has sufficient rigidity.

In accordance with a thirty-fourth aspect of the present invention, the bicycle sprocket the bicycle sprocket according to the first aspect is configured so that at least one of the second and third layered members includes a textured portion that contacts a corresponding one of the first and second axial surfaces of the first layered member. According to the thirty-fourth aspect of the present invention, it is possible to provide a bicycle sprocket in which the first layered member very securely bonds to at least one of the second and third layered members without additional adhesive.

In accordance with a thirty-fifth aspect of the present invention, the bicycle sprocket according to the first aspect is configured so that each of the second and third layered members includes a textured portion that contacts the first and second axial surfaces of the first layered member, respectively. According to the thirty-fifth aspect of the present invention, it is possible to provide a bicycle sprocket in which the first layered member very securely bonds to both the second and third layered members without additional adhesive.

In accordance with a thirty-sixth aspect of the present invention, the bicycle sprocket according to the first aspect is configured so that the at least one of the sprocket teeth includes a tip portion having the first and second axial surfaces exposed in the axial direction, and a base portion having the first and second axial surfaces covered by the second and third layered members in the axial direction. According to the thirty-sixth aspect of the present invention, it is possible to provide a bicycle sprocket in which the noise from a bicycle chain engaging the teeth of the sprocket can be reduced.

In accordance with a thirty-seventh aspect of the present invention, the bicycle sprocket according to the thirty-sixth aspect is configured so that at least one of the second and third layered members includes a textured portion that contacts a corresponding one of the first and second axial surfaces of the first layered member. According to the thirty-seventh aspect of the present invention, it is possible to provide a bicycle sprocket in which the first layered member very securely bonds to at least one of the second and third layered members with additional adhesive or with an integral molding process.

In accordance with a thirty-eighth aspect of the present invention, the bicycle sprocket according to the thirty-sixth aspect is configured so that the second and third layered members form an edge portion of a tooth flank of the at least one of the sprocket teeth. According to the thirty-eighth aspect of the present invention, it is possible to provide a bicycle sprocket in which the first layered member can be made of a lightweight material as compared to the second and third layered members without sacrificing strength since the second and third layered members engage the bicycle chain during driving of the bicycle chain.

In accordance with a thirty-ninth aspect of the present invention, the bicycle sprocket according to the thirty-fourth aspect is configured so that the at least one of the second and third layered members is attached to the first layered member by an integral molding process. According to the thirty-ninth aspect of the present invention, it is possible to effectively and quickly manufacture the bicycle sprocket, and it is possible to provide a bicycle sprocket in which the first layered member very securely bonds to at least one of the second and third layered members without additional adhesive.

In accordance with a fortieth aspect of the present invention, a bicycle sprocket is provided that basically includes a sprocket body, and a plurality of sprocket teeth. The sprocket body has a rotational axis. The sprocket teeth extend radially outwardly from an outer periphery of the sprocket body. At least one of the sprocket teeth including a first layered member, a second layered member and a coating layer formed on a radially end surface of the first layered member. The first and second layered members are attached to each other such that the first and second layered members overlap each other in an axial direction as viewed parallel to the rotational axis and such that the first and second layered members do not overlap each other in a radial direction as viewed perpendicularly to the rotational axis. The first layered member has a specific gravity that is less than that of the second layered member. According to the fortieth aspect of the present invention, it is possible to effectively save weight of the bicycle sprocket while maintaining necessary rigidity, and further to improve wear resistance of the first layered member.

In accordance with a forty-first aspect of the present invention, the bicycle sprocket according to the fortieth aspect is configured so that each of the first and second layered members has an axial thickness more than or equal to 0.1 mm. According to the forty-first aspect of the present invention, it is possible to effectively obtain necessary rigidity of each of the first and second layered members.

In accordance with a forty-second aspect of the present invention, the bicycle sprocket according to the fortieth aspect is configured so that the sprocket body includes the first layered member and the second layered member. According to the forty-second aspect of the present invention, it is possible to further effectively save weight of the bicycle sprocket because the layered structure extends from the sprocket teeth to the sprocket body.

In accordance with a forty-third aspect of the present invention, the bicycle sprocket according to the fortieth aspect is configured so that the coating layer is an intermetallic compound layer. According to the forty-third aspect of the present invention, it is possible to effectively improve wear resistance of the first layered member.

In accordance with a forty-fourth aspect of the present invention, the bicycle sprocket according to the thirty forty-third aspect is configured so that the intermetallic compound layer is made of aluminum, and one of nickel and iron. According to the forty-fourth aspect of the present invention, it is possible to effectively improve wear resistance of the first layered member.

In accordance with a forty-fifth aspect of the present invention, the bicycle sprocket according to the fortieth aspect is configured so that the coating layer is a plated layer. According to the forty-fourth aspect of the present invention, it is possible to effectively improve wear resistance of the first layered member.

In accordance with a forty-sixth aspect of the present invention, the bicycle sprocket according to the forty-fifth aspect is configured so that the coating layer is a nickel-plated layer. According to the forty-sixth aspect of the present invention, it is possible to effectively improve wear resistance of the first layered member.

In accordance with a forty-seventh aspect of the present invention, the bicycle sprocket according to the fortieth aspect is configured so that the first layered member is made of a material selected from the group consisting of aluminum, titanium, magnesium and beryllium. According to the forty-seventh aspect of the present invention, it is possible to effectively save weight of the bicycle sprocket because of such light weight metallic materials.

In accordance with a forty-eighth aspect of the present invention, the bicycle sprocket according to the fortieth aspect is configured so that the second layered member is made of iron. According to the forty-eighth aspect of the present invention, it is possible to effectively obtain necessary rigidity of the bicycle sprocket because of high rigidity of iron.

In accordance with a forty-ninth aspect of the present invention, the bicycle sprocket according to the forty-eighth aspect is configured so that the second layered member is made of stainless steel. According to the forty-ninth aspect of the present invention, it is possible to effectively prevent rust of the bicycle sprocket because of characteristic of stainless steel while obtaining necessary rigidity of the bicycle sprocket because of high rigidity of steel.

In accordance with a fiftieth aspect of the present invention, the bicycle sprocket according to the forty-ninth aspect is configured so that the first layered member is made of a material selected from the group consisting of aluminum, titanium, magnesium and beryllium. According to the fiftieth aspect of the present invention, it is possible to effectively save weight of the bicycle sprocket because of such light weight metallic materials.

In accordance with a fifty-first aspect of the present invention, the bicycle sprocket according to the fortieth aspect is configured so that the first layered member is made of non-metallic material. According to the fifty-first aspect of the present invention, it is possible to select lightweight materials to realize further save weight of the bicycle sprocket.

In accordance with a fifty-second aspect of the present invention, the bicycle sprocket according to the fifty-first aspect is configured so that the non-metallic material of the first layered member includes resin. According to the fifty-second aspect of the present invention, it is possible to select lightweight materials to realize further save weight of the bicycle sprocket because of resin.

In accordance with a fifty-third aspect of the present invention, the bicycle sprocket according to the fifty-second aspect is configured so that the non-metallic material of the first layered member is fiber-reinforced material. According to the fifty-third aspect of the present invention, because of the fiber-reinforced material, it is possible to select lightweight materials to realize further save weight of the bicycle sprocket while maintaining necessary rigidity.

In accordance with a fifty-fourth aspect of the present invention, the bicycle sprocket according to the fifty-first aspect is configured so that the second layered member is made of iron. According to the fifty-fourth aspect of the present invention, it is possible to effectively obtain necessary rigidity of the bicycle sprocket because of high rigidity of iron.

In accordance with a fifty-fifth aspect of the present invention, the bicycle sprocket according to the fifty-fourth aspect is configured so that the second layered member is made of stainless steel. According to the fifty-fifth aspect of the present invention, it is possible to effectively prevent rust of the bicycle sprocket because of characteristic of stainless steel while obtaining necessary rigidity of the bicycle sprocket because of high rigidity of steel.

In accordance with a fifty-sixth aspect of the present invention, the bicycle sprocket according to the fortieth aspect is configured so that the first layered member and the second layered member are attached to each other by diffusion bonding. According to the fifty-sixth aspect of the present invention, it is possible to firmly attach the second layered member to the first layered member.

In accordance with a fifty-seventh aspect of the present invention, the bicycle sprocket according to the fortieth aspect is configured so that the first layered member and the second layered member are attached to each other with an adhesive. According to the fifty-seventh aspect of the present invention, it is possible to inexpensively attach the second layered member to the first layered member.

In accordance with a fifty-eighth aspect of the present invention, the bicycle sprocket according to the fifty-second aspect is configured so that the first layered member and the second layered member are attached to each other by an integral molding process. According to the fifty-eighth aspect of the present invention, it is possible to effectively and quickly manufacture the bicycle sprockets.

In accordance with a fifty-ninth aspect of the present invention, the bicycle sprocket according to the fortieth aspect is configured so that the first layered member has a first axial surface and a second axial surface opposite to the first axial surface, the second layered member is attached to the first axial surface of the first layered member, and the at least one of the sprocket teeth further includes a third layered member. The third layered member is attached to the second axial surface of the first layered member such that the first and third layered members overlap each other in the axial direction as viewed parallel to the rotational axis and such that the first and third layered members do not overlap each other in the radial direction as viewed perpendicularly to the rotational axis. According to the fifty-ninth aspect of the present invention, it is possible to further improve the rigidity of the bicycle sprocket of the thirty-fourth aspect because of the additional third layered member.

In accordance with a sixtieth aspect of the present invention, the bicycle sprocket according to the fifty-ninth aspect is configured so that the sprocket body includes the first layered member, the second layered member and the third layered member. According to the sixtieth aspect of the present invention, it is possible to further effectively save weight of the bicycle sprocket because the layered structure extends from the sprocket teeth to the sprocket body.

In accordance with a sixty-first aspect of the present invention, the bicycle sprocket according to the forty-ninth aspect is configured so that the second layered member has Vickers hardness larger than or equal to 400 (HV). According to the sixty-first aspect of the present invention, it is possible to effectively obtain necessary rigidity of the second layered member.

In accordance with a sixty-second aspect of the present invention, the bicycle sprocket according to the forty-seventh aspect is configured so that the first layered member is made of quenched aluminum. According to the sixty-second aspect of the present invention, it is possible to effectively improve rigidity of the first layered member.

In accordance with a sixty-third aspect of the present invention, the bicycle sprocket according to the fortieth aspect is configured so that the plurality of sprocket teeth includes the first layered member and the second layered member. According to the sixty-third aspect of the present invention, it is possible to further save weight of the bicycle sprocket while maintaining necessary rigidity.

In accordance with a sixty-fourth aspect of the present invention, the bicycle sprocket according to the fortieth aspect is configured so that the first layered member extends radially inwardly from an inner periphery of the sprocket body, and the first layered member has an axially projecting portion and an axially recessed portion. The axially projecting portion and the axially recessed portion are positioned radially inwardly from the inner periphery of the sprocket body. According to the sixty-fourth aspect of the present invention, it is possible to provide bicycle sprockets which are easily attached to each other to form a multiple bicycle sprocket assembly.

In accordance with sixty-fifth aspect of the present invention, the bicycle sprocket according to the sixty-fourth aspect is configured so that the first layered member has a bicycle hub engaging profile at a location of a radially inner end of the first layered member. According to the sixty-fifth aspect of the present invention, it is possible to provide a multiple rear sprocket assembly which is lightweight and has sufficient rigidity.

In accordance with a sixty-sixth aspect of the present invention, the bicycle sprocket according to the sixty-fourth aspect is configured so that the sprocket body includes the first layered member and the second layered member. According to the sixty-sixth aspect of the present invention, it is possible to further effectively save weight of the bicycle sprocket because the layered structure extends from the sprocket teeth to the sprocket body.

In accordance with a sixty-seventh aspect of the present invention, the bicycle sprocket according to the fortieth aspect is configured so that the sprocket body has an axially projecting portion and an axially recessed portion. The axially projecting portion and the axially recessed portion are positioned at the sprocket body. According to the sixty-seventh aspect of the present invention, it is possible to provide bicycle sprockets which are easily attached to each other to form a multiple bicycle sprocket assembly.

In accordance with a sixty-eighth aspect of the present invention, a multiple sprocket assembly is provided that basically includes a plurality of the bicycle sprockets according to the sixty-fourth aspect. The axially projecting portion of one of the bicycle sprockets mates with the axially recessed portion of an adjacent one of the bicycle sprockets adjacent to the one of the bicycle sprockets while the bicycle sprockets are attached to each other. According to the sixty-eighth aspect of the present invention, it is possible to provide a multiple bicycle sprocket assembly which is lightweight and has sufficient rigidity.

In accordance with a sixty-ninth aspect of the present invention, a multiple sprocket assembly is provided that basically includes a plurality of the bicycle sprockets according to the fortieth aspect, and a sprocket support member to which the bicycle sprockets are mounted. According to the sixty-ninth aspect of the present invention, it is possible to provide a multiple bicycle sprocket assembly which is lightweight and has sufficient rigidity.

In accordance with a seventieth aspect of the present invention, the multiple sprocket assembly according to the sixty-ninth aspect is configured so that the sprocket support member has a unitary one-piece structure. According to the seventieth aspect of the present invention, it is possible to provide a multiple bicycle sprocket assembly which is lightweight and has sufficient rigidity.

In accordance with a seventy-first aspect of the present invention, a multiple sprocket assembly is provided that basically includes a plurality of the bicycle sprockets according to the sixty-seventh aspect. The axially projecting portion of one of the bicycle sprockets mates with the axially recessed portion of an adjacent one of the bicycle sprockets adjacent to the one of the bicycle sprockets while the bicycle sprockets are attached to each other. According to the seventy-first aspect of the present invention, it is possible to provide a multiple bicycle sprocket assembly which is lightweight and has sufficient rigidity.

In accordance with a seventy-second aspect of the present invention, the bicycle sprocket according to the fortieth aspect is configured so that the second layered member includes a textured portion that contacts an axial surface of the first layered member. According to the seventy-second aspect of the present invention, it is possible to provide a bicycle sprocket in which the first layered member very securely bonds to the second layered member with additional adhesive or with an integral molding process.

In accordance with a seventy-third aspect of the present invention, the bicycle sprocket according to the seventy-second aspect is configured so that the second layered member is attached to the first layered member by an integral molding process. According to the seventy-third aspect of the present invention, it is possible to effectively and quickly manufacture the bicycle sprocket, and it is possible to provide a bicycle sprocket in which the first layered member very securely bonds to the second layered member without additional adhesive.

In accordance with a seventy-fourth aspect of the present invention, a bicycle sprocket is provided that basically includes a sprocket body, and a plurality of sprocket teeth. The sprocket body has a rotational axis. The sprocket teeth extend radially outwardly from an outer periphery of the sprocket body. At least one of the sprocket teeth including a first layered member and a second layered member. The first layered member has a first axial surface and a second axial surface opposite to the first axial surface. The second layered member has a third axial surface and a fourth axial surface opposite to the third axial surface. The third axial surface of the second layered member is attached to the first axial surface of the first layered member such that the first and second layered members overlap each other in an axial direction as viewed parallel to the rotational axis and such that the second axial surface of the first layered member and the fourth axial surface of the second layered member are exposed. The first layered member has a specific gravity that is less than that of the second layered member. According to the seventy-fourth aspect of the present invention, it is possible to effectively save weight of the bicycle sprocket while maintaining necessary rigidity.

In accordance with a seventy-fifth aspect of the present invention, the bicycle sprocket according to the seventy-fourth aspect is configured so that each of the first and second layered members has an axial thickness more than or equal to 0.1 mm. According to the seventy-fifth aspect of the present invention, it is possible to effectively obtain necessary rigidity of each of the first and second layered members.

In accordance with a seventy-sixth aspect of the present invention, the bicycle sprocket according to the seventy-fourth aspect is configured so that the first and second layered members do not overlap each other in a radial direction as viewed perpendicularly to the rotational axis. According to the seventy-sixth aspect of the present invention, it is possible to effectively save weight of the bicycle sprocket while maintaining necessary rigidity.

In accordance with a seventy-seventh aspect of the present invention, the bicycle sprocket according to the seventy-fourth aspect is configured so that the sprocket body includes the first layered member and the second layered member. According to the seventy-seventh aspect of the present invention, it is possible to further effectively save weight of the bicycle sprocket because the layered structure extends from the sprocket teeth to the sprocket body.

In accordance with a seventy-eighth aspect of the present invention, the bicycle sprocket according to the seventy-fourth aspect is configured so that the at least one of the sprocket teeth further includes a coating layer formed on a radially end surface of the first layered member. According to the seventy-eighth aspect of the present invention, it is possible to improve wear resistance of the first layered member.

In accordance with a seventy-ninth aspect of the present invention, the bicycle sprocket according to the seventy-eighth aspect is configured so that the coating layer is an intermetallic compound layer. According to the seventy-ninth aspect of the present invention, it is possible to effectively improve wear resistance of the first layered member.

In accordance with an eightieth aspect of the present invention, the bicycle sprocket according to the seventy-ninth aspect is configured so that the intermetallic compound layer is made of aluminum, and one of nickel and iron. According to the eightieth aspect of the present invention, it is possible to effectively improve wear resistance of the first layered member.

In accordance with an eighty-first aspect of the present invention, the bicycle sprocket according to the seventy-eighth aspect is configured so that the coating layer is a plated layer. According to the eighty-first aspect of the present invention, it is possible to effectively improve wear resistance of the first layered member.

In accordance with an eighty-second aspect of the present invention, the bicycle sprocket according to the eighty-first aspect is configured so that the coating layer is a nickel-plated layer. According to the eighty-second aspect of the present invention, it is possible to effectively improve wear resistance of the first layered member.

In accordance with an eighty-third aspect of the present invention, the bicycle sprocket according to the seventy-fourth aspect is configured so that the first layered member is made of a material selected from the group consisting of aluminum, titanium, magnesium and beryllium. According to the eighty-third aspect of the present invention, it is possible to effectively save weight of the bicycle sprocket because of such light weight metallic materials.

In accordance with an eighty-fourth aspect of the present invention, the bicycle sprocket according to the seventy-fourth aspect is configured so that the second layered member is made of iron. According to the eighty-fourth aspect of the present invention, it is possible to effectively obtain necessary rigidity of the bicycle sprocket because of high rigidity of iron.

In accordance with an eighty-fifth aspect of the present invention, the bicycle sprocket according to the eighty-fourth aspect is configured so that the second layered member is made of stainless steel. According to the eighty-fifth aspect of the present invention, it is possible to effectively prevent rust of the bicycle sprocket because of characteristic of stainless steel while obtaining necessary rigidity of the bicycle sprocket because of high rigidity of steel.

In accordance with an eighty-sixth aspect of the present invention, the bicycle sprocket according to the eighty-fifth aspect is configured so that the first layered member is made of a material selected from the group consisting of aluminum, titanium, magnesium and beryllium. According to the eighty-sixth aspect of the present invention, it is possible to effectively save weight of the bicycle sprocket because of such light weight metallic materials.

In accordance with an eighty-seventh aspect of the present invention, the bicycle sprocket according to the seventy-fourth aspect is configured so that the first layered member is made of non-metallic material. According to the eighty-seventh aspect of the present invention, it is possible to select lightweight materials to realize further save weight of the bicycle sprocket.

In accordance with an eighty-eighth aspect of the present invention, the bicycle sprocket according to the eighty-seventh aspect is configured so that the non-metallic material of the first layered member includes resin. According to the eighty-eighth aspect of the present invention, it is possible to select lightweight materials to realize further save weight of the bicycle sprocket because of resin.

In accordance with an eighty-ninth aspect of the present invention, the bicycle sprocket according to the eighty-eighth aspect is configured so that the non-metallic material of the first layered member is fiber-reinforced material. According to the eighty-ninth aspect of the present invention, because of the fiber-reinforced material, it is possible to select lightweight materials to realize further save weight of the bicycle sprocket while maintaining necessary rigidity.

In accordance with a ninetieth aspect of the present invention, the bicycle sprocket according to the eighty-seventh aspect is configured so that the second layered member is made of iron. According to the ninetieth aspect of the present invention, it is possible to effectively obtain necessary rigidity of the bicycle sprocket because of high rigidity of iron.

In accordance with a ninety-first aspect of the present invention, the bicycle sprocket according to the ninetieth aspect is configured so that the second layered member is made of stainless steel. According to the ninety-first aspect of the present invention, it is possible to effectively prevent rust of the bicycle sprocket because of characteristic of stainless steel while obtaining necessary rigidity of the bicycle sprocket because of high rigidity of steel.

In accordance with a ninety-second aspect of the present invention, the bicycle sprocket according to the seventy-fourth aspect is configured so that the first layered member and the second layered member are attached to each other by diffusion bonding. According to the ninety-second aspect of the present invention, it is possible to firmly attach the second layered member to the first layered member.

In accordance with a ninety-third aspect of the present invention, the bicycle sprocket according to the seventy-fourth aspect is configured so that the first layered member and the second layered member are attached to each other with an adhesive. According to the ninety-third aspect of the present invention, it is possible to inexpensively attach the second layered member to the first layered member.

In accordance with a ninety-fourth aspect of the present invention, the bicycle sprocket according to the eighty-eighth aspect is configured so that the first layered member and the second layered member are attached to each other by an integral molding process. According to the ninety-fourth aspect of the present invention, it is possible to effectively and quickly manufacture the bicycle sprocket.

In accordance with a ninety-fifth aspect of the present invention, the bicycle sprocket according to the eighty-fifth aspect is configured so that the second layered member has Vickers hardness larger than or equal to 400 (HV). According to the ninety-fifth aspect of the present invention, it is possible to effectively obtain necessary rigidity of the second layered member.

In accordance with a ninety-sixth aspect of the present invention, the bicycle sprocket according to the eighty-third aspect is configured so that the first layered member is made of quenched aluminum. According to the ninety-sixth aspect of the present invention, it is possible to effectively improve rigidity of the first layered member.

In accordance with a ninety-seventh aspect of the present invention, the bicycle sprocket according to the seventy-fourth aspect is configured so that the plurality of sprocket teeth includes the first layered member and the second layered member. According to the ninety-seventh aspect of the present invention, it is possible to further save weight of the bicycle sprocket while maintaining necessary rigidity.

In accordance with a ninety-eighth aspect of the present invention, the bicycle sprocket according to the seventy-fourth aspect is configured so that the first layered member extends radially inwardly from an inner periphery of the sprocket body, and the first layered member has an axially projecting portion and an axially recessed portion. The axially projecting portion and the axially recessed portion are positioned radially inwardly from the inner periphery of the sprocket body. According to the ninety-eighth aspect of the present invention, it is possible to provide bicycle sprockets which are easily attached to each other to form a multiple bicycle sprocket assembly.

In accordance with a ninety-ninth aspect of the present invention, the bicycle sprocket according to the ninety-eighth aspect is configured so that the first layered member has a bicycle hub engaging profile at a location of a radially inner end of the first layered member. According to the ninety-ninth aspect of the present invention, it is possible to provide a multiple rear sprocket assembly which is lightweight and has sufficient rigidity.

In accordance with a one hundredth aspect of the present invention, the bicycle sprocket according to the ninety-eighth aspect is configured so that the sprocket body includes the first layered member and the second layered member. According to the one hundredth aspect of the present invention, it is possible to further effectively save weight of the bicycle sprocket because the layered structure extends from the sprocket teeth to the sprocket body.

In accordance with a one hundred-first aspect of the present invention, the bicycle sprocket according to the ninety-ninth aspect is configured so that the sprocket body includes the first layered member and the second layered member. According to the one hundred-first aspect of the present invention, it is possible to further effectively save weight of the bicycle sprocket because the layered structure extends from the sprocket teeth to the sprocket body.

In accordance with a one hundred-second aspect of the present invention, the bicycle sprocket according to the seventy-fourth aspect is configured so that the sprocket body has an axially projecting portion and an axially recessed portion. The axially projecting portion and the axially recessed portion are positioned at the sprocket body. According to the one hundred-second aspect of the present invention, it is possible to provide bicycle sprockets which are easily attached to each other to form a multiple bicycle sprocket assembly.

In accordance with a one hundred-third aspect of the present invention, a multiple sprocket assembly is provided that basically includes a plurality of the bicycle sprockets according to the ninety-eighth aspect. The axially projecting portion of one of the bicycle sprockets mates with the axially recessed portion of an adjacent one of the bicycle sprockets adjacent to the one of the bicycle sprockets while the bicycle sprockets are attached to each other. According to the one hundred-third aspect of the present invention, it is possible to provide a multiple bicycle sprocket assembly which is lightweight and has sufficient rigidity.

In accordance with a one hundred-fourth aspect of the present invention, a multiple sprocket assembly is provided that basically includes a plurality of the bicycle sprockets according to the seventy-fourth aspect, and a sprocket support member to which the bicycle sprockets are mounted. According to the one hundred-fourth aspect of the present invention, it is possible to provide a multiple bicycle sprocket assembly which is lightweight and has sufficient rigidity.

In accordance with a one hundred-fifth aspect of the present invention, the multiple sprocket assembly according to the one hundred-fourth aspect is configured so that the sprocket support member has a unitary one-piece structure.

According to the one hundred-fifth aspect of the present invention, it is possible to provide a multiple bicycle sprocket assembly which is lightweight and has sufficient rigidity.

In accordance with a one hundred-sixth aspect of the present invention, a multiple sprocket assembly is provided that basically includes a plurality of the bicycle sprockets according to the one hundred-second aspect. The axially projecting portion of one of the bicycle sprockets mates with the axially recessed portion of an adjacent one of the bicycle sprockets adjacent to the one of the bicycle sprockets while the bicycle sprockets are attached to each other. According to the one hundred-sixth aspect of the present invention, it is possible to provide a multiple bicycle sprocket assembly which is lightweight and has sufficient rigidity.

In accordance with a one hundred-seventh aspect of the present invention, the bicycle sprocket according to the seventy-fourth aspect is configured so that the third axial surface of the second layered member includes a textured portion that contacts the first axial surface of the first layered member. According to the one hundred-seventh aspect of the present invention, it is possible to provide a bicycle sprocket in which the first layered member very securely bonds to the second layered member with additional adhesive or with an integral molding process.

In accordance with a one hundred-eighth aspect of the present invention, the bicycle sprocket according to the one hundred-seventh aspect is configured so that the second layered member is attached to the first layered member by an integral molding process. According to the one hundred-eighth aspect of the present invention, it is possible to effectively and quickly manufacture the bicycle sprocket, and it is possible to provide a bicycle sprocket in which the first layered member very securely bonds to the second layered member without additional adhesive.

Other objects, features, aspects and advantages of the disclosed bicycle sprocket will become apparent to those skilled in the art from the following detailed description, which, taken in conjunction with the annexed drawings, discloses embodiments of the bicycle sprocket.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
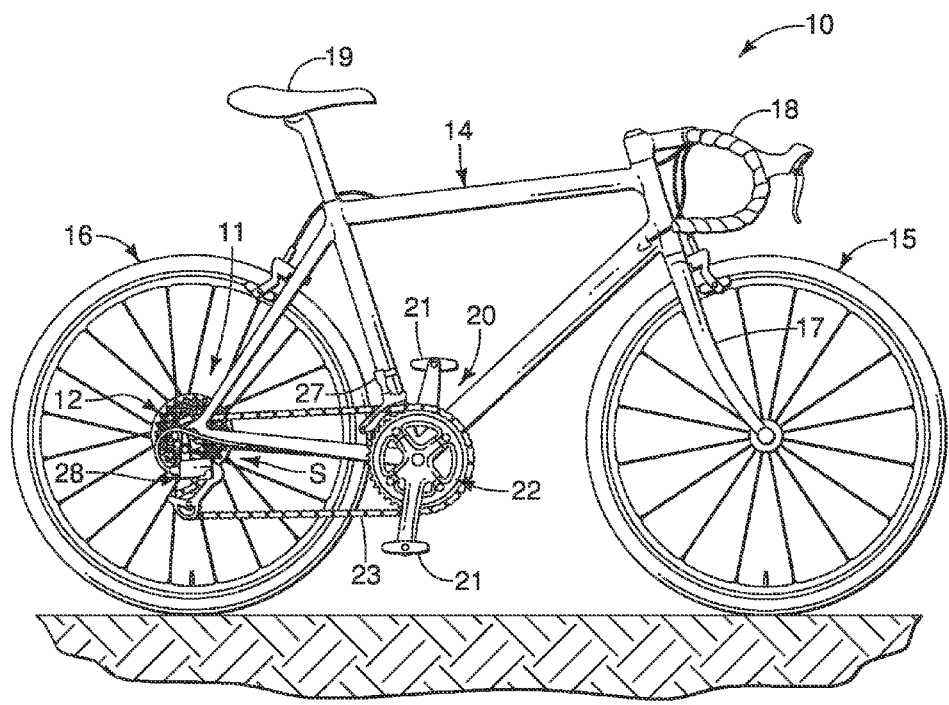
FIG. 1 is a side elevational view of a bicycle having a bicycle sprocket in accordance with a first embodiment.

Referring initially to FIG. 1, a bicycle 10 is illustrated having a rear bicycle hub 11 with a multi-stage rear sprocket assembly (cassette) 12 (e.g., a multiple sprocket assembly) in accordance with a first embodiment. While the bicycle 10 is illustrated as a road bike, it will be apparent to those skilled in the art from this disclosure that the present invention can be applied to other types of bicycles such as a mountain bike. The rear sprocket assembly 12 includes ten (10) rear sprockets S (e.g., a plurality of bicycle sprockets) that are mounted on the rear bicycle hub 11 with a plurality of spacers (or sprocket support members) arranged between the sprockets S. An innermost sprocket S of the rear sprocket assembly 12 is the largest, and has the most teeth, while an outermost sprocket S of the rear sprocket assembly 12 is the smallest, and has the fewest teeth. In the illustrated embodiment, the sprockets S have 34T, 30T, 26T, 23T, 21T, 19T, 17T, 15T, 13T, 11T tooth configurations, respectively. However, it will be apparent to those skilled in the bicycle art from this disclosure that the sprockets S can have different tooth configurations as needed and/or desired. Furthermore, it will be apparent to those skilled in the bicycle art from this disclosure that the rear sprocket assembly 12 can include different number of the sprockets S, such as less than or more than ten as needed and/or desired.

Referring to FIG. 1, the bicycle 10 basically has a frame 14 with front and rear wheels 15 and 16 rotatably coupled thereto. A front fork 17 is pivotally coupled to the front of the frame 14 with the front wheel 15 rotatably coupled thereto in a conventional manner. A handlebar 18 is rigidly attached to the front fork 17 in order to turn the front wheel 15 to steer the bicycle 10. The rear wheel 16 is rotatably coupled to a rear portion or rear triangle of the frame 14 via the rear bicycle hub 11 in a conventional manner. A seat 19 is adjustably coupled to the frame 14 via a seat post in a conventional manner, and a drive train 20 is provided on the bicycle 10 for propelling the bicycle 10. The bicycle 10 is conventional except for selected parts of the drive train 20, as discussed below.

The drive train 20 basically includes the rear multi-stage sprocket assembly 12, a pair of pedals 21, a front multi-stage sprocket assembly 22 mounted to rotate with the pedals 21, and a chain 23 extending between the rear multi-stage sprocket assembly 12 and the front multi-stage sprocket assembly 22. The rear sprocket assembly 12 is preferably coupled to the rear bicycle hub 11 via a freewheel. The pedals 21 are coupled to the front multi-stage sprocket assembly 22 by a conventional crank set to transfer force from the rider to the chain 23. The force from the chain 23 is selectively transferred to the rear wheel 16 via the rear bicycle hub 11 (e.g. via the rear sprocket assembly 12 depending on the direction of rotation) in a conventional manner. The chain 23 used in the drive train 20 is designed to be compatible with the rear ten-stage sprocket assembly 12. In particular, the chain 23 is a conventional chain used with a conventional rear sprocket assembly. Accordingly, the chain 23 will not be explained and/or illustrated in detail herein. Similarly, the front sprocket assembly 22 is configured to be compatible with the chain 23. Such front sprocket assembly 22 is well known in the bicycle art. Accordingly, the front sprocket assembly 22 will not be explained and/or illustrated in detail herein. Nevertheless, it will be apparent to those skilled in the art from this disclosure that the present invention can be applied to such a front sprocket assembly.

The drive train 20 is basically controlled by conventional front and rear shifting units (not shown) that control the lateral positions of front and rear derailleurs 27 and 28 in a conventional manner. Thus, when the rider is pedaling, the front and rear sprocket assemblies 22 and 12 are rotating to circulate or cycle the chain 23 due to the movement of the pedals 21. The shifting units (not shown) can be actuated by the rider to control the lateral positions of the front and/or rear derailleurs 27 and/or 28. When the chain 23 is circulated or cycled in the forward (clockwise direction as seen in FIG. 1), the shifting units can be actuated to control the gear ratio of the drive train 20 by controlling the lateral position of the chain 23 via the derailleurs 27 and 28 in a conventional manner. The derailleurs 27 and 28 selectively apply a lateral force outwardly/inwardly to the chain 23 to cause up/down shifts in a conventional manner. The drive train 20 is basically conventional, except for the rear multi-stage sprocket assembly 12 in the embodiment. Thus, the drive train 20 will not be discussed and/or illustrated in further detail herein, except as related to the rear multi-stage sprocket assembly 12.

Since the various parts of the bicycle 10 and most of the parts of the drive train 20 are well known in the bicycle art, these parts of the bicycle 10 and the drive train 20 will not be discussed and/or illustrated in detail herein, except as related to the present invention. However, it will be apparent to those skilled in the bicycle art from this disclosure that various conventional bicycle parts such as brakes, different hub structures, etc., which are not illustrated and/or discussed in detail herein, can be used in conjunction with the present invention as needed and/or desired.

Figure 2:
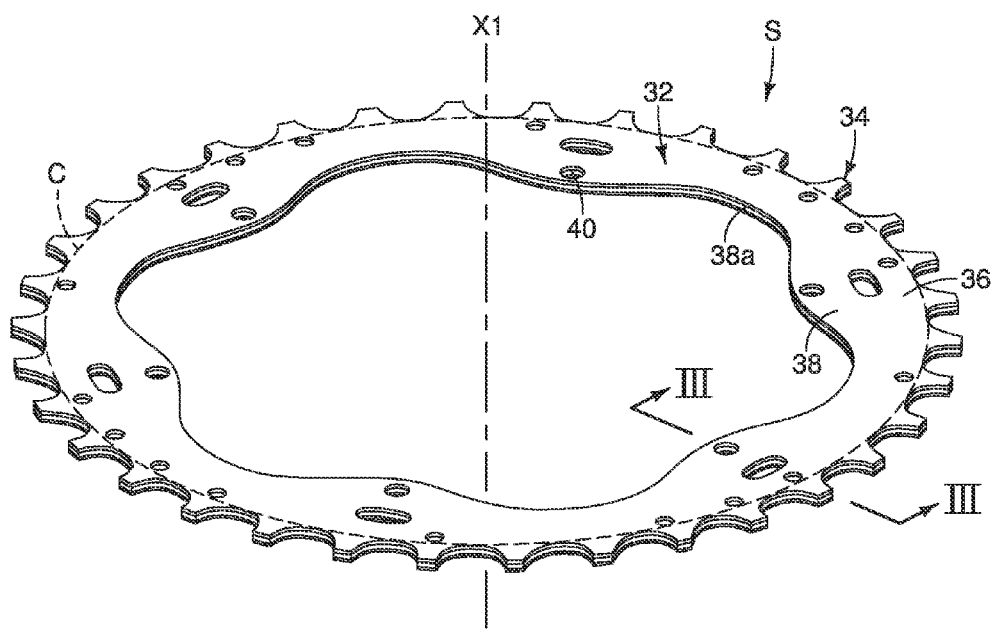
FIG. 2 is a perspective view of the bicycle sprocket of the bicycle illustrated in FIG. 1.
Figure 3:
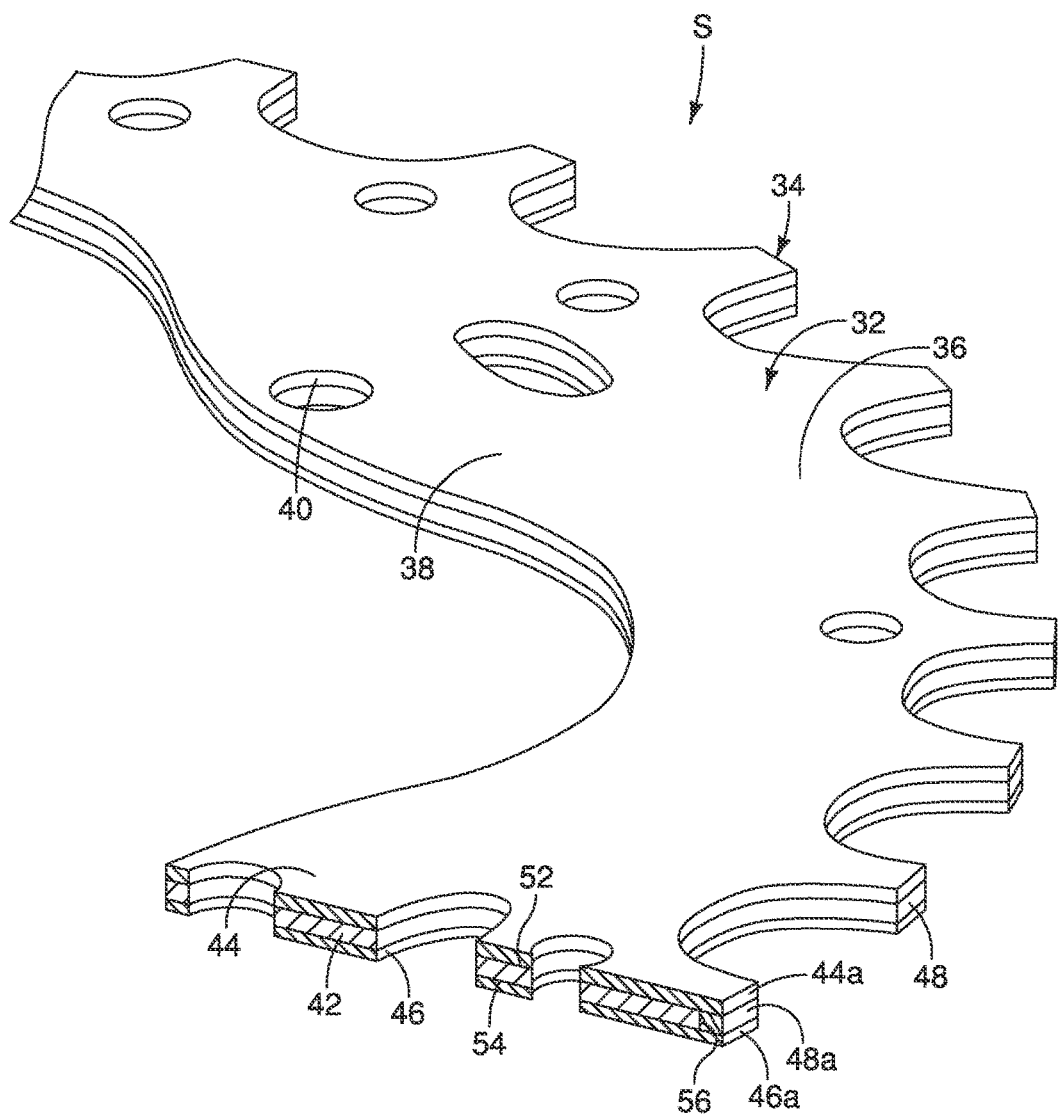
FIG. 3 is an enlarged, partial cross sectional view of the bicycle sprocket illustrated in FIG. 2 as seen along section line III-III.

Referring now to FIGS. 2 and 3, the sprockets S of the rear sprocket assembly 12 will now be explained in more detail. As mentioned above, the rear sprocket assembly 12 includes ten (10) rear sprockets S that are mounted on the rear bicycle hub 11 with the spacers arranged between the sprockets S such that the sprockets S are spaced from each other at predetermined intervals. The spacers can have any conventional configuration as needed and/or desired. For example, the spacers can be each formed as a one-piece, unitary member that is made of suitable rigid and/or lightweight materials. For example, the spacers can be made of rigid resin materials or lightweight metallic materials such as aluminum. Since the spacers can be conventional, the spacers will not be discussed in detail herein. The sprockets S and the spacers are fixedly mounted on the rear bicycle hub 11 such that the sprockets S rotate together about a center hub rotation axis of the rear bicycle hub 11. The sprockets S typically rotate together in a forward rotational direction (e.g., in a clockwise direction as viewed in FIG. 1) when the rider is pedaling in a forward (clockwise) direction to propel the bicycle 10 in a forward direction as seen in FIG. 1.

In the illustrated embodiment, one of the sprockets S has a multi-layered structure as described below. Specifically, in the illustrated embodiment, as shown in FIG. 2, the largest one of the sprockets S (hereinafter merely referred as a "largest sprocket S" or "sprocket S") has the multi-layered structure. Of course, any one(s) of the sprockets S can have this multi-layered structure. However, in the illustrated embodiment, the other sprockets S other than the largest sprocket S have any conventional configuration as needed and/or desired. For example, these sprockets S other than the largest sprockets S can be each formed as a one-piece, unitary member from a metallic material that is suitable for a bicycle sprocket such as an iron or an iron alloy. Therefore, in the illustrated embodiment, the following disclosure will focus on the configuration of the largest sprocket S for the sake of brevity.

As shown in FIG. 2, the sprocket S (e.g., a bicycle sprocket) basically includes a sprocket body 32, and a plurality of sprocket teeth 34. The sprocket body 32 has a rotational axis X1. The sprocket body 32 includes an outer periphery 36 and an inner periphery 38. The sprocket S is radially straight as the sprocket S extends between the outer periphery 36 and the inner periphery 38. In other words, the sprocket S is generally a flat plate with opposite sprocket side surfaces being planar between the outer periphery 36 and the inner periphery 38 other than various holes and recesses. The inner periphery 38 defines an opening 38a that is free of any freewheel engaging splines. In the illustrated embodiment, the sprocket body 32 includes a plurality of fastener holes 40 for receiving outer rivets for fastening the sprocket S to the spacer. The sprocket teeth 34 extend radially outwardly from the outer periphery 36 of the sprocket body 32. In the illustrated embodiment, the sprocket body 32 is defined as a part of the sprocket S that is radially inwardly disposed with respect to an imaginary circle C (i.e., the root circle) connecting innermost positions of gaps circumferentially disposed between the sprocket teeth 34. As mentioned above, the sprocket S is larger than any other sprocket of the rear sprocket assembly 12. Since the sprocket S is the largest sprocket of the rear sprocket assembly 12, the total number of the sprocket teeth 34 is typically greater than the other sprockets of the rear sprocket assembly 12. In the illustrated embodiment, as shown in FIG. 2, the total number of the sprocket teeth 34 is thirty-four. Of course, the total number of the sprocket teeth 34 can be larger or smaller than thirty-four as needed and/or desired.

In the illustrated embodiment, as shown in FIG. 3, the sprocket S includes a first layered member 42, a second layered member 44, a third layered member 46, and a coating layer 48. In the illustrated embodiment, the first, second and third layered members 42, 44 and 46 extend radially outward from the inner periphery 38 of the sprocket body 32 to the sprocket teeth 34. Thus, in the illustrated embodiment, the plurality (e.g., all) of the sprocket teeth 34 includes the first layered member 42 and the second layered member 44. In the illustrated embodiment, the plurality of the sprocket teeth 34 further includes the third layered member 46. Furthermore, the plurality of the sprocket teeth 34 includes the coating layer 48. Alternatively or optionally, at least one (e.g., not all) of the sprocket teeth 34 can include the first layered member 42 and the second layered member 44. The at least one of the sprocket teeth 34 can also include the third layered member 46. Furthermore, the at least one of the sprocket teeth 34 can also include the coating layer 48. On the other hand, in the illustrated embodiment, the sprocket body 32 includes the first layered member 42 and the second layered member 44. Furthermore, the sprocket body 32 includes the third layered member 46. Specifically, in the illustrated embodiment, the first, second and third layered members 42, 44 and 46 radially extend between the inner periphery 38 of the sprocket body 32 and the outer periphery 36 of the sprocket body 32 other than various holes and recesses.

As shown in FIG. 2, the first layered member 42 has a first axial surface 52 and a second axial surface 54 opposite to the first axial surface 52 with respect to the rotational axis X1. The second layered member 44 is attached to the first axial surface 52 of the first layered member 42. The third layered member 46 is attached to the second axial surface 54 of the first layered member 42. The coating layer 48 is formed on a radially end surface 56 of the first layered member 42. In the illustrated embodiment, the first, second and third layered members 42, 44 and 46 are flat layered members. Thus, the first and second layered members 42 and 44 overlap each other in an axial direction as viewed parallel to the rotational axis X1, while the first and second layered members 42 and 44 do not overlap each other in a radial direction as viewed perpendicularly to the rotational axis X1. Furthermore, the first and third layered members 42 and 46 overlap each other in the axial direction as viewed parallel to the rotational axis X1, while the first and third layered members 42 and 46 do not overlap each other in the radial direction as viewed perpendicularly to the rotational axis X1. In the illustrated embodiment, the first layered member 42 is axially disposed between the second and third layered members 44 and 46 such that the first layered member 42 is axially completely covered by the second and third layered members 44 and 46. Furthermore, the first layered member 42 is radially inwardly disposed relative to the coating layer 48 such that the radially end surface 56 of the first layered member 42 is radially completely covered by the coating layer 48. However, alternatively, the first layered member 42 can be partially exposed through the second and third layered members 44 and 46 in the axial direction, while the first layered member 42 can be partially exposed through the coating layer 48 in the radial direction. The coating layer 48 can be omitted as needed and/or desired so that the first layered member can be radially exposed and/or has the same outer contour as those of the second and third layered members.

The first layered member 42 has an axial thickness of preferably more than or equal to 0.1 mm. The first layered member 42 has a specific gravity that is less than that of the second layered member 44. Furthermore, in the illustrated embodiment, the first layered member 42 has a specific gravity that is less than that of the third layered member 46. The first layered member 42 is made of a material selected from the group consisting of aluminum, titanium, magnesium and beryllium. Specifically, in the illustrated embodiment, the first layered member 42 is made of quenched aluminum. However, alternatively, the first layered member 42 can be made of non-metallic material. Specifically, the non-metallic material of the first layered member 42 can includes resin. For example, the first layered member 42 can be made of hard plastic resin. Alternatively, the non-metallic material of the first layered member 42 can be fiber-reinforced material. For example, the first layered member 42 can be made of a carbon fiber-reinforced plastic or polymer (FRP).

The second layered member 44 has an axial thickness of preferably more than or equal to 0.1 mm. The second layered member 44 is made of metallic material. Specifically, in the illustrated embodiment, the second layered member 44 is made of iron. Of course, the second layered member 44 can be made of other metallic material. For example, the second layered member 44 can be made of stainless steel. In the illustrated embodiment, the second layered member 44 has a specific gravity that is equal to that of the third layered member 46. Specifically, in the illustrated embodiment, the second and third layered members 44 and 46 are made of the same material. However, of course, the second and third layered members 44 and 46 can be made of different materials as needed and/or desired. The second layered member 44 preferably has Vickers hardness larger than or equal to 400 (HV). The second layered member 44 is fixedly attached to the first layered member 42 in a suitable fixing manner. Specifically, in the illustrated embodiment, the first layered member 42 and the second layered member 44 are attached to each other by diffusion bonding. However, alternatively, the first layered member 42 and the second layered member 44 can be attached to each other with an adhesive. Furthermore, the first layered member 42 and the second layered member 44 can be attached to each other by an integral molding process. Specifically, when the first layered member 42 is made of metallic material, the first and second layered members 42 and 44 can be attached to each other by forming a clad structure. Furthermore, when the first layered member 42 is made of resin material, the first and second layered members 42 and 44 can be attached to each other by the integral molding process. In particular, the integral molding process can be performed such that the resin of the first layered member 42 can extend into dimples of the second layered member 44 during formation of the first layered member 42. In the illustrated embodiment, with this integral molding process, the first layered member 42, which is made of resin, is molded while simultaneously attaching the first layered member 42 to the second layered member 44, which includes dimples for receiving the resin.

The third layered member 46 has an axial thickness of preferably more than or equal to 0.1 mm. The third layered member 46 is made of metallic material. Specifically, in the illustrated embodiment, the third layered member 46 is made of iron. Of course, the third layered member 46 can be made of other metallic material. For example, the third layered member 46 can be made of stainless steel. The third layered member 46 preferably has Vickers hardness larger than or equal to 400 (HV). The third layered member 46 is fixedly attached to the first layered member 42 in a suitable fixing manner. Specifically, in the illustrated embodiment, the first layered member 42 and the third layered member 46 are attached to each other by diffusion bonding. However, alternatively, the first layered member 42 and the third layered member 46 can be attached to each other with an adhesive. Furthermore, the first layered member 42 and the third layered member 46 can be attached to each other by an integral molding process. Specifically, when the first layered member 42 is made of metallic material, the first and third layered members 42 and 46 can be attached to each other by forming a clad structure. Furthermore, when the first layered member 42 is made of resin material, the first and third layered members 42 and 46 can be attached to each other by the integral molding process. In particular, the integral molding process can be performed such that the resin of the first layered member 42 can extend into dimples of the third layered member 46 during formation of the first layered member 42. In the illustrated embodiment, with this integral molding process, the first layered member 42, which is made of resin, is molded while simultaneously attaching the first layered member 42 to the third layered member 46, which includes dimples for receiving the resin.

As shown in FIG. 3, the coating layer 48 is preferably formed on the radially end surface 56 of the first layered member 42. Specifically, in the illustrated embodiment, the coating layer 48 circumferentially extends along the radially end surface 56 of the first layered member 42 about the rotation axis X1. In the illustrated embodiment, the coating layer 48 is disposed axially between the second and third layered members 44 and 46 such that an radially end surface 48a of the coating layer 48 can be flush with radially end surfaces 44a and 46a of the second and third layered members 44 and 46. In other words, in this case, the first layered member 42 has the outermost diameter of the first layered member 42 that is smaller than those of the second and third layered members 44 and 46 such that the second and third layered members 44 and 46 defines an circumferential groove for receiving the coating layer 48 therebetween. Alternatively, the coating layer 48 can be formed on an radially end surface of the sprocket teeth 34 that is formed by the radially end surfaces 56, 44a and 46a of the first, second and third layered members 42, 44 and 46. In this case, the first, second and third layered members 42, 44 and 46 have the same outermost diameter. In the illustrated embodiment, the coating layer 48 is an intermetallic compound layer. Specifically, the intermetallic compound layer of the coating layer 48 is made of aluminum, and one of nickel and iron. In particular, in the illustrated embodiment, the coating layer 48 is plated layer. More specifically, the coating layer 48 is a nickel-plated layer. In the illustrated embodiment, the coating layer 48 is formed on the radially end surface 56 of the first layered member 42 such that the coating layer 48 protect the first layered member 42 from being wore away by the chain 23. The coating layer 48 can also be formed on the radially end surface 56 of the first layered member 42 in a conventional manner.

In the illustrated embodiment, the sprocket S includes the first layered member 42, the second layered member 44, the third layered member 46, and the coating layer 48. Thus, sprocket teeth 34 that contact with the chain 23 are all covered by metallic materials, which results in ensuring strength, rigidity, and abrasion resistance. On the other hand, the first layered member 42 is made from a material having a smaller specific gravity than the second and third layered members 44 and 46, which results in reducing the weight of the sprocket S. However, the multi-layered structure of the sprocket S is not limited to this. The sprocket S can only include the first layered member 42, the second layered member 44 and the coating layer 48 without the third layered member 46. The sprocket S can only include the first layered member 42, the third layered member 46 and the coating layer 48 without the second layered member 44. Furthermore, the sprocket S can only include the first layered member 42, the second layered member 44 and the third layered member 46 without the coating layer 48.

In the illustrated embodiment, the sprocket S is the largest sprocket of the rear sprocket assembly 12. However, any one(s) of the sprockets S of the rear sprocket assembly 12 can include the same configuration as the sprocket S illustrated in FIG. 2. Moreover, any one(s) of chain wheels or front sprocket of the front sprocket assembly 22 (FIG. 1) can also include the same configuration as the sprocket S illustrated in FIG. 2.

Second Embodiment

Referring now to FIGS. 4 to 8, a rear sprocket assembly 112 (e.g., a multiple sprocket assembly) in accordance with a second embodiment will now be explained. The rear sprocket assembly 112 is basically identical to the rear sprocket assembly 12 in accordance with the first embodiment, except that a plurality of sprockets of the rear sprocket assembly 112 includes a pair of rear sprockets Sa and Sb (e.g., a plurality of bicycle sprockets) detachably coupled to each other, as explained below.

In view of the similarity between the first and second embodiments, the parts of the second embodiment that are identical to the parts of the first embodiment will be given the same reference numerals as the parts of the first embodiment. Also, parts of this second embodiment that are functionally identical and/or substantially identical to parts of the first embodiment will be given the same reference numerals but with "100" added thereto. In any event, the descriptions of the parts of the second embodiment that are substantially identical to the parts of the first embodiment may be omitted for the sake of brevity. However, it will be apparent to those skilled in the art from this disclosure that the descriptions and illustrations of the first embodiment also apply to this second embodiment, except as discussed and/or illustrated herein.

Figure 4:
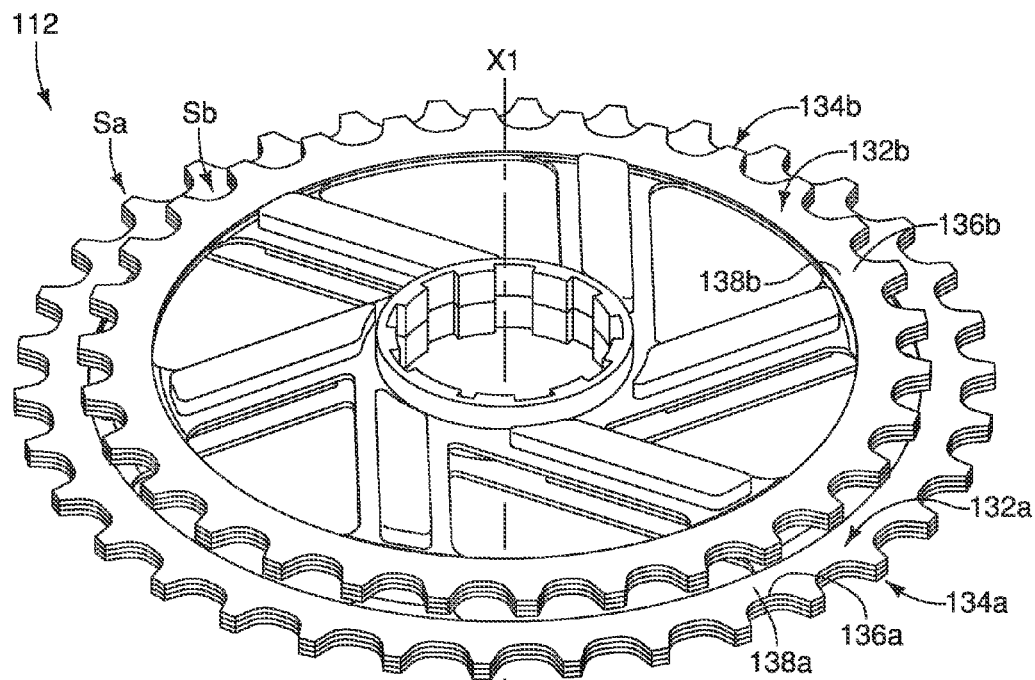
FIG. 4 is a perspective view of a pair of bicycle sprockets in accordance with a second embodiment, the bicycle sprockets detachably coupled to each other.
Figure 5:
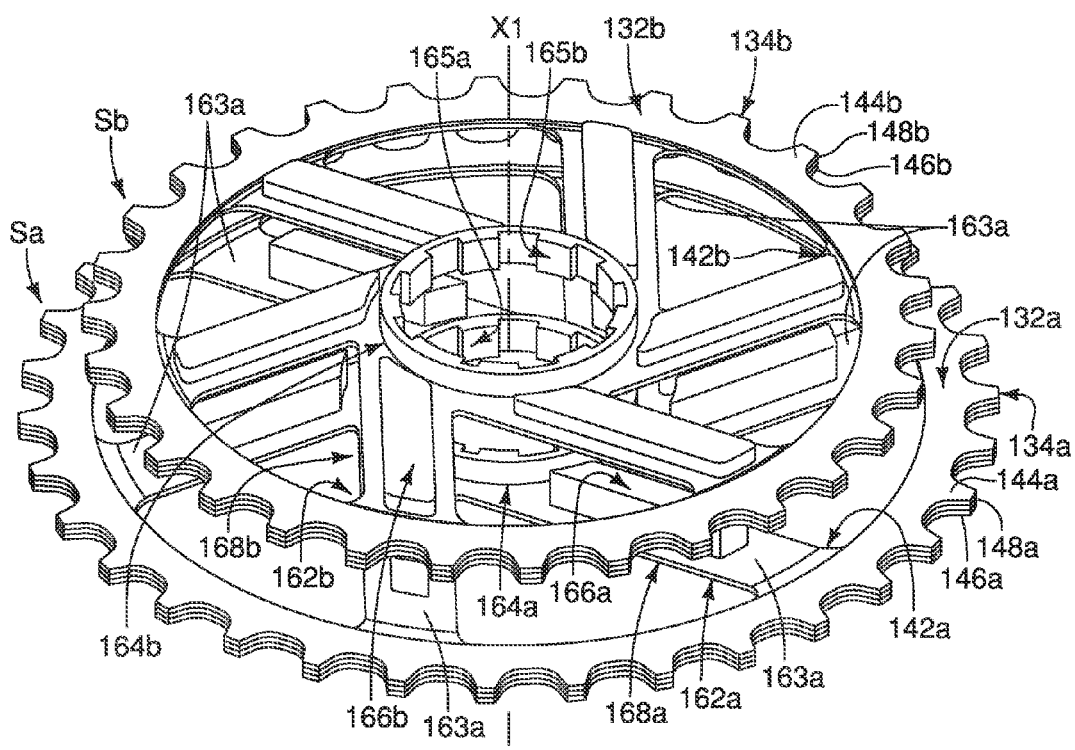
FIG. 5 is an exploded perspective view of the bicycle sprockets illustrated in FIG. 4.
Figure 6:
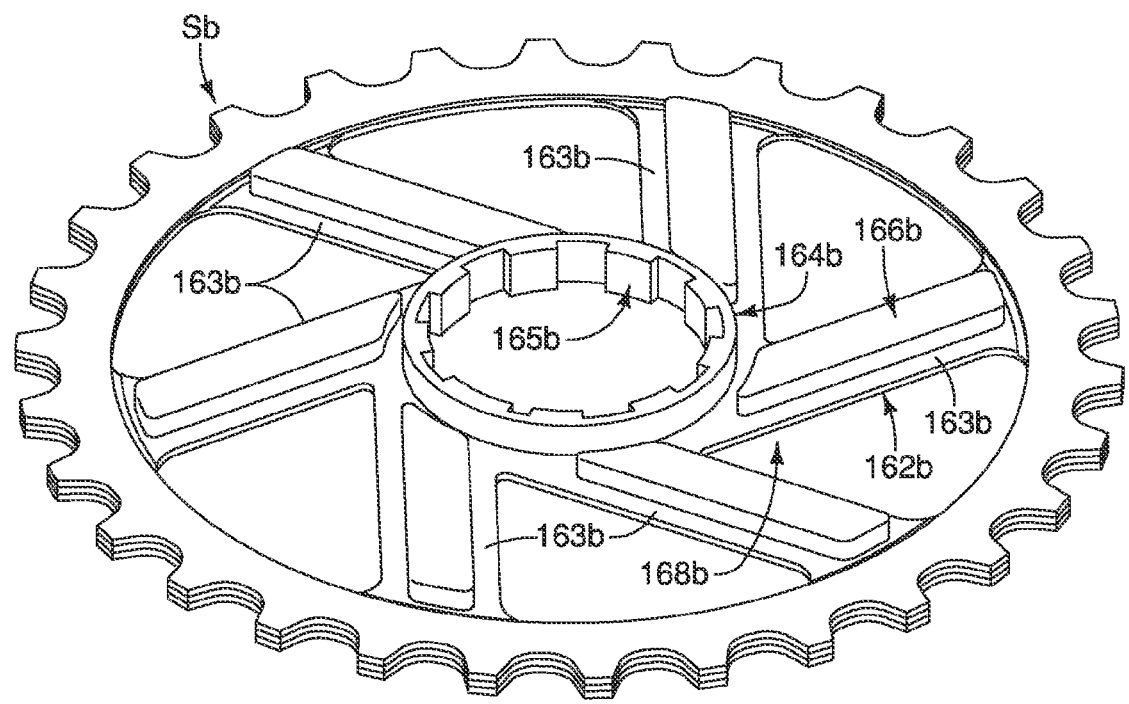
FIG. 6 is a perspective view of one of the bicycle sprockets illustrated in FIG. 4.

In the illustrated embodiment, the sprockets Sa and Sb have multi-layered structures, respectively, as described below. Specifically, in the illustrated embodiment, as shown in FIGS. 4 and 5, the sprocket Sa is the largest sprocket of the rear sprocket assembly 112, while the sprocket Sb is the second largest sprocket of the rear sprocket assembly 112. Of course, any one of adjacent pairs of the sprockets of the rear sprocket assembly 112 can have this multi-layered structure. However, in the illustrated embodiment, the other sprockets other than the sprockets Sa and Sb have any conventional configuration as needed and/or desired. For example, these sprockets other than the sprockets Sa and Sb can be each formed as a one-piece, unitary member from a metallic material that is suitable for a bicycle sprocket such as an iron or an iron alloy. Therefore, in the illustrated embodiment, the following disclosure will focus on the configuration of the sprockets Sa and Sb for the sake of brevity.

As shown in FIG. 4, the sprocket Sa (e.g., a bicycle sprocket) basically includes a sprocket body 132a, and a plurality of sprocket teeth 134a. The sprocket body 132a has a rotational axis X1. The sprocket body 132a includes an outer periphery 136a and an inner periphery 138a. The sprocket teeth 134a extend radially outwardly from the outer periphery 136a of the sprocket body 132a. On the other hand, the sprocket Sb (e.g., a bicycle sprocket) basically includes a sprocket body 132b, and a plurality of sprocket teeth 134b. The sprocket body 132b has the rotational axis X1. The sprocket body 132b includes an outer periphery 136b and an inner periphery 138b. The sprocket teeth 134b extend radially outwardly from the outer periphery 136b of the sprocket body 132b. In the illustrated embodiment, the sprocket Sa is the largest sprocket of the rear sprocket assembly 112. As shown in FIGS. 4 and 5, the total number of the sprocket teeth 134a is thirty-four. On the other hand, in the illustrated embodiment, the sprocket Sb is the second largest sprocket of the rear sprocket assembly 112. As shown in FIGS. 4 and 5, the total number of the sprocket teeth 134b is thirty. Of course, the total numbers of the sprocket teeth 134a and 134b can be different numbers as needed and/or desired.

Figure 7:
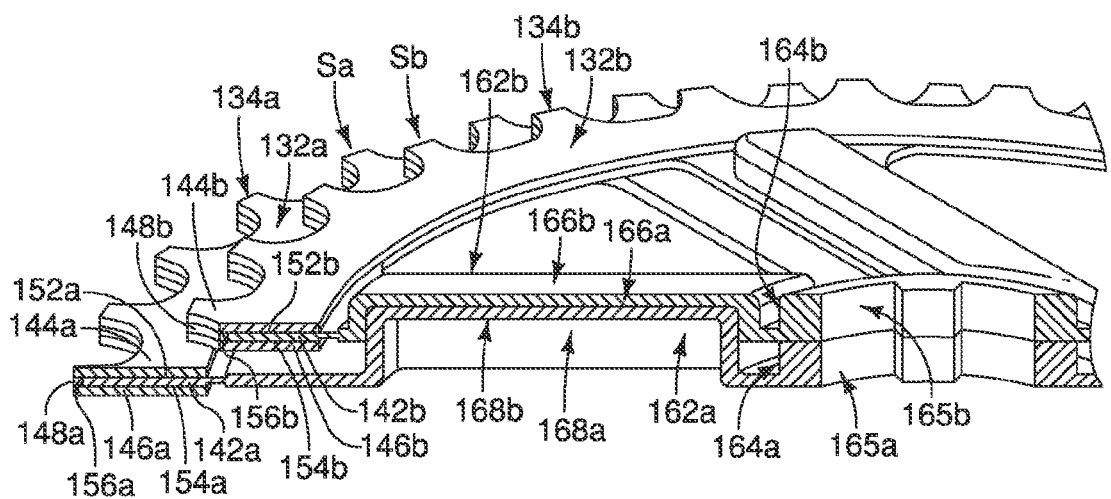
FIG. 7 is an enlarged, partial cross sectional view of the bicycle sprockets illustrated in FIG. 4.
Figure 8:
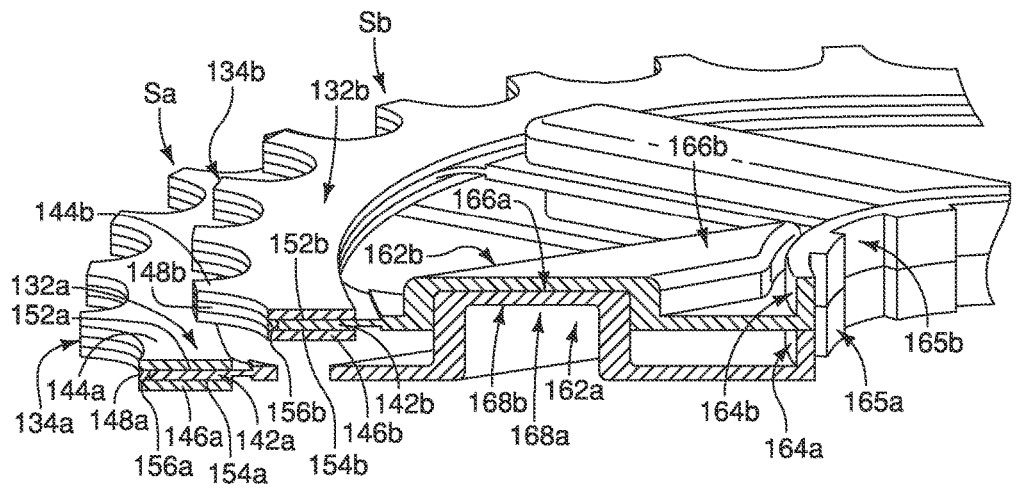
FIG. 8 is an enlarged, partial cross sectional view of the bicycle sprockets illustrated in FIG. 4.

In the illustrated embodiment, the sprockets Sa and Sb have multi-layered structures, respectively. Specifically, as shown in FIGS. 5, 7 and 8, the sprocket Sa includes a first layered member 142a, a second layered member 144a, a third layered member 146a, and a coating layer 148a. In the illustrated embodiment, the first, second and third layered members 142a, 144a and 146a extend radially outward from the inner periphery 138a of the sprocket body 132a to the sprocket teeth 134a. Furthermore, as shown in FIGS. 5, 7 and 8, the sprocket Sb includes a first layered member 142b, a second layered member 144b, a third layered member 146b, and a coating layer 148b. In the illustrated embodiment, the first, second and third layered members 142b, 144b and 146b extend radially outward from the inner periphery 138b of the sprocket body 132b to the sprocket teeth 134b. The multi-layered structures of the sprockets Sa and Sb are basically identical to that of the sprocket S in accordance with the first embodiment, except that the first layered members 142a and 142b extend radially inwardly from the inner peripheries 138a and 138b of the sprocket bodies 132a and 132b, respectively. Furthermore, the first layered members 142a and 142b, the second layered members 144a and 144b, the third layered members 146a and 146b, and the coating layers 148a and 148b can be made of the same material as the first layered member 42, the second layered member 44, the third layered member 146, and the coating layer 48 in accordance with the first embodiment, respectively. Furthermore, the first, second and third layered members 142a, 144a and 146a and the coating layer 148a are attached with respect to each other in the same fixing manner as discussed in the first embodiment, while the first, second and third layered members 142b, 144b and 146b and the coating layer 148b are attached with respect to each other in the same fixing manner as discussed in the first embodiment. Thus, the detailed description of the multi-layered structures of the sprockets Sa and Sb will be omitted for the sake of brevity. It will be apparent to those skilled in the art from this disclosure that the descriptions and illustrations of the parts of sprocket S in accordance with the first embodiment also apply to the parts of the sprockets Sa and Sb having the same name, except as discussed and/or illustrated herein.

As shown in FIGS. 7 and 8, in regards to the sprocket Sa, the first layered member 142a has a first axial surface 152a and a second axial surface 154a opposite to the first axial surface 152a with respect to the rotational axis X1. The second layered member 144a is attached to the first axial surface 152a of the first layered member 142a. The third layered member 146a is attached to the second axial surface 154a of the first layered member 142a. The coating layer 148a is formed on a radially end surface 156a of the first layered member 142a. In the illustrated embodiment, the first, second and third layered members 142a, 144a and 146a are flat layered members at the sprocket body 132a and the sprocket teeth 134a. Thus, in regards to the sprocket body 132a and the sprocket teeth 134a of the sprocket Sa, the first and second layered members 142a and 144a overlap each other in an axial direction as viewed parallel to the rotational axis X1, while the first and second layered members 142a and 144a do not overlap each other in a radial direction as viewed perpendicularly to the rotational axis X1. Furthermore, in regards to the sprocket body 132a and the sprocket teeth 134a of the sprocket Sa, the first and third layered members 142a and 146a overlap each other in the axial direction as viewed parallel to the rotational axis X1, while the first and third layered members 142a and 146a do not overlap each other in the radial direction as viewed perpendicularly to the rotational axis X1. In the illustrated embodiment, the first layered member 142a is axially disposed between the second and third layered members 144a and 146a at the sprocket body 132a and the sprocket teeth 134a such that the first layered member 142a is axially completely covered by the second and third layered members 144a and 146a at the sprocket body 132a and the sprocket teeth 134a. Furthermore, the first layered member 142a is radially inwardly disposed relative to the coating layer 148a such that the radially end surface 156a of the first layered member 142a is radially completely covered by the coating layer 148a. However, alternatively, the first layered member 142a can be partially exposed through the second and third layered members 144a and 146a in the axial direction, while the first layered member 142a can be partially exposed through the coating layer 148a in the radial direction. In the illustrated embodiment, the first layered member 142a has a specific gravity that is less than that of the second layered member 144a. Furthermore, in the illustrated embodiment, the first layered member 142a has a specific gravity that is less than that of the third layered member 146a.

Similarly, as shown in FIGS. 7 and 8, in regards to the sprocket Sb, the first layered member 142b has a first axial surface 152b and a second axial surface 154b opposite to the first axial surface 152b with respect to the rotational axis X1. The second layered member 144b is attached to the first axial surface 152b of the first layered member 142b. The third layered member 146b is attached to the second axial surface 154b of the first layered member 142b. The coating layer 148b is formed on a radially end surface 156b of the first layered member 142b. In the illustrated embodiment, the first, second and third layered members 142b, 144b and 146b are flat layered members at the sprocket body 132b and the sprocket teeth 134b. Thus, in regards to the sprocket body 132b and the sprocket teeth 134b of the sprocket Sb, the first and second layered members 142b and 144b overlap each other in an axial direction as viewed parallel to the rotational axis X1, while the first and second layered members 142b and 144b do not overlap each other in a radial direction as viewed perpendicularly to the rotational axis X1. Furthermore, in regards to the sprocket body 132b and the sprocket teeth 134b of the sprocket Sa, the first and third layered members 142b and 146b overlap each other in the axial direction as viewed parallel to the rotational axis X1, while the first and third layered members 142b and 146b do not overlap each other in the radial direction as viewed perpendicularly to the rotational axis X1. In the illustrated embodiment, the first layered member 142b is axially disposed between the second and third layered members 144b and 146b at the sprocket body 132b and the sprocket teeth 134b such that the first layered member 142b is axially completely covered by the second and third layered members 144b and 146b at the sprocket body 132b and the sprocket teeth 134b. Furthermore, the first layered member 142b is radially inwardly disposed relative to the coating layer 148b such that the radially end surface 156b of the first layered member 142b is radially completely covered by the coating layer 148b. However, alternatively, the first layered member 142b can be partially exposed through the second and third layered members 144b and 146b in the axial direction, while the first layered member 142b can be partially exposed through the coating layer 148b in the radial direction. In the illustrated embodiment, the first layered member 142b has a specific gravity that is less than that of the second layered member 144b. Furthermore, in the illustrated embodiment, the first layered member 142b has a specific gravity that is less than that of the third layered member 146b.

In the illustrated embodiment, as shown in FIGS. 5, 7 and 8, the first layered member 142a of the sprocket Sa extends radially inwardly from the inner periphery 138a of the sprocket body 132a. Specifically, the first layered member 142a of the sprocket Sa has a sprocket support member 162a. In the illustrated embodiment, the sprocket support member 162a has a plurality of (e.g., six in this embodiment) sprocket arms 163a radially connecting the inner periphery 138a of the first layered member 142a to a center boss 164a. Of course, it will be apparent to those skilled in the art from this disclosure that the number of the sprocket arms 163a can be more than or less than six as needed and/or desired. Specifically, in the illustrated embodiment, each of the sprocket arms 163a extends in a direction slanted relative to the radial direction of the rotational axis X1. The center boss 164a has a bicycle hub engaging profile 165a on an inner peripheral surface of the center boss 164a. In other words, the first layered member 142a has the bicycle hub engaging profile 165a at a location of a radially inner end of the sprocket support member 162a of the first layered member 142a. The bicycle hub engaging profile 165a defines a plurality of engaging splines that is dimensioned to be non-rotatably engage with splines of the freewheel (not shown) of the rear bicycle hub 11 in a relatively conventional manner. Preferably, the bicycle hub engaging profile 165a is configured so that the rear sprocket assembly 112 can only fit on the freewheel in a single orientation.

As shown in FIGS. 5, 7 and 8, each of the sprocket arms 163a of the first layered member 142a has an axially projecting portion 166a and an axially recessed portion 168a. The axially projecting portions 166a and the axially recessed portions 168a are positioned radially inwardly from the inner periphery 138a of the sprocket body 132a. As shown in FIGS. 7 and 8, the axially projecting portions 166a of the sprocket Sa axially bulge towards the sprocket Sb on the first axial surface 152a side, which define the axially recessed portions 168a of the sprocket Sa that are axially recessed towards the sprocket Sb on the second axial surface 154a side.

Similarly, in the illustrated embodiment, as shown in FIGS. 5 to 8, the first layered member 142b of the sprocket Sb extends radially inwardly from the inner periphery 138b of the sprocket body 132b. Specifically, the first layered member 142b of the sprocket Sb has a sprocket support member 162b. In the illustrated embodiment, the sprocket support member 162b has a plurality of (e.g., six in this embodiment) sprocket arms 163b radially connecting the inner periphery 138b of the first layered member 142b to a center boss 164b. Of course, it will be apparent to those skilled in the art from this disclosure that the number of sprocket arms 163b can be more than or less than six as needed and/or desired. Specifically, in the illustrated embodiment, each of the sprocket arms 163b extends in a direction slanted relative to the radial direction of the rotational axis X1. The center boss 164b has a bicycle hub engaging profile 165b on an inner peripheral surface of the center boss 164b. In other words, the first layered member 142b has the bicycle hub engaging profile 165b at a location of a radially inner end of the sprocket support member 162b of the first layered member 142b. The bicycle hub engaging profile 165b defines a plurality of engaging splines that is dimensioned to be non-rotatably engage with splines of the freewheel (not shown) of the rear bicycle hub 11 in a relatively conventional manner. Preferably, the bicycle hub engaging profile 165b is configured so that the rear sprocket assembly 112 can only fit on the freewheel in a single orientation.

As shown in FIG. 5 to 8, each of the sprocket arms 163b of the first layered member 142b has an axially projecting portion 166b and an axially recessed portion 168b. The axially projecting portions 166b and the axially recessed portions 168b are positioned radially inwardly from the inner periphery 138b of the sprocket body 132b. As shown in FIGS. 7 and 8, the axially projecting portions 166b of the sprocket Sb axially bulge away from the sprocket Sa on the first axial surface 152b side, which defines the axially recessed portions 168b of the sprocket Sb that are axially recessed away from the sprocket Sa on the second axial surface 154b side.

As shown in FIGS. 7 and 8, the axially projecting portions 166a of the sprocket Sa (e.g., one of the bicycle sprockets) mates with the axially recessed portion 168b of the sprocket Sb (e.g., an adjacent one of the bicycle sprockets) adjacent to the sprocket Sa (e.g., one of the bicycle sprockets) while the sprockets Sa and Sb (e.g., bicycle sprockets) are attached to each other. Specifically, in the illustrated embodiment, while the sprockets Sa and Sb are attached to each other, the center bosses 164a and 164b are concentrically aligned relative to each other. In the illustrated embodiment, the center bosses 164a and 164b are identically formed relative to each other for receiving the freewheel of the rear bicycle hub 11 therethrough. Furthermore, in the illustrated embodiment, an outer profile of each of the axially projecting portions 166a of the sprocket Sa is dimensioned to match with an inner profile of respective one of the axially recessed portions 168b of the sprocket Sb. Thus, the sprockets Sa and Sb are fittedly and detachably coupled to each other. Furthermore, an axial height of the axially projecting portion 166a of the sprocket Sa and an axial depth of the axially recessed portion 168b of the sprocket Sb are dimensioned such that the sprocket bodies 132a and 132b and the sprocket teeth 134a and 134b of the sprockets Sa and Sb are axially spaced from each other at a predetermined interval.

In the illustrated embodiment, the first layered member 142a of the sprocket Sa is integrally formed as a one-piece, unitary member, while the first layered member 142b of the sprocket Sb is integrally formed as a one-piece, unitary member. The first layered members 142a and 142b of the sprockets Sa and Sb have the sprocket support members 162a and 162b, respectively, which support the sprockets Sa and Sb on the rear bicycle hub 11. In other words, the sprocket support members 162a and 162b form a sprocket support member to which the sprockets Sa and Sb (e.g., bicycle sprockets) are mounted. Thus, in the illustrated embodiment, the bicycle sprocket assembly 112 has the sprockets Sa and Sb (e.g., a plurality of the bicycle sprockets), and the sprocket support members 162a and 162b (e.g., a sprocket support member) to which the sprockets Sa and Sb are mounted.

Figure 9:
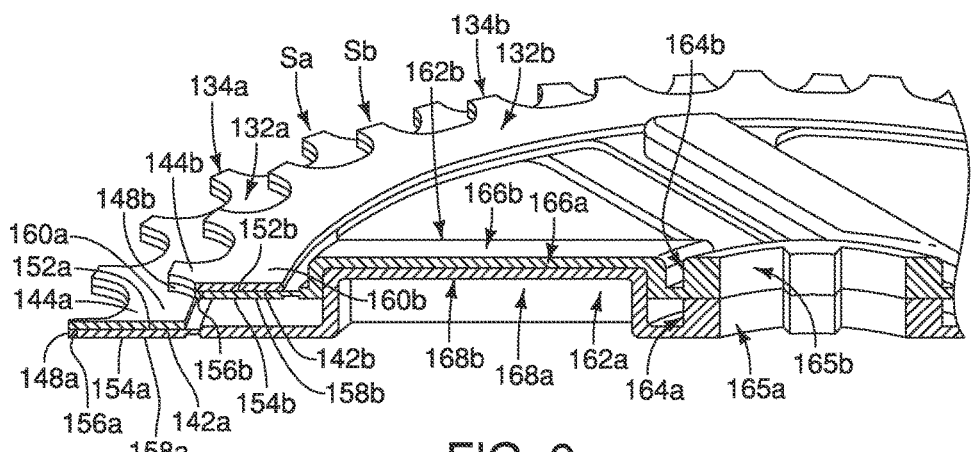
FIG. 9 is an enlarged, partial cross sectional view of a pair of modified bicycle sprockets in accordance with the second embodiment, the bicycle sprockets detachably coupled to each other.

In the illustrated embodiment, the sprockets Sa and Sb include the first layered members 142a and 142b, the second layered members 144a and 144b, the third layered members 146a and 146b, and the coating layers 148a and 148b, respectively. However, the multi-layered structure of the sprockets Sa and Sb are not limited to this. For example, the sprockets Sa and Sb can only include the first layered members 142a and 142b, the second layered members 144a and 144b and the third layered members 146a and 146b without the coating layers 148a and 148b, respectively. Furthermore, as illustrated in FIG. 9, the sprockets Sa and Sb can only include the first layered members 142a and 142b, the second layered members 144a and 144b and the coating layers 148a and 148b, without the third layered members 146a and 146b, respectively. Furthermore, the sprockets Sa and Sb can only include the first layered members 142a and 142b, the third layered members 146a and 146b and the coating layers 148a and 148b, without the second layered members 144a and 144b, respectively.

More specifically, as shown in FIG. 9, the sprocket body 132a and the sprocket teeth 134a (e.g., at least one of the sprocket teeth or the plurality of sprocket teeth) of the sprocket Sa includes the first layered member 142a and the second layered member 144a. Furthermore, as shown in FIG. 9, the sprocket teeth 134a further includes the coating layer 148a formed on the radially end surface 156a of the first layered member 142a. The first layered member 142a has the first axial surface 152a and the second axial surface 154a opposite to the first axial surface 152a. The second layered member 144a has a third axial surface 158a and a fourth axial surface 160a opposite to the third axial surface 158a. The third axial surface 158a of the second layered member 144a is attached to the first axial surface 152a of the first layered member 142a. In other words, the third axial surface 158a of the second layered member 144a directly contacts with and is directly attached to the first axial surface 152a of the first layered member 142a. The first and second layered members 142a and 144a overlap each other in the axial direction as viewed parallel to the rotational axis X1. The first and second layered members 142a and 144a do not overlap each other in the radial direction as viewed perpendicularly to the rotational axis X1. The second axial surface 154a of the first layered member 142a and the fourth axial surface 160a of the second layered member 144a are exposed. In other words, no layers are axially formed on the second axial surface 154a of the first layered member 142a and the fourth axial surface 160a of the second layered member 144a. In the illustrated embodiment, the first layered member 142a has a specific gravity that is less than that of the second layered member 144a. Each of the first and second layered members 142a and 144a has an axial thickness of preferably more than or equal to 0.1 mm. Other than the multi-layered structure at the sprocket body 132a and the sprocket teeth 134a, the sprocket Sa shown in FIG. 9 is identical to the sprocket Sa shown in FIGS. 4 to 8. Thus, the detailed configuration of the sprocket Sa will be omitted for the sake of brevity.

Similarly, as shown in FIG. 9, the sprocket body 132b and the sprocket teeth 134b (e.g., at least one of the sprocket teeth or the plurality of sprocket teeth) of the sprocket Sb includes the first layered member 142b and the second layered member 144b. Furthermore, as shown in FIG. 9, the sprocket teeth 134b further includes the coating layer 148b formed on the radially end surface 156b of the first layered member 142b. The first layered member 142b has the first axial surface 152b and the second axial surface 154b opposite to the first axial surface 152b. The second layered member 144b has a third axial surface 158b and a fourth axial surface 160b opposite to the third axial surface 158b. The third axial surface 158b of the second layered member 144b is attached to the first axial surface 152b of the first layered member 142b. In other words, the third axial surface 158b of the second layered member 144b directly contacts with and is directly attached to the first axial surface 152b of the first layered member 142b. The first and second layered members 142b and 144b overlap each other in the axial direction as viewed parallel to the rotational axis X1. The first and second layered members 142b and 144b do not overlap each other in the radial direction as viewed perpendicularly to the rotational axis X1. The second axial surface 154b of the first layered member 142b and the fourth axial surface 160b of the second layered member 144b are exposed. In other words, no layers are axially formed on the second axial surface 154b of the first layered member 142b and the fourth axial surface 160b of the second layered member 144b. In the illustrated embodiment, the first layered member 142b has a specific gravity that is less than that of the second layered member 144b. Each of the first and second layered members 142b and 144b has an axial thickness of preferably more than or equal to 0.1 mm. Other than the multi-layered structure at the sprocket body 132b and the sprocket teeth 134b, the sprocket Sb shown in FIG. 9 is identical to the sprocket Sb shown in FIGS. 4 to 8. Thus, the detailed configuration of the sprocket Sb will be omitted for the sake of brevity.

As shown in FIG. 9, the sprockets Sa and Sb includes the first layered members 142a and 142b, the second layered members 144a and 144b, and the coating layers 148a and 148b, respectively. However, the multi-layered structures of the sprockets Sa and Sb are not limited to this. The sprockets Sa and Sb can only include the first layered members 142a and 142b, the second layered members 144a and 144b without the coating layers 148a and 148b, respectively.

In the illustrated embodiment, as shown in FIGS. 4 to 9, the sprocket body 132a and the sprocket teeth 134a has the multi-layered structure. However, only the sprocket teeth 134a can have the multi-layered structure as shown in FIGS. 4 to 9. Furthermore, in the illustrated embodiment, all of the sprocket teeth 134a have the multi-layered structure as shown in FIGS. 4 to 9. However, only one(s) of the sprocket teeth 134a can have the multi-layered structure as shown in FIGS. 4 to 9. Similarly, in the illustrated embodiment, as shown in FIG. 4 to 9, the sprocket body 132b and the sprocket teeth 134b has the multi-layered structure. However, only the sprocket teeth 134b can have the multi-layered structure as shown in FIG. 4 to 9. Furthermore, in the illustrated embodiment, all of the sprocket teeth 134b have the multi-layered structure as shown in FIG. 4 to 9. However, only one(s) of the sprocket teeth 134b can have the multi-layered structure as shown in FIG. 4 to 9.

Figure 10:
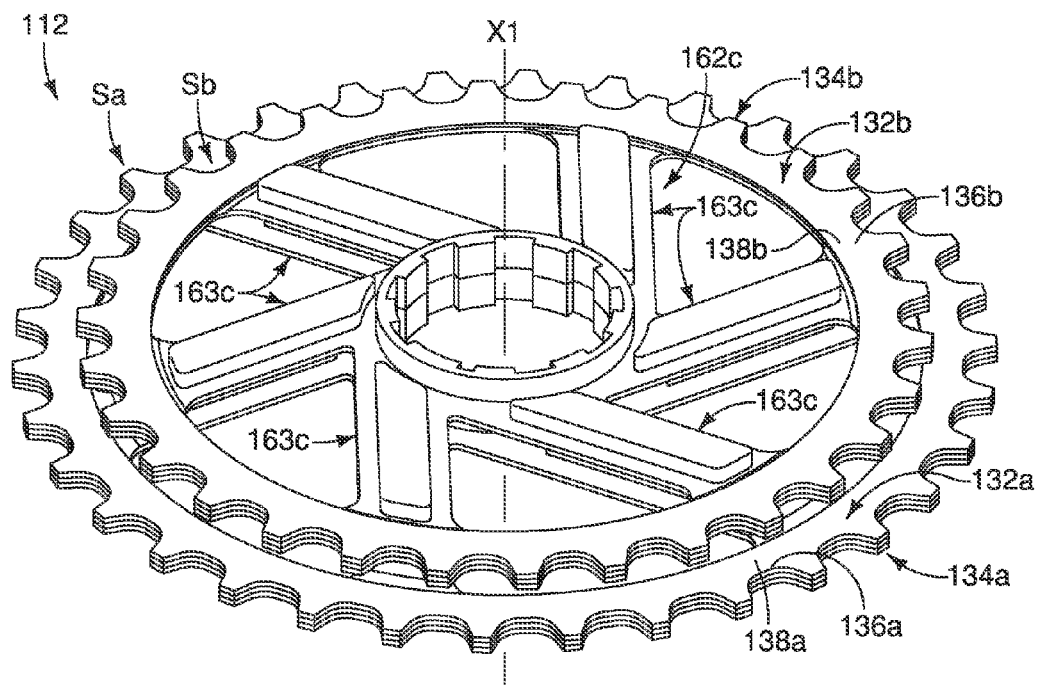
FIG. 10 is a perspective view of a pair of modified bicycle sprockets in accordance with the second embodiment, the bicycle sprockets non-detachably coupled to each other.
Figure 11:
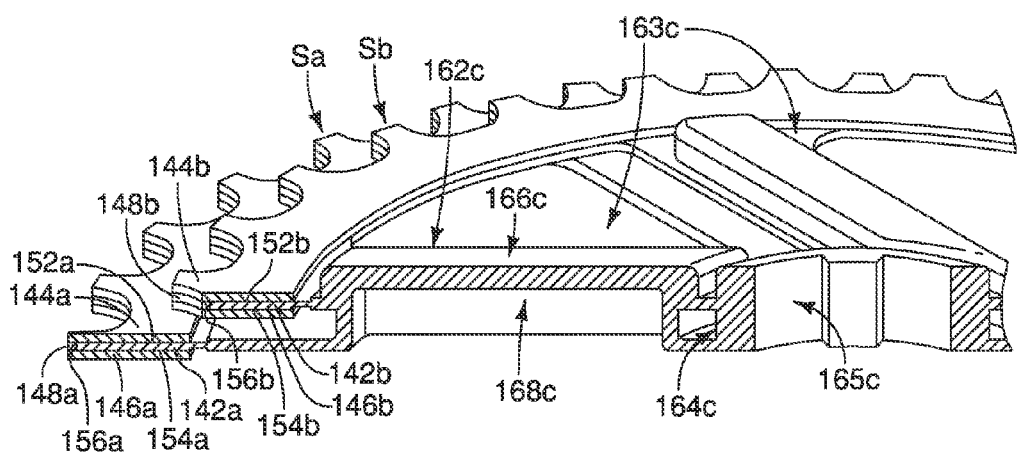
FIG. 11 is a cross sectional view of the bicycle sprockets illustrated in FIG. 10.

In the illustrated embodiment, as shown in FIGS. 4 to 8, the sprockets Sa and Sb are independently formed as separate members, and are detachably coupled to each other. However, the sprockets Sa and Sb can also be non-detachably coupled to each other. For example, as shown in FIGS. 10 and 11, the rear sprocket assembly 112 (e.g., a multiple sprocket assembly) includes the sprockets Sa and Sb (e.g., a plurality of the bicycle sprockets) and a sprocket support member 162c to which the sprockets Sa and Sb are mounted. In other words, in the illustrated embodiment, the sprockets Sa and Sb include the sprocket support member 162c as a common sprocket support member. The sprocket support member 162c has a unitary one-piece structure. In particular, in the illustrated embodiment, the sprocket support member 162c is identical to an integral combination of the sprocket support members 162a and 162b as shown in FIG. 7. In other words, in the illustrated embodiment, the sprockets Sa and Sb have the first layered members 142a and 142b that are integrally coupled to each other at the sprocket support member 162c. Furthermore, in the illustrated embodiment, the sprocket support member 162c has a plurality of (six in this embodiment) sprocket arms 163c radially connecting the inner peripheries 138a and 138b of the first layered members 142a and 142b to a center boss 164c. Specifically, in the illustrated embodiment, each of the sprocket arms 163c extends in a direction slanted relative to the radial direction of the rotational axis X1. The center boss 164c has a bicycle hub engaging profile 165c on an inner peripheral surface of the center boss 164c. In other words, the first layered members 142a and 142b have the bicycle hub engaging profile 165c at a location of a radially inner end of the sprocket support member 162c. The bicycle hub engaging profile 165c defines a plurality of engaging splines that is dimensioned to be non-rotatably engage with splines of the freewheel (not shown) of the rear bicycle hub 11 (FIG. 1) in a relatively conventional manner. Preferably, the bicycle hub engaging profile 165c is configured so that the rear sprocket assembly 112 can only fit on the freewheel in a single orientation.

Furthermore, as shown in FIG. 11, each of the sprocket arms 163c has an axially projecting portion 166c and an axially recessed portion 168c. The axially projecting portions 166c and the axially recessed portions 168c are positioned radially inwardly from the inner peripheries 138a and 138b of the sprocket bodies 132a and 132b. As shown in FIG. 11, the axially projecting portions 166c axially bulge towards a first axial side, which define the axially recessed portions 168c that are axially recessed towards the first axial side. Of course, it will be apparent to those skilled in the art from this disclosure that each of the sprocket arms 163c does not need to have the axially recessed portions 168c when the sprocket Sa is the largest sprocket of the rear sprocket assembly 112.

In the illustrated embodiment, the sprocket Sa is the largest sprocket of the rear sprocket assembly 112. However, any one(s) of adjacent pairs of the sprockets S of the rear sprocket assembly 112 can include the same configuration as the sprockets Sa and Sb. Moreover, any one(s) of adjacent pairs of chain wheels or front sprockets of the front sprocket assembly 22 (FIG. 1) can also include the same configuration as the sprockets Sa and Sb.

Third Embodiment

Referring now to FIGS. 12 to 15, a front sprocket assembly 222 (e.g., a multiple sprocket assembly) in accordance with a third embodiment will now be explained. The front sprocket assembly 222 is basically identical to the front sprocket assembly 22 shown in FIG. 1, except that a sprocket S of the front sprocket assembly 222 includes a multi-layered structure, as explained below.

In view of the similarity between the first and third embodiments, the parts of the third embodiment that are identical to the parts of the first embodiment will be given the same reference numerals as the parts of the first embodiment. Also, parts of this third embodiment that are functionally identical and/or substantially identical to parts of the first embodiment will be given the same reference numerals but with "200" added thereto. In any event, the descriptions of the parts of the third embodiment that are substantially identical to the parts of the first embodiment may be omitted for the sake of brevity. However, it will be apparent to those skilled in the art from this disclosure that the descriptions and illustrations of the first embodiment also apply to this third embodiment, except as discussed and/or illustrated herein.

In the illustrated embodiment, the sprocket S has a multi-layered structure, as described below. The sprocket S is fixedly coupled to a crank arm (not shown) in a conventional manner. As shown in FIGS. 12 to 15, the sprocket S basically includes a sprocket ring part 270, a body part 271 and a plurality of (e.g., four) attachment parts 272. Of course, it will be apparent to those skilled in the art from this disclosure that the number of the attachment parts 272 can be more than or less than four as needed and/or desired. The body part 271 is integrally formed onto the sprocket ring part 270 and the attachment parts 272 such that the sprocket ring part 270 and the attachment parts 272 are at least partially embedded within the body part 271. In the illustrated embodiment, the sprocket ring part 270 is made of titanium or stainless steel (SUS), while the body part 271 is made of synthetic resin. However, the sprocket ring part 270 can be made of the same material as the second layered member 44 or the third layered member 46 of the sprocket S in accordance with the first embodiment, while the body part 271 is made of the same material as the first layered member 42 of the sprocket S in accordance with the first embodiment. Thus, detailed description of the material of the sprocket ring part 270 and the body part 271 will be omitted for the sake of brevity.

Figure 12:
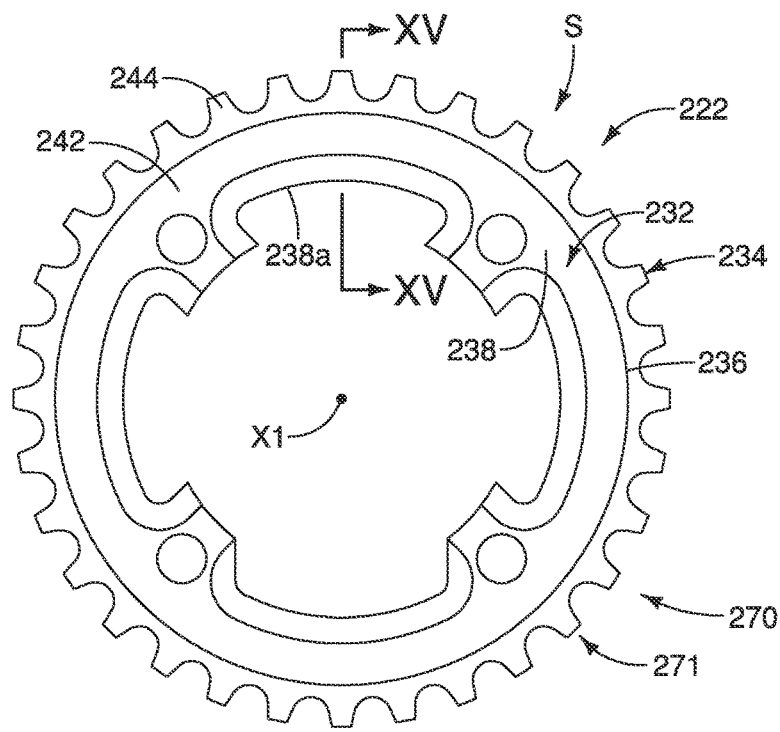
FIG. 12 is an outside elevational view of a bicycle sprocket in accordance with a third embodiment.
Figure 13:
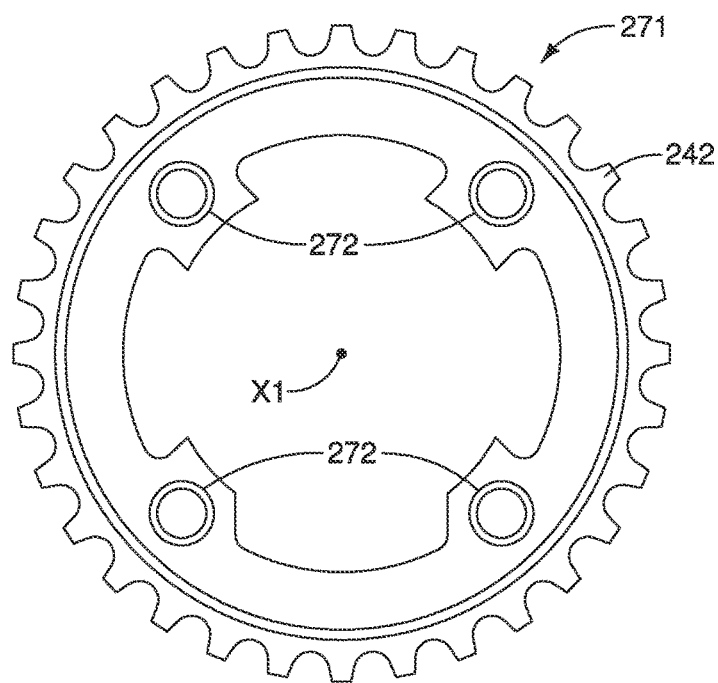
FIG. 13 is an inside elevational view of the bicycle sprocket illustrated in FIG. 12.

In the illustrated embodiment, the body part 271 is molded onto the sprocket ring part 270 and the attachment parts 272 by, for example, insert molding or outsert molding. In this embodiment, the attachment parts 272 are spaced radially inward of the sprocket ring part 270. More specifically, as shown in FIG. 12, the sprocket S (e.g., a bicycle sprocket) basically includes a sprocket body 232, and a plurality of sprocket teeth 234. The sprocket body 232 has a rotational axis X1. The sprocket body 232 includes an outer periphery 236 and an inner periphery 238. The inner periphery 238 defines an opening 238a for attaching the crank arm thereto. The sprocket teeth 234 extend radially outwardly from the outer periphery 236 of the sprocket body 232. In the illustrated embodiment, the sprocket body 232 is defined as a part of the sprocket S that is radially inwardly disposed with respect to an imaginary circle connecting innermost positions of gaps defined circumferentially between the sprocket teeth 234. The sprocket S is the largest sprocket of the front sprocket assembly 222. Thus, the total number of the sprocket teeth 234 is typically greater than the other sprockets of the front sprocket assembly 222. In the illustrated embodiment, as shown in FIG. 12, the total number of the sprocket teeth 234 is thirty-two. Of course, the total number of the sprocket teeth 234 can be different number as needed and/or desired.

Figure 15:
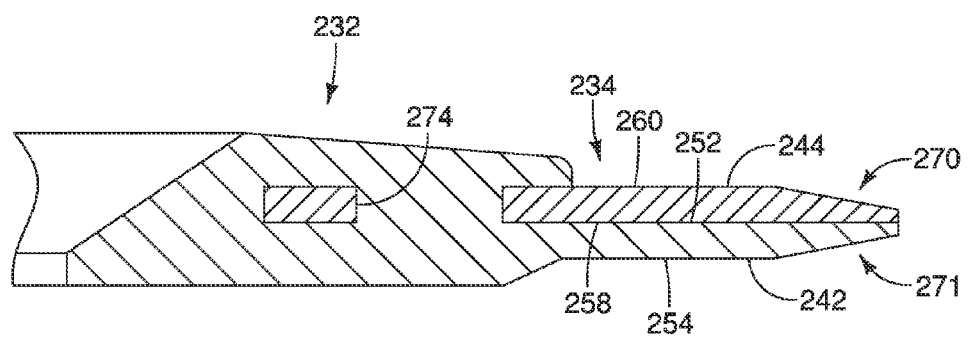
FIG. 15 is an enlarged, partial cross sectional view of the bicycle sprocket illustrated in FIG. 12 as seen along section line XV-XV.

In the illustrated embodiment, as shown in FIG. 15, the sprocket ring part 270 and the body part 271 form a multi-layered structure at the sprocket teeth 234 of the sprocket S. In particular, as shown in FIG. 15, the sprocket teeth 234 including a first layered member 242 and a second layered member 244. In the illustrated embodiment, the first layered member 242 is formed by the body part 271, while the second layered member 244 is formed by the sprocket ring part 270. Specifically, as shown in FIG. 15, the sprocket ring part 270 and the body part 271 are arranged such that they form the multi-layered structure with the first and second layered members 242 and 244 at the sprocket teeth 234 of the sprocket S, and such that the sprocket ring part 270 is embedded within the body part 271 at the sprocket body 232 of the sprocket S. In the illustrated embodiment, the sprocket ring part 270 radially inwardly extends with respect to the outer periphery 236 of the sprocket body 232. Thus, the sprocket body 232 of the sprocket S partially includes the multi-layered structure with the first and second layered members 242 and 244. In other words, in the illustrated embodiment, the sprocket body 232 also includes the first layered member 242 and the second layered member 244. The first layered member 242 has a first axial surface 252 and a second axial surface 254 opposite to the first axial surface 252. The second layered member 244 has a third axial surface 258 and a fourth axial surface 260 opposite to the third axial surface 258. The third axial surface 258 of the second layered member 244 is attached to the first axial surface 252 of the first layered member 242. In other words, the third axial surface 258 of the second layered member 244 directly contacts with and is directly attached to the first axial surface 252 of the first layered member 242. The first and second layered members 242 and 244 are attached with respect to each other in the same fixing manner as discussed in the first embodiment. The first and second layered members 242 and 244 overlap each other in the axial direction as viewed parallel to the rotational axis X1 at the sprocket teeth 234 of the sprocket S. The first and second layered members 242 and 244 do not overlap each other in the radial direction as viewed perpendicularly to the rotational axis X1 at the sprocket teeth 234 of the sprocket S. The second axial surface 254 of the first layered member 242 and the fourth axial surface 260 of the second layered member 244 are exposed. In other words, no layers are axially formed on the second axial surface 254 of the first layered member 242 and the fourth axial surface 260 of the second layered member 244. In the illustrated embodiment, the first layered member 242 has a specific gravity that is less than that of the second layered member 244. Each of the first and second layered members 242 and 244 has an axial thickness of preferably more than or equal to 0.1 mm.

Figure 14:
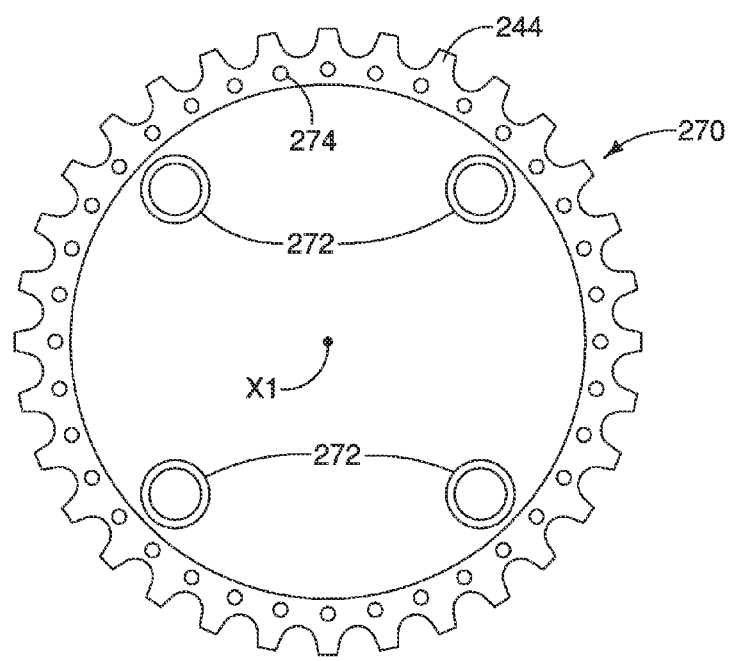
FIG. 14 is a second layered member of the bicycle sprocket illustrated in FIG. 12.

As shown in FIGS. 14 and 15, the sprocket ring part 270 has a plurality of through-holes 274 at the sprocket body 232 of the sprocket S. The through-holes 274 of the sprocket ring part 270 extend between the third and fourth axial surfaces 258 and 260. As shown in FIG. 15, the body part 271 extends through the through-holes 274 of the sprocket ring part 270. The through-holes 274 are formed preferably at equally spaced apart intervals in the circumferential direction of the sprocket ring part 270. These through-holes 274 act as anchor structures for facilitating the non-rotatable connection of the body part 271 to the sprocket ring part 270.

The attachment parts 272 are each formed as a separate member from the body part 271 and the sprocket ring part 270. The attachment parts 272 are at least partially embedded within the synthetic resin body part 271. In this embodiment, the attachment parts 272 are almost completely embedded within the body part 271. The attachment parts 272 are preferably one-piece, unitary members that are formed of a hard rigid material that is more rigid and/or harder than the synthetic resin body part 271. More preferably, the attachment parts 272 are formed of a material that is the same as the sprocket ring part 270.

In the illustrated embodiment, the sprocket S has a multi-layered structure with the first layered member 242 and the second layered member 244 at the sprocket teeth 234. However, the multi-layered structure of the sprocket S is not limited to this. For example, the sprocket teeth 234 can further include a coating layer. The coating layer of the sprocket teeth 234 can include an identical configuration to the coating layer 48 as shown in FIG. 3 or the coating layers 148a and 148b as shown in FIG. 9. Thus, detailed description of the coating layer will be omitted for the sake of brevity. The coating layer can be formed on a radially end surface of the first layered member 242.

Fourth Embodiment

Referring now to FIGS. 16 to 18A, a rear sprocket assembly 312 (e.g., a multiple sprocket assembly) in accordance with a fourth embodiment will now be explained. The rear sprocket assembly 312 is basically identical to the rear sprocket assembly 12 in accordance with the first embodiment, except for a configuration of a sprocket body 332, as explained below.

In view of the similarity between the first and fourth embodiments, the parts of the fourth embodiment that are identical to the parts of the first embodiment will be given the same reference numerals as the parts of the first embodiment. Also, parts of this fourth embodiment that are functionally identical and/or substantially identical to parts of the first embodiment will be given the same reference numerals but with "300" added thereto. In any event, the descriptions of the parts of the fourth embodiment that are substantially identical to the parts of the first embodiment may be omitted for the sake of brevity. However, it will be apparent to those skilled in the art from this disclosure that the descriptions and illustrations of the first embodiment also apply to this fourth embodiment, except as discussed and/or illustrated herein.

Figure 16:
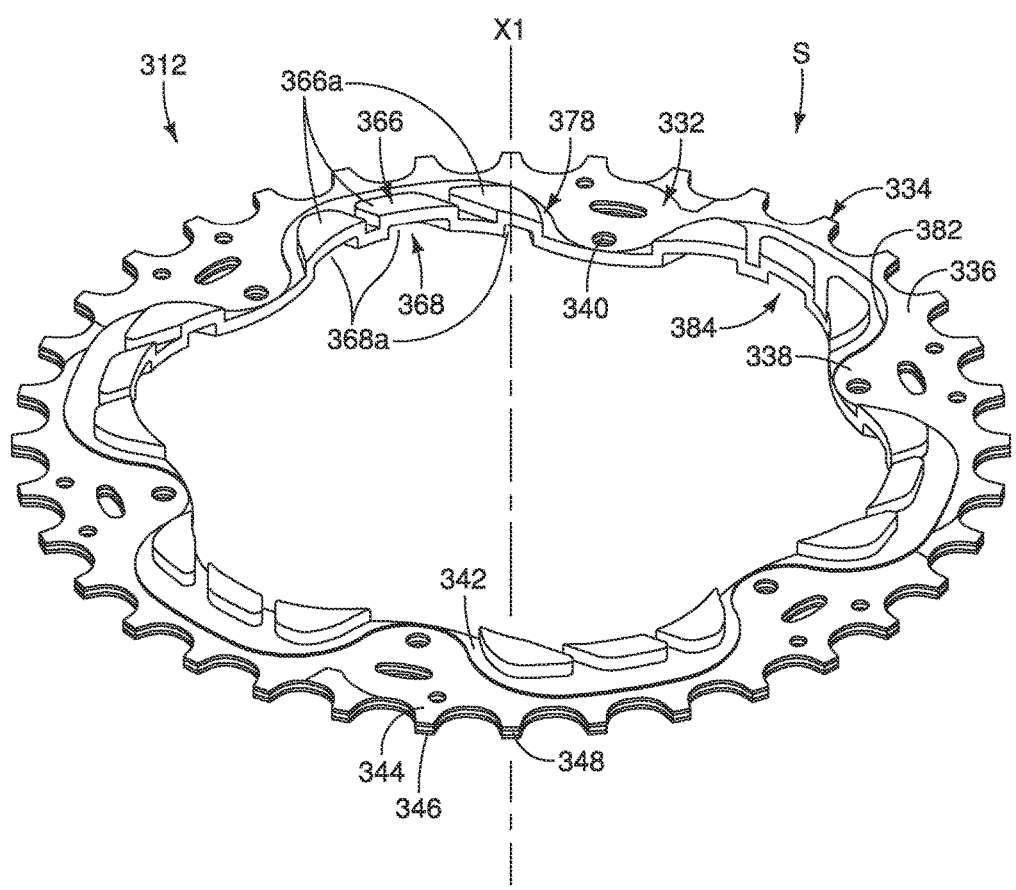
FIG. 16 is a perspective view of a bicycle sprocket in accordance with a fourth embodiment.

In the illustrated embodiment, a plurality of sprockets (e.g., a plurality of bicycle sprockets) of the rear sprocket assembly 312 includes a sprocket S with a multi-layered structure, as described below. Specifically, in the illustrated embodiment, as shown in FIG. 16, the sprocket S is the largest sprocket of the rear sprocket assembly 312. Of course, any one of the sprockets of the rear sprocket assembly 312 can have this multi-layered structure. For example, in the illustrated embodiment, an adjacent sprocket S' (e.g., an adjacent one of the bicycle sprockets) (FIG. 18B) adjacent to the sprocket S can also have this multi-layered structure. In the illustrated embodiment, since the sprocket S is the largest sprocket, the adjacent sprocket S' is the second largest sprocket of the rear sprocket assembly 312. On the other hand, in the illustrated embodiment, the other sprockets other than the sprockets S and S' can have any conventional configuration as needed and/or desired. For example, these sprockets other than the sprockets S and S' can be each formed as a one-piece, unitary member from a metallic material that is suitable for a bicycle sprocket such as an iron or an iron alloy. Furthermore, the configuration of the sprockets S and S' are basically identical to each other except for the dimensions of the sprockets S and S' and the number of sprocket teeth. Therefore, in the illustrated embodiment, the following disclosure will basically focus on the configuration of the sprocket S for the sake of brevity, and detailed description of the adjacent sprocket S' will be omitted for the sake of brevity.

Figure 17:
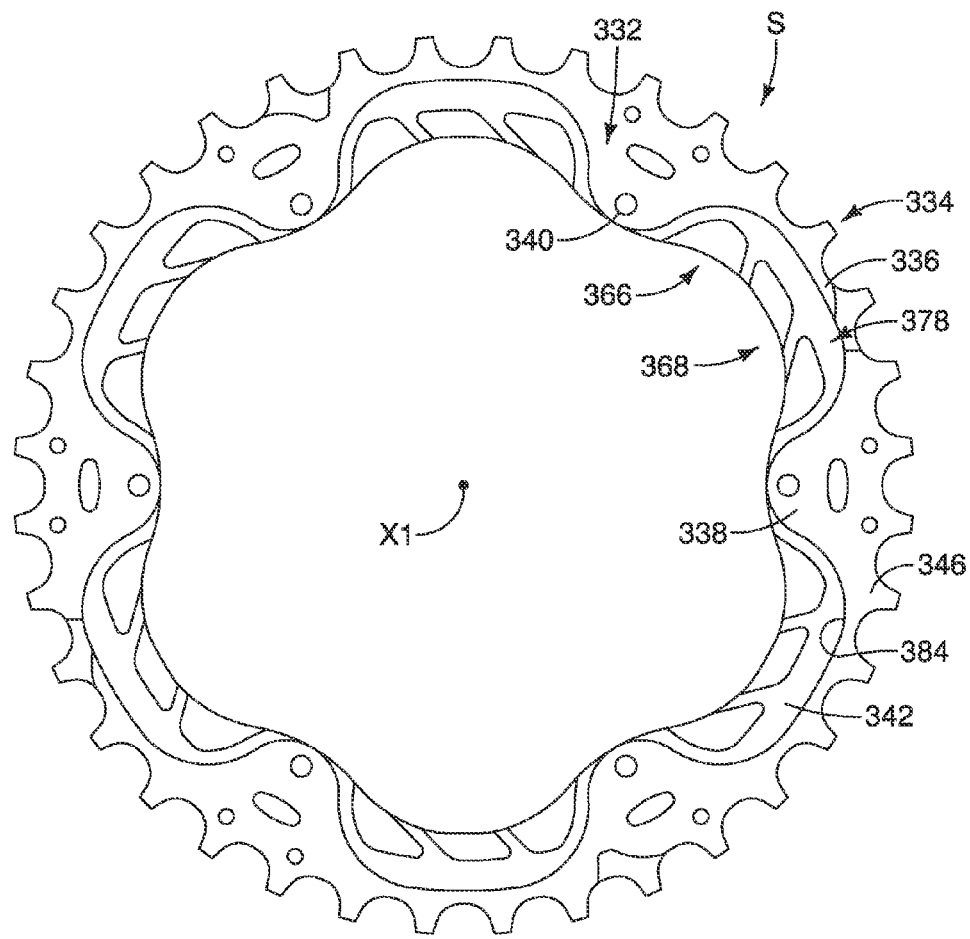
FIG. 17 is an inside elevational view of the bicycle sprocket illustrated in FIG. 16.

As shown in FIGS. 16 and 17, the sprocket S (e.g., a bicycle sprocket) basically includes a sprocket body 332, and a plurality of sprocket teeth 334. The sprocket body 332 has a rotational axis X1. The sprocket body 332 includes an outer periphery 336 and an inner periphery 338. The sprocket teeth 334 extend radially outwardly from the outer periphery 336 of the sprocket body 332. In the illustrated embodiment, the sprocket S is the largest sprocket of the rear sprocket assembly 312. As shown in FIGS. 16 and 17, the total number of the sprocket teeth 334 is thirty-six. Of course, the total number of the sprocket teeth can be different number as needed and/or desired.

In the illustrated embodiment, the sprocket S has a multi-layered structure. Specifically, as shown in FIGS. 16 to 18A, the sprocket S includes a first layered member 342, a second layered member 344, a third layered member 346, and a coating layer 348. In the illustrated embodiment, the first, second and third layered members 342, 344 and 346 extend radially outward from the inner periphery 338 of the sprocket body 332 to the sprocket teeth 334. The multi-layered structure of the sprocket S is basically identical to that of the sprocket S in accordance with the first embodiment, except that the sprocket body 332 has a plurality of (e.g., six) axially projecting portions 366 and a plurality of (e.g., six) axially recessed portions 368. Of course, it will be apparent to those skilled in the art from this disclosure that the number of the axially projecting portions 366 can be more than or less than six as needed and/or desired, and that the number of the axially recessed portions 368 can be more than or less than six as needed and/or desired. The axially projecting portions 366 and the axially recessed portion 368 are positioned at the sprocket body 332. In other words, the multi-layered structure of the sprocket teeth 334 of the sprocket S is identical to that of the sprocket S in accordance with the first embodiment. Specifically, the configurations of the first, second and third layered members 342, 344 and 346 and the coating layer 348 at the sprocket teeth 334 of the sprocket S are identical to those of the first, second and third layered members 42, 44 and 46 and the coating layer 48 at the sprocket teeth 34 of the sprocket S in accordance with the first embodiment. Furthermore, the materials of the first, second and third layered members 342, 344 and 346 and the coating layer 348 of the sprocket S are the same as those of the first, second and third layered members 42, 44 and 46 and the coating layer 48 of the sprocket S in accordance with the first embodiment, respectively. For example, the first layered member 342 has a specific gravity that is less than those of the second layered member 344 and the third layered member 346. Thus, the detailed description of the multi-layered structure of the sprocket S will be omitted for the sake of brevity. It will be apparent to those skilled in the art from this disclosure that the descriptions and illustrations of the parts of sprocket S in accordance with the first embodiment also apply to the parts of the sprocket S having the same name, except as discussed and/or illustrated herein.

Figure 18A:
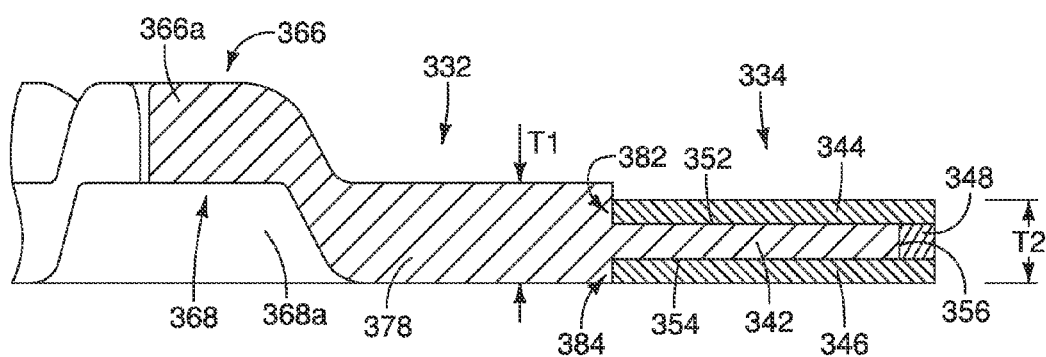
FIG. 18A is an enlarged, partial cross sectional view of the bicycle sprocket illustrated in FIG. 16.

As illustrated in FIG. 18A, the first layered member 342 has a first axial surface 352 and a second axial surface 354 opposite to the first axial surface 352. The second layered member 344 is attached to the first axial surface 352 of the first layered member 342. The third layered member 346 is attached to the second axial surface 354 of the first layered member 342. The coating layer 348 is formed on a radially end surface 356 of the first layered member 342. The first, second and third layered members 342, 344 and 346 and the coating layer 348 are attached with respect to each other in the same fixing manner as discussed in the first embodiment. Thus, the detailed description will be omitted for the sake of brevity.

In the illustrated embodiment, the first layered member 342 has a plurality of table portions 378. The table portions 378 are circumferentially spaced from each other at predetermined interval about the inner periphery 338 of the sprocket body 332. The axially projecting portions 366 and the axially recessed portions 368 are formed on the table portions 378, respectively. Specifically, each of the axially projecting portions 366 has a plurality of (e.g., three) projections 366a that is formed on one axial side of respective one of the table portions 378, while each of the axially recessed portions 368 has a plurality of (e.g., three) recesses 368a that is formed on the other axial side of the respective one of the table portions 378. In particular, as shown in FIG. 18A, each of the axially projecting portions 366 bulges towards the first axial surface 352 side at the respective one of the table portions 378, which defines the axially recessed portions 368 on the second axial surface 354 side at the respective one of the table portions 378. In the illustrated embodiment, the first layered member 342 is integrally formed as a one-piece, unitary member. Of course, it will be apparent to those skilled in the art from this disclosure that the number of the projections 366a of each of the axially projecting portions 366 can be more than or less than three as needed and/or desired, and that the number of the recesses 368a of each of the axially recessed portions 368 can be more than or less than three as needed and/or desired.

As shown in FIG. 18A, the first and second layered members 342 and 344 overlap each other in an axial direction as viewed parallel to the rotational axis X1. Specifically, the first and second layered members 342 and 344 overlap each other in the axial direction at an area except for the table portions 378. As shown in FIG. 18A, the table portions 378 are integrally formed with the first layered member 342 as a one-piece, unitary member. Thus, as shown in FIG. 16, the first layered member 342 is axially exposed at the table portions 378 through notches 382 of the second layered member 344 in the axial direction as viewed parallel to the rotational axis X1. Furthermore, as shown in FIG. 18A, the first and second layered members 342 and 344 do not overlap each other in a radial direction as viewed perpendicularly to the rotational axis X1 at least at the sprocket teeth 334 of the sprocket S. On the other hand, the first and third layered members 342 and 346 overlap each other in the axial direction as viewed parallel to the rotational axis X1. Specifically, the first and third layered members 342 and 346 overlap each other in the axial direction at an area except for the table portions 378. Furthermore, the first and third layered members 342 and 346 do not overlap each other in the radial direction as viewed perpendicularly to the rotational axis X1 at least at the sprocket teeth 334 of the sprocket S. As shown in FIG. 18A, the first layered member 342 is also axially exposed at the table portions 378 through notches 384 of the third layered member 346 in the axial direction as viewed parallel to the rotational axis X1. Thus, in the illustrated embodiment, the sprocket body 332 partially includes the first layered member 342, the second layered member 344 and the third layered member 346 at the area except for the table portions 378. In other words, as shown in FIG. 18A, the sprocket body 332 only includes the first layered member 342 at the table portions 378. In the illustrated embodiment, the axial dimension or thickness T1 of the first layered member 342 at the table portions 378 is larger than the axial dimension or thickness T2 of the sprocket teeth 334. Thus, as shown in FIG. 18A, the table portions 378 of the first layered member 342 radially contact with inner surfaces of the notches 382 of the second layered member 344 and inner surfaces of the notches 384 of the third layered member 346. Furthermore, in the illustrated embodiment, the second and third layered members 344 and 346 have an identical shape.

Figure 18B:
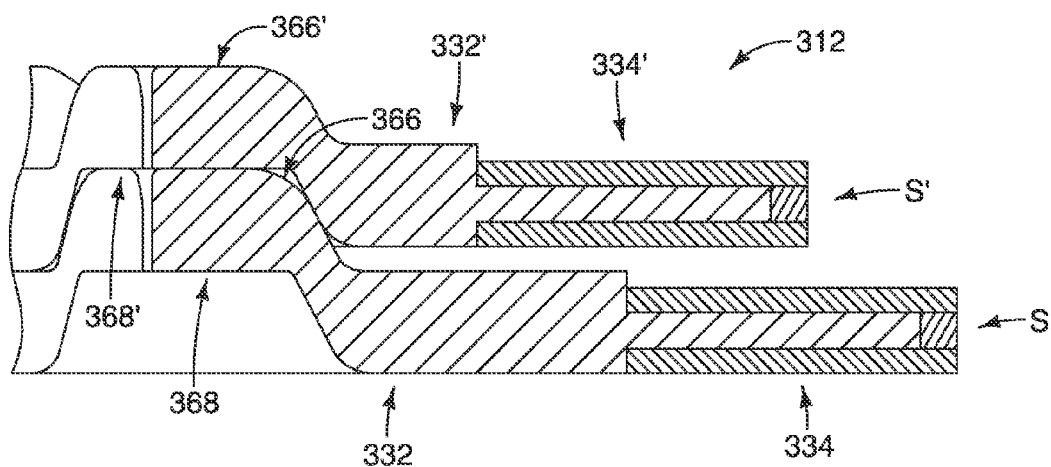
FIG. 18B is an enlarged, partial cross sectional view of the bicycle sprocket illustrated in FIG. 16, with the bicycle sprocket detachably coupled to an adjacent sprocket.

As shown in FIG. 18B, the rear sprocket assembly 312 includes the sprocket S and the adjacent sprocket S' (e.g., a plurality of bicycle sprockets). The sprocket S and the adjacent sprocket S' are detachably coupled to each other. Specifically, as shown in FIG. 18B, similar to the sprocket S, the adjacent sprocket S' has a plurality of axially projecting portions 366' and a plurality of axially recessed portions 368'. The axially projecting portions 366 of the sprocket S (e.g., one of the bicycle sprockets) mates with axially recessed portions 368' of the adjacent sprocket S' (e.g., an adjacent one of the bicycle sprockets) adjacent to the sprocket S (e.g., one of the bicycle sprockets) while the sprockets S and S' (e.g., bicycle sprockets) are attached to each other. Specifically, in the illustrated embodiment, an outer profile of each of the axially projecting portions 366 of the sprocket S is dimensioned to match with an inner profile of respective one of the axially recessed portions 368' of the adjacent sprocket S'. Thus, the sprockets S and S' are fittedly and detachably coupled to each other. Furthermore, an axial height of the axially projecting portion 366 of the sprocket S and an axial depth of the axially recessed portion 368' of the adjacent sprocket S' are dimensioned such that the sprocket bodies 332 and 332' and the sprocket teeth 334 and 334' of the sprockets S and S' are axially spaced from each other at a predetermined interval.

In the illustrated embodiment, the sprocket S includes the first layered member 342, the second layered member 344, the third layered member 346, and the coating layer 348. However, the multi-layered structure of the sprocket S is not limited to this. The sprocket S can only include the first layered member 342, the second layered member 344 and the third layered member 346 without the coating layer 348. Furthermore, the sprocket S can only include the first layered member 342, the second layered member 344 and the coating layer 348 without the third layered member 346. In this case, a third axial surface of the second layered member 344 is attached to the first axial surface 352 of the first layered member 342. However, the second axial surface 354 of the first layered member 342 and a fourth axial surface of the second layered member 344 that is opposite the third axial surface are exposed. Furthermore, the sprocket S can only include the first layered member 342, the third layered member 346 and the coating layer 348 without the second layered member 344. In this case, the first axial surface 352 of the first layered member 342 is axially exposed.

Fifth Embodiment

Figure 19:
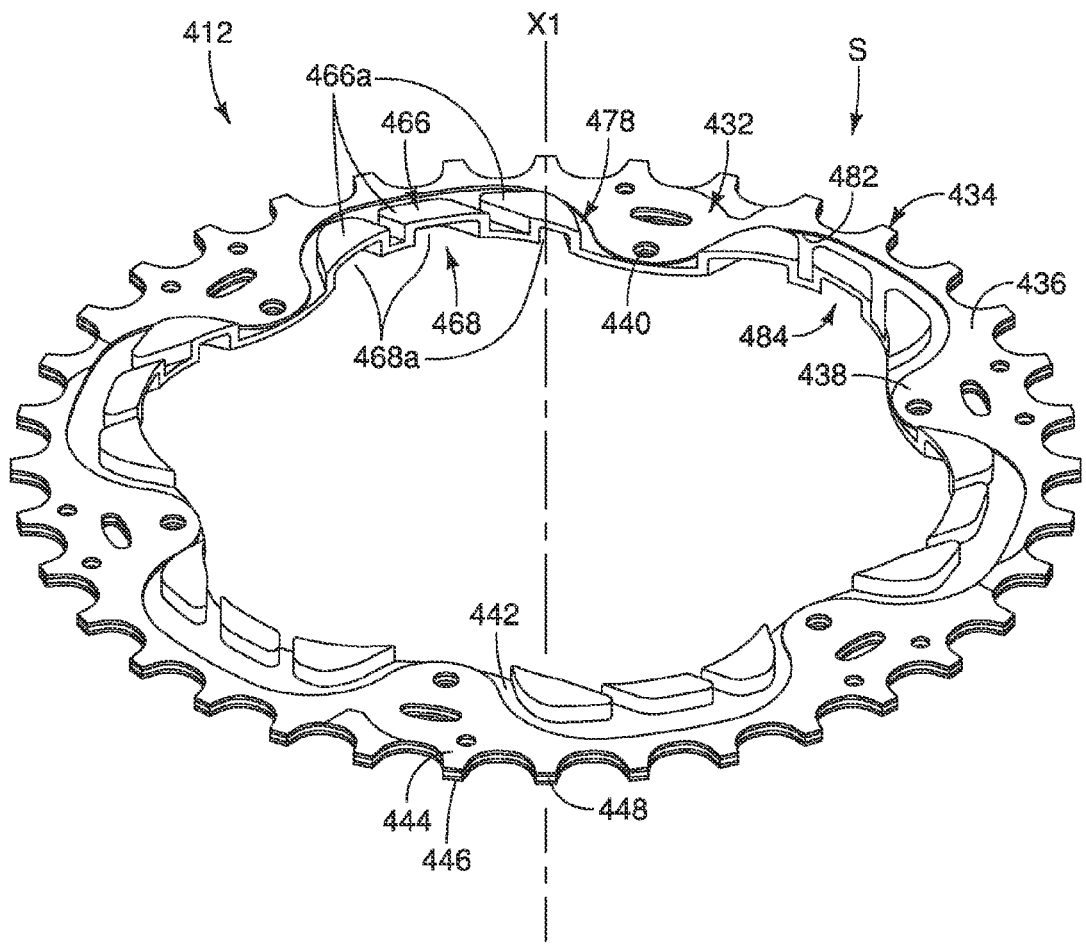
FIG. 19 is a perspective view of a bicycle sprocket in accordance with a fifth embodiment.
Figure 20:
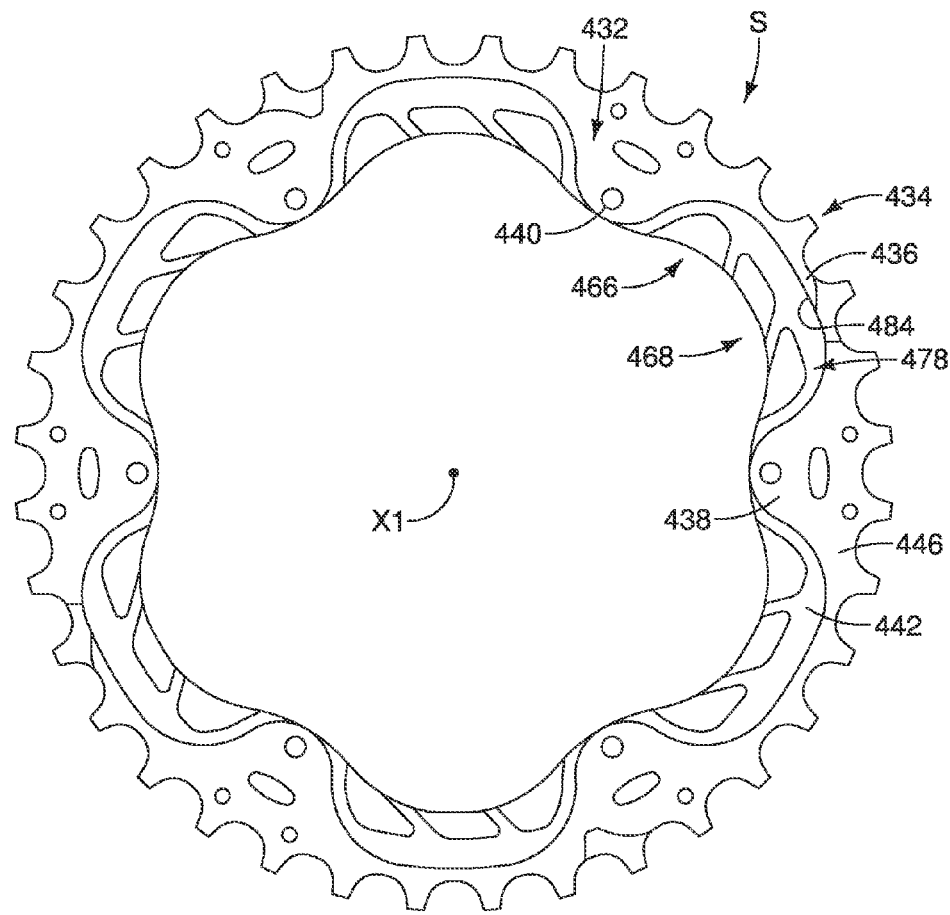
FIG. 20 is an inside elevational view of the bicycle sprocket illustrated in FIG. 19.
Figure 21:
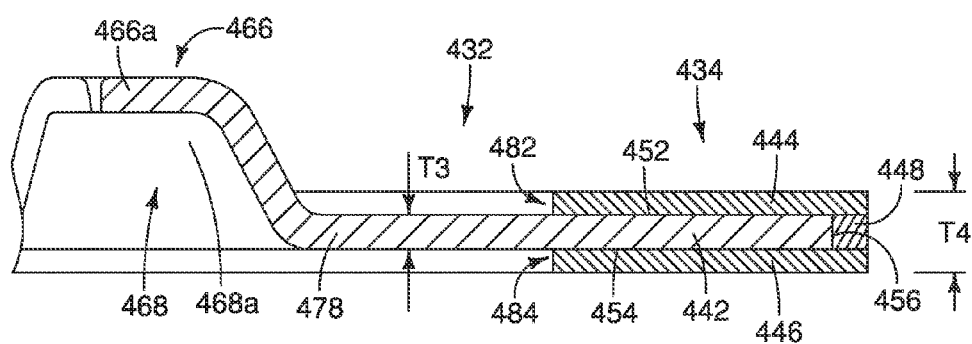
FIG. 21 is an enlarged, partial cross sectional view of the bicycle sprocket illustrated in FIG. 19.

Referring now to FIGS. 19 to 21, a rear sprocket assembly 412 (e.g., a multiple sprocket assembly) in accordance with a fifth embodiment will now be explained. The rear sprocket assembly 412 is basically identical to the rear sprocket assembly 12 in accordance with the first embodiment, except for a configuration of a sprocket body 432, as explained below.

In view of the similarity between the first and fifth embodiments, the parts of the fifth embodiment that are identical to the parts of the first embodiment will be given the same reference numerals as the parts of the first embodiment. Also, parts of this fifth embodiment that are functionally identical and/or substantially identical to parts of the first embodiment will be given the same reference numerals but with "400" added thereto. In any event, the descriptions of the parts of the fifth embodiment that are substantially identical to the parts of the first embodiment may be omitted for the sake of brevity. However, it will be apparent to those skilled in the art from this disclosure that the descriptions and illustrations of the first embodiment also apply to this fifth embodiment, except as discussed and/or illustrated herein.

In the illustrated embodiment, a plurality of sprockets (e.g., a plurality of bicycle sprockets) of the rear sprocket assembly 412 includes a sprocket S with a multi-layered structure, as described below. Specifically, in the illustrated embodiment, as shown in FIG. 19, the sprocket S is the largest sprocket of the rear sprocket assembly 412. Of course, any one of the sprockets of the rear sprocket assembly 412 can have this multi-layered structure. For example, in the illustrated embodiment, an adjacent sprocket (e.g., an adjacent one of the bicycle sprockets) adjacent to the sprocket S can also have this multi-layered structure. In the illustrated embodiment, since the sprocket S is the largest sprocket, the adjacent sprocket is the second largest sprocket of the rear sprocket assembly 412. On the other hand, in the illustrated embodiment, the other sprockets other than the sprocket S and the adjacent sprocket can have any conventional configuration as needed and/or desired. For example, these sprockets other than the sprocket S and the adjacent sprocket can be each formed as a one-piece, unitary member from a metallic material that is suitable for a bicycle sprocket such as an iron or an iron alloy. Furthermore, the configuration of the sprocket S and the adjacent sprocket are basically identical to each other except for the dimensions and the number of sprocket teeth. Therefore, in the illustrated embodiment, the following disclosure will basically focus on the configuration of the sprocket S for the sake of brevity, and detailed description of the adjacent sprocket will be omitted for the sake of brevity.

As shown in FIGS. 19 and 20, the sprocket S (e.g., a bicycle sprocket) basically includes a sprocket body 432, and a plurality of sprocket teeth 434. The sprocket body 432 has a rotational axis X1. The sprocket body 432 includes an outer periphery 436 and an inner periphery 438. The sprocket teeth 434 extend radially outwardly from the outer periphery 436 of the sprocket body 432. In the illustrated embodiment, the sprocket S is the largest sprocket of the rear sprocket assembly 412. As shown in FIGS. 19 and 20, the total number of the sprocket teeth 434 is thirty-six. Of course, the total number of the sprocket teeth can be different number as needed and/or desired.

In the illustrated embodiment, the sprocket S has a multi-layered structure. Specifically, as shown in FIGS. 19 to 21, the sprocket S includes a first layered member 442, a second layered member 444, a third layered member 446, and a coating layer 448. In the illustrated embodiment, the first, second and third layered members 442, 444 and 446 extend radially outward from the inner periphery 438 of the sprocket body 432 to the sprocket teeth 434. The multi-layered structure of the sprocket S is basically identical to that of the sprocket S in accordance with the first embodiment, except that the sprocket body 432 has a plurality of (e.g., six) axially projecting portions 466 and a plurality of (e.g., six) axially recessed portions 468. Of course, it will be apparent to those skilled in the art from this disclosure that the number of the axially projecting portions 466 can be more than or less than six as needed and/or desired, and that the number of the axially recessed portions 468 can be more than or less than six as needed and/or desired. The axially projecting portions 466 and the axially recessed portion 468 are positioned at the sprocket body 432. In other words, the multi-layered structure of the sprocket teeth 434 of the sprocket S is identical to that of the sprocket S in accordance with the first embodiment. Specifically, the configurations of the first, second and third layered members 442, 444 and 446 and the coating layer 448 at the sprocket teeth 434 of the sprocket S are identical to those of the first, second and third layered members 42, 44 and 46 and the coating layer 48 at the sprocket teeth 34 of the sprocket S in accordance with the first embodiment. Furthermore, the materials of the first, second and third layered members 442, 444 and 446 and the coating layer 448 of the sprocket S are same as those of the first, second and third layered members 42, 44 and 46 and the coating layer 48 of the sprocket S in accordance with the first embodiment, respectively. For example, the first layered member 442 has a specific gravity that is less than those of the second layered member 444 and the third layered member 446. Thus, the detailed description of the multi-layered structure of the sprocket S will be omitted for the sake of brevity. It will be apparent to those skilled in the art from this disclosure that the descriptions and illustrations of the parts of sprocket S in accordance with the first embodiment also apply to the parts of the sprocket S having the same name, except as discussed and/or illustrated herein.

As illustrated in FIG. 21, the first layered member 442 has a first axial surface 452 and a second axial surface 454 opposite to the first axial surface 452. The second layered member 444 is attached to the first axial surface 452 of the first layered member 442. The third layered member 446 is attached to the second axial surface 454 of the first layered member 442. The coating layer 448 is formed on a radially end surface 456 of the first layered member 442. The first, second and third layered members 442, 444 and 446 and the coating layer 448 are attached with respect to each other in the same fixing manner as discussed in the first embodiment. Thus, the detailed description will be omitted for the sake of brevity.

In the illustrated embodiment, the first layered member 442 has a plurality of table portions 478. The table portions 478 are circumferentially spaced from each other at predetermined interval about the inner periphery 438 of the sprocket body 432. The axially projecting portions 466 and the axially recessed portions 468 are formed on the table portions 478, respectively. Specifically, each of the axially projecting portions 466 has a plurality of (e.g., three) projections 466a that is formed on one axial side of respective one of the table portions 478, while each of the axially recessed portions 468 has a plurality of (e.g., three) recesses 468a that is formed on the other axial side of the respective one of the table portions 478. In particular, as shown in FIG. 21, each of the axially projecting portions 466 bulges towards the first axial surface 452 side at the respective one of the table portions 478, which defines the axially recessed portions 468 on the second axial surface 454 side at the respective one of the table portions 478. In the illustrated embodiment, the first layered member 442 is integrally formed as a one-piece, unitary member. Of course, it will be apparent to those skilled in the art from this disclosure that the number of the projections 466a of each of the axially projecting portions 466 can be more than or less than three as needed and/or desired, and that the number of the recesses 468a of each of the axially recessed portions 468 can be more than or less than three as needed and/or desired.

As shown in FIG. 21, the first and second layered members 442 and 444 overlap each other in an axial direction as viewed parallel to the rotational axis X1. Specifically, the first and second layered members 442 and 444 overlap each other in the axial direction at an area except for the table portions 478. As shown in FIG. 21, the table portions 478 are integrally formed with the first layered member 442 as a one-piece, unitary member. Thus, as shown in FIG. 19, the first layered member 442 is axially exposed at the table portions 478 through notches 482 of the second layered member 444 in the axial direction as viewed parallel to the rotational axis X1. Furthermore, as shown in FIG. 21, the first and second layered members 442 and 444 do not overlap each other in a radial direction as viewed perpendicularly to the rotational axis X1 at least at the sprocket teeth 434 of the sprocket S. On the other hand, the first and third layered members 442 and 446 overlap each other in the axial direction as viewed parallel to the rotational axis X1. Specifically, the first and third layered members 442 and 446 overlap each other in the axial direction at an area except for the table portions 478. Furthermore, the first and third layered members 442 and 446 do not overlap each other in the radial direction as viewed perpendicularly to the rotational axis X1 at least at the sprocket teeth 434 of the sprocket S. As shown in FIG. 21, the first layered member 442 is also axially exposed at the table portions 478 through notches 484 of the third layered member 446 in the axial direction as viewed parallel to the rotational axis X1. Thus, in the illustrated embodiment, the sprocket body 432 partially includes the first layered member 442, the second layered member 444 and the third layered member 446 at the area except for the table portions 478. In other words, as shown in FIG. 21, the sprocket body 432 only includes the first layered member 442 at the table portions 478. In the illustrated embodiment, the axial dimension or thickness T3 of the first layered member 442 at the table portions 478 is smaller than the axial dimension or thickness T4 of the sprocket teeth 434. Thus, as shown in FIG. 21, the table portions 478 of the first layered member 442 is axially recessed relative to the second layered member 444 and relative to the third layered member 446. Specifically, the table portions 478 have the same axial dimension T3 as the axial dimension or thickness of the first layered member 442 at the sprocket teeth 434. Furthermore, in the illustrated embodiment, the second and third layered members 444 and 446 have an identical shape.

As mentioned above, the rear sprocket assembly 412 includes the sprocket S and the adjacent sprocket (e.g., a plurality of bicycle sprockets). The sprocket S and the adjacent sprocket are detachably coupled to each other. Specifically, similar to the rear sprocket assembly 312 shown in FIG. 18B, the axially projecting portions 466 of the sprocket S (e.g., one of the bicycle sprockets) mates with axially recessed portions of the adjacent sprocket (e.g., an adjacent one of the bicycle sprockets) adjacent to the sprocket S (e.g., one of the bicycle sprockets) while the sprocket S and the adjacent sprocket (e.g., bicycle sprockets) are attached to each other. Specifically, in the illustrated embodiment, an outer profile of each of the axially projecting portions 466 of the sprocket S is dimensioned to match with an inner profile of respective one of the axially recessed portion of the adjacent sprocket. Thus, the sprocket S and the adjacent sprocket are fittedly and detachably coupled to each other. Furthermore, an axial height of the axially projecting portions 466 of the sprocket S and an axial depth of the axially recessed portions of the adjacent sprocket are dimensioned such that the sprocket S and the adjacent sprocket are axially spaced from each other at a predetermined interval.

In the illustrated embodiment, the sprocket S includes the first layered member 442, the second layered member 444, the third layered member 446, and the coating layer 448. However, the multi-layered structure of the sprocket S is not limited to this. The sprocket S can only include the first layered member 442, the second layered member 444 and the third layered member 446 without the coating layer 448. Furthermore, the sprocket S can only include the first layered member 442, the second layered member 444 and the coating layer 448 without the third layered member 446. In this case, a third axial surface of the second layered member 444 is attached to the first axial surface 452 of the first layered member 442. However, the second axial surface 454 of the first layered member 442 and a fourth axial surface of the second layered member 444 that is opposite the third axial surface are exposed. Furthermore, alternatively, the sprocket S can only include the first layered member 442, the third layered member 446 and the coating layer 448 without the second layered member 444. In this case, the first axial surface 452 of the first layered member 442 is axially exposed.

Sixth Embodiment

Figure 22:
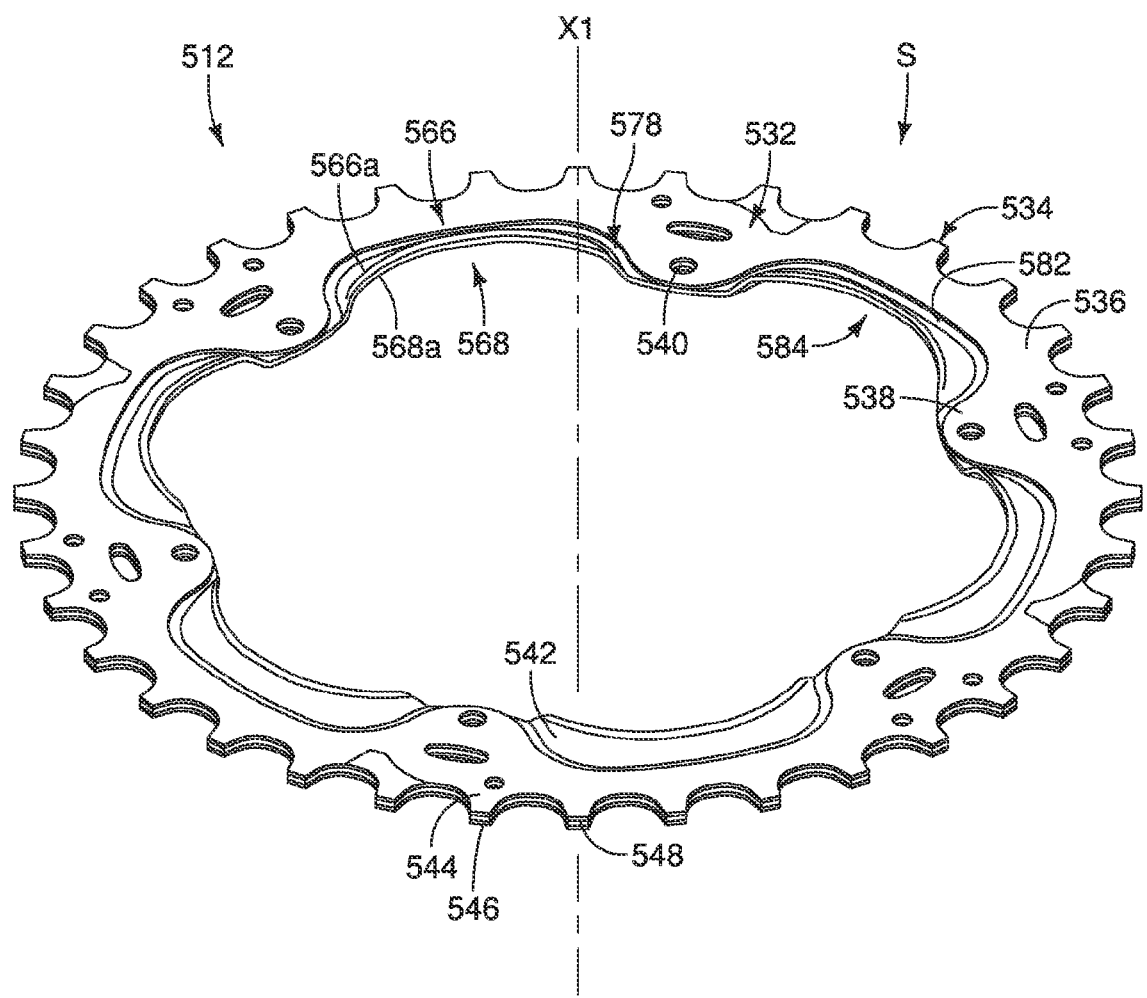
FIG. 22 is a perspective view of a bicycle sprocket in accordance with a sixth embodiment.
Figure 23:
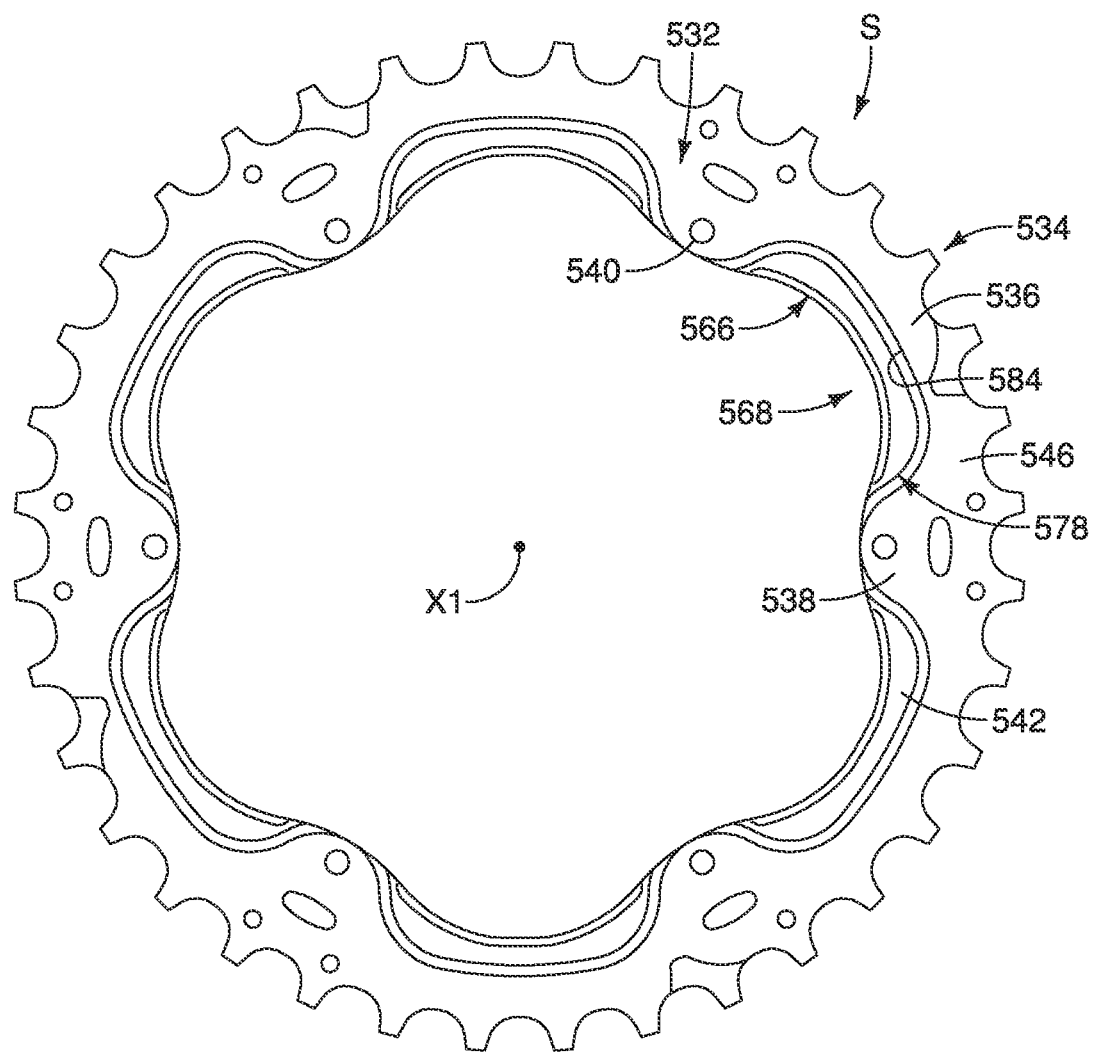
FIG. 23 is an inside elevational view of the bicycle sprocket illustrated in FIG. 22.

Referring now to FIGS. 22 and 23, a rear sprocket assembly 512 (e.g., a multiple sprocket assembly) in accordance with a sixth embodiment will now be explained. The rear sprocket assembly 512 is basically identical to the rear sprocket assembly 12 in accordance with the first embodiment, except for a configuration of a sprocket body 532, as explained below.

In view of the similarity between the first and sixth embodiments, the parts of the sixth embodiment that are identical to the parts of the first embodiment will be given the same reference numerals as the parts of the first embodiment. Also, parts of this sixth embodiment that are functionally identical and/or substantially identical to parts of the first embodiment will be given the same reference numerals but with "500" added thereto. In any event, the descriptions of the parts of the sixth embodiment that are substantially identical to the parts of the first embodiment may be omitted for the sake of brevity. However, it will be apparent to those skilled in the art from this disclosure that the descriptions and illustrations of the first embodiment also apply to this sixth embodiment, except as discussed and/or illustrated herein.

In the illustrated embodiment, a plurality of sprockets (e.g., a plurality of bicycle sprockets) of the rear sprocket assembly 512 includes a sprocket S with a multi-layered structure, as described below. Specifically, in the illustrated embodiment, as shown in FIG. 22, the sprocket S is the largest sprocket of the rear sprocket assembly 512. Of course, any one of the sprockets of the rear sprocket assembly 512 can have this multi-layered structure. For example, in the illustrated embodiment, an adjacent sprocket (e.g., an adjacent one of the bicycle sprockets) adjacent to the sprocket S can also have this multi-layered structure. In the illustrated embodiment, since the sprocket S is the largest sprocket, the adjacent sprocket is the second largest sprocket of the rear sprocket assembly 512. On the other hand, in the illustrated embodiment, the other sprockets other than the sprocket S and the adjacent sprocket can have any conventional configuration as needed and/or desired. For example, these sprockets other than the sprocket S and the adjacent sprocket can be each formed as a one-piece, unitary member from a metallic material that is suitable for a bicycle sprocket such as an iron or an iron alloy. Furthermore, the configuration of the sprocket S and the adjacent sprocket are basically identical to each other except for the dimensions and the number of sprocket teeth. Therefore, in the illustrated embodiment, the following disclosure will basically focus on the configuration of the sprocket S for the sake of brevity, and detailed description of the adjacent sprocket will be omitted for the sake of brevity.

As shown in FIGS. 22 and 23, the sprocket S (e.g., a bicycle sprocket) basically includes a sprocket body 532, and a plurality of sprocket teeth 534. The sprocket body 532 has a rotational axis X1. The sprocket body 532 includes an outer periphery 536 and an inner periphery 538. The sprocket teeth 534 extend radially outwardly from the outer periphery 536 of the sprocket body 532. In the illustrated embodiment, the sprocket S is the largest sprocket of the rear sprocket assembly 512. As shown in FIGS. 22 and 23, the total number of the sprocket teeth 534 is thirty-six. Of course, the total number of the sprocket teeth can be different number as needed and/or desired.

In the illustrated embodiment, the sprocket S has a multi-layered structure. Specifically, as shown in FIGS. 22 and 23, the sprocket S includes a first layered member 542, a second layered member 544, a third layered member 546, and a coating layer 548. In the illustrated embodiment, the first, second and third layered members 542, 544 and 546 extend radially outward from the inner periphery 538 of the sprocket body 532 to the sprocket teeth 534. The multi-layered structure of the sprocket S is basically identical to that of the sprocket S in accordance with the first embodiment, except that the sprocket body 532 has a plurality of (e.g., six) axially projecting portions 566 and a plurality of (e.g., six) axially recessed portions 568. Of course, it will be apparent to those skilled in the art from this disclosure that the number of the axially projecting portions 566 can be more than or less than six as needed and/or desired, and that the number of the axially recessed portions 568 can be more than or less than six as needed and/or desired. The axially projecting portions 566 and the axially recessed portions 568 are positioned at the sprocket body 532. In other words, the multi-layered structure of the sprocket teeth 534 of the sprocket S is identical to that of the sprocket S in accordance with the first embodiment. Specifically, the configurations of the first, second and third layered members 542, 544 and 546 and the coating layer 548 at the sprocket teeth 534 of the sprocket S are identical to those of the first, second and third layered members 42, 44 and 46 and the coating layer 48 at the sprocket teeth 34 of the sprocket S in accordance with the first embodiment. Furthermore, the materials of the first, second and third layered members 542, 544 and 546 and the coating layer 548 of the sprocket S are same as those of the first, second and third layered members 42, 44 and 46 and the coating layer 48 of the sprocket S in accordance with the first embodiment, respectively. For example, the first layered member 542 has a specific gravity that is less than those of the second layered member 544 and the third layered member 546. Thus, the detailed description of the multi-layered structure of the sprocket S will be omitted for the sake of brevity. It will be apparent to those skilled in the art from this disclosure that the descriptions and illustrations of the parts of sprocket S in accordance with the first embodiment also apply to the parts of the sprocket S having the same name, except as discussed and/or illustrated herein.

In the illustrated embodiment, the first layered member 542 has a first axial surface and a second axial surface opposite to the first axial surface. The second layered member 544 is attached to the first axial surface of the first layered member 542. The third layered member 546 is attached to the second axial surface of the first layered member 542. The coating layer 548 is formed on a radially end surface of the first layered member 542. The first, second and third layered members 542, 544 and 546 and the coating layer 548 are attached with respect to each other in the same fixing manner as discussed in the first embodiment. Thus, the detailed description will be omitted for the sake of brevity.

In the illustrated embodiment, the first layered member 542 has a plurality of (e.g., six) table portions 578. The table portions 578 are circumferentially spaced from each other at predetermined interval about the inner periphery 538 of the sprocket body 532. The axially projecting portions 566 and the axially recessed portions 568 are formed on the table portions 578, respectively. Specifically, each of the axially projecting portions 566 has a single projection 566a that is formed on one axial side of respective one of the table portions 578, while each of the axially recessed portions 568 has a single recess 568a that is formed on the other axial side of the respective one of the table portions 578. In particular, in the illustrated embodiment, each of the axially projecting portions 566 bulges towards the first axial surface side at the respective one of the table portions 578, which defines the axially recessed portions 568 on the second axial surface side at the respective one of the table portions 578. In the illustrated embodiment, the first layered member 542 is integrally formed as a one-piece, unitary member.

As shown in FIG. 22, the first and second layered members 542 and 544 overlap each other in an axial direction as viewed parallel to the rotational axis X1. Specifically, the first and second layered members 542 and 544 overlap each other in the axial direction at an area except for the table portions 578. As shown in FIG. 22, the table portions 578 are integrally formed with the first layered member 542 as a one-piece, unitary member. Thus, as shown in FIG. 22, the first layered member 542 is axially exposed at the table portions 578 through notches 582 of the second layered member 544 in the axial direction as viewed parallel to the rotational axis X1. Furthermore, in the illustrated embodiment, the first and second layered members 542 and 544 do not overlap each other in a radial direction as viewed perpendicularly to the rotational axis X1 at least at the sprocket teeth 534 of the sprocket S. On the other hand, as shown in FIG. 23, the first and third layered members 542 and 546 overlap each other in the axial direction as viewed parallel to the rotational axis X1. Specifically, the first and third layered members 542 and 546 overlap each other in the axial direction at an area except for the table portions 578. Furthermore, the first and third layered members 542 and 546 do not overlap each other in the radial direction as viewed perpendicularly to the rotational axis X1 at least at the sprocket teeth 534 of the sprocket S. As shown in FIG. 23, the first layered member 542 is also axially exposed at the table portions 578 through notches 584 of the third layered member 546 in the axial direction as viewed parallel to the rotational axis X1. Thus, in the illustrated embodiment, the sprocket body 532 partially includes the first layered member 542, the second layered member 544 and the third layered member 546 at the area except for the table portions 578. In other words, as shown in FIGS. 22 and 23, the sprocket body 532 only includes the first layered member 542 at the table portions 578. In the illustrated embodiment, the axial dimension or thickness of the first layered member 542 at the table portions 578 is smaller than the axial dimension or thickness of the sprocket teeth 534. Thus, as shown in FIGS. 22 and 23, the table portions 578 of the first layered member 542 is axially recessed relative to the second layered member 544 and relative to the third layered member 546. Specifically, the table portions 578 have the same axial dimension as the axial dimension or thickness of the first layered member 542 at the sprocket teeth 534. Furthermore, in the illustrated embodiment, the second and third layered members 544 and 546 have an identical shape.

As mentioned above, the rear sprocket assembly 512 includes the sprocket S and the adjacent sprocket (e.g., a plurality of bicycle sprockets). The sprocket S and the adjacent sprocket are detachably coupled to each other. Specifically, similar to the rear sprocket assembly 312 shown in FIG. 18B, the axially projecting portions 566 of the sprocket S (e.g., one of the bicycle sprockets) mates with axially recessed portions of the adjacent sprocket (e.g., an adjacent one of the bicycle sprockets) adjacent to the sprocket S (e.g., one of the bicycle sprockets) while the sprocket S and the adjacent sprocket (e.g., bicycle sprockets) are attached to each other. Specifically, in the illustrated embodiment, an outer profile of each of the axially projecting portions 566 of the sprocket S is dimensioned to match with an inner profile of respective one of the axially recessed portion of the adjacent sprocket. Thus, the sprocket S and the adjacent sprocket are fittedly and detachably coupled to each other. Furthermore, an axial height of the axially projecting portions 566 of the sprocket S and an axial depth of the axially recessed portions of the adjacent sprocket are dimensioned such that the sprocket S and the adjacent sprocket are axially spaced from each other at a predetermined interval.

In the illustrated embodiment, the sprocket S includes the first layered member 542, the second layered member 544, the third layered member 546, and the coating layer 548. However, the multi-layered structure of the sprocket S is not limited to this. The sprocket S can only include the first layered member 542, the second layered member 544 and the third layered member 546 without the coating layer 548. Furthermore, the sprocket S can only include the first layered member 542, the second layered member 544 and the coating layer 548 without the third layered member 546. In this case, a third axial surface of the second layered member 544 is attached to the first axial surface of the first layered member 542. However, the second axial surface of the first layered member 542 and a fourth axial surface of the second layered member 544 that is opposite the third axial surface are exposed. Furthermore, alternatively, the sprocket S can only include the first layered member 542, the third layered member 546 and the coating layer 548 without the second layered member 544. In this case, the first axial surface of the first layered member 542 is axially exposed.

Seventh Embodiment

Figure 24:
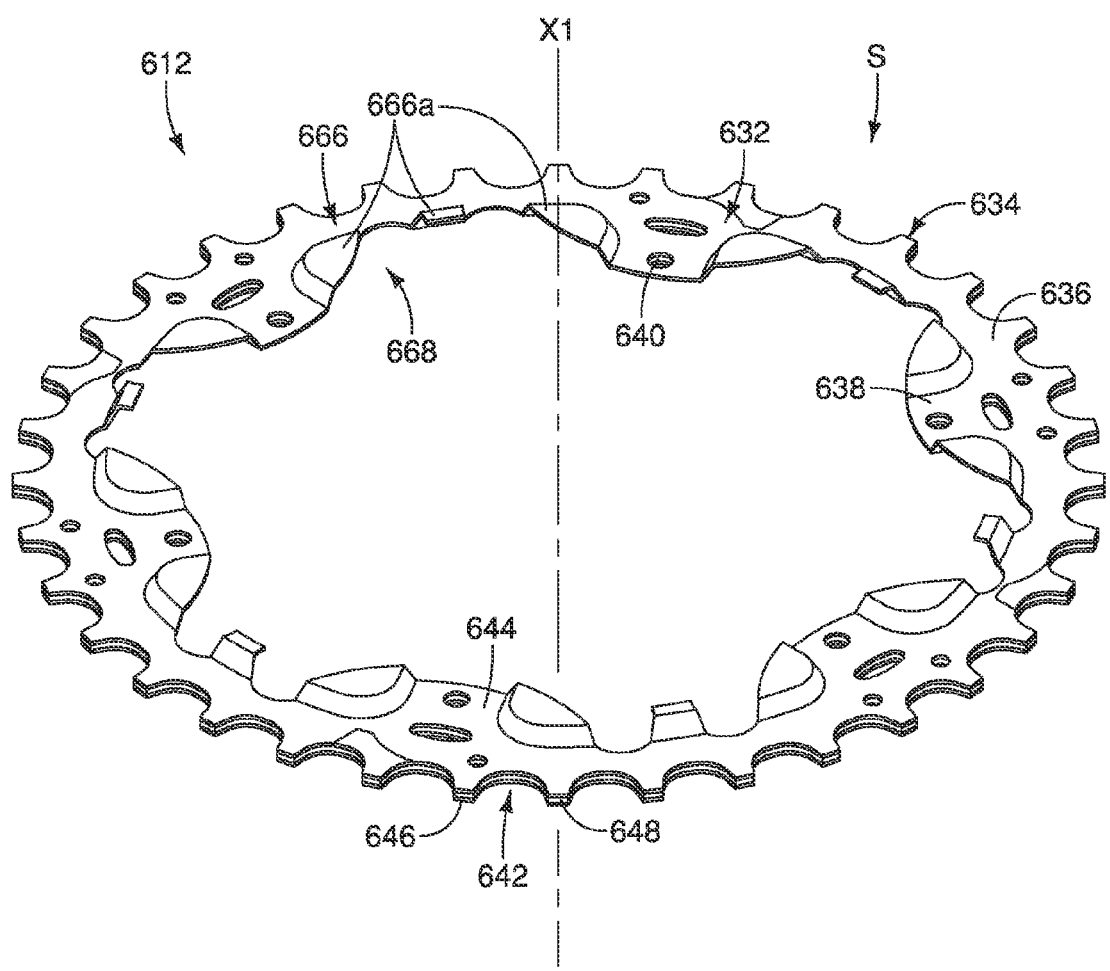
FIG. 24 is a perspective view of a bicycle sprocket in accordance with a seventh embodiment.
Figure 25:
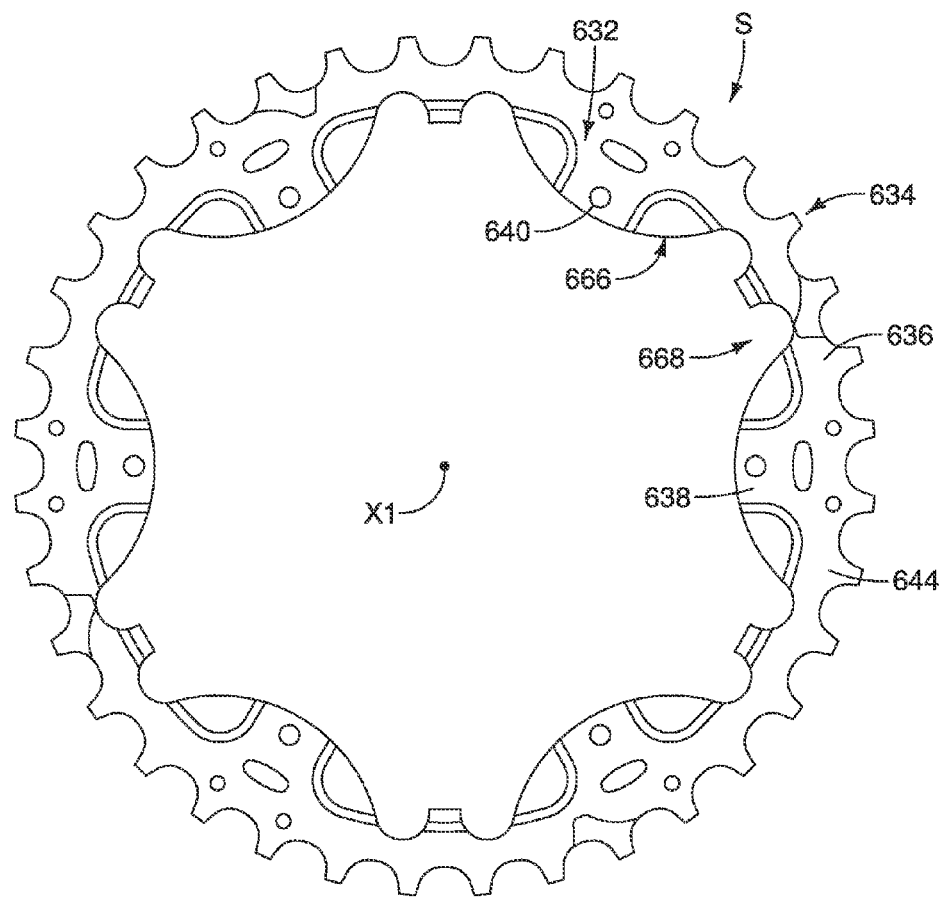
FIG. 25 is an inside elevational view of the bicycle sprocket illustrated in FIG. 24.
Figure 26:
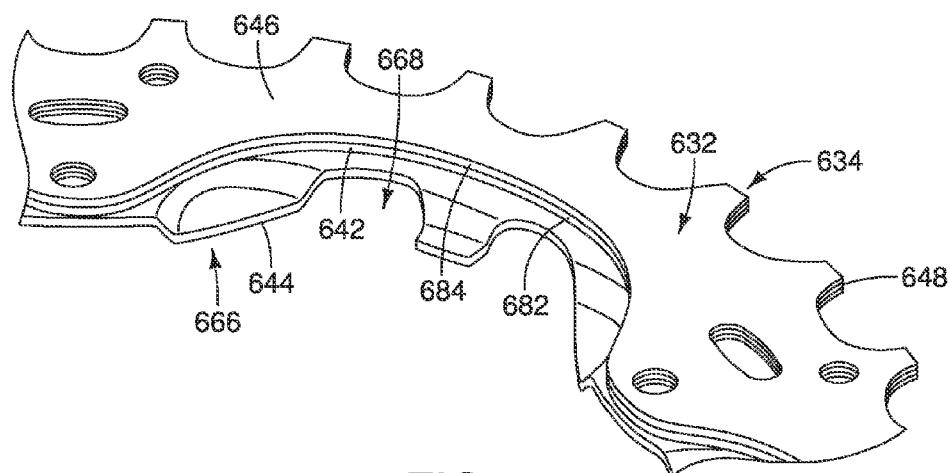
FIG. 26 is an enlarged, partial perspective view of the bicycle sprocket illustrated in FIG. 24.

Referring now to FIGS. 24 to 26, a rear sprocket assembly 612 (e.g., a multiple sprocket assembly) in accordance with a seventh embodiment will now be explained. The rear sprocket assembly 612 is basically identical to the rear sprocket assembly 12 in accordance with the first embodiment, except for a configuration of a sprocket body 632, as explained below.

In view of the similarity between the first and seventh embodiments, the parts of the seventh embodiment that are identical to the parts of the first embodiment will be given the same reference numerals as the parts of the first embodiment. Also, parts of this seventh embodiment that are functionally identical and/or substantially identical to parts of the first embodiment will be given the same reference numerals but with "600" added thereto. In any event, the descriptions of the parts of the seventh embodiment that are substantially identical to the parts of the first embodiment may be omitted for the sake of brevity. However, it will be apparent to those skilled in the art from this disclosure that the descriptions and illustrations of the first embodiment also apply to this seventh embodiment, except as discussed and/or illustrated herein.

In the illustrated embodiment, a plurality of sprockets (e.g., a plurality of bicycle sprockets) of the rear sprocket assembly 612 includes a sprocket S with a multi-layered structure, as described below. Specifically, in the illustrated embodiment, as shown in FIG. 24, the sprocket S is the largest sprocket of the rear sprocket assembly 612. Of course, any one of the sprockets of the rear sprocket assembly 612 can have this multi-layered structure. For example, in the illustrated embodiment, an adjacent sprocket (e.g., an adjacent one of the bicycle sprockets) adjacent to the sprocket S can also have this multi-layered structure. In the illustrated embodiment, since the sprocket S is the largest sprocket, the adjacent sprocket is the second largest sprocket of the rear sprocket assembly 612. On the other hand, in the illustrated embodiment, the other sprockets other than the sprocket S and the adjacent sprocket can have any conventional configuration as needed and/or desired. For example, these sprockets other than the sprocket S and the adjacent sprocket can be each formed as a one-piece, unitary member from a metallic material that is suitable for a bicycle sprocket such as an iron or an iron alloy. Furthermore, the configuration of the sprocket S and the adjacent sprocket are basically identical to each other except for the dimensions and the number of sprocket teeth. Therefore, in the illustrated embodiment, the following disclosure will basically focus on the configuration of the sprocket S for the sake of brevity, and detailed description of the adjacent sprocket will be omitted for the sake of brevity.

As shown in FIGS. 24 and 25, the sprocket S (e.g., a bicycle sprocket) basically includes a sprocket body 632, and a plurality of sprocket teeth 634. The sprocket body 632 has a rotational axis X1. The sprocket body 632 includes an outer periphery 636 and an inner periphery 638. The sprocket teeth 634 extend radially outwardly from the outer periphery 636 of the sprocket body 632. In the illustrated embodiment, the sprocket S is the largest sprocket of the rear sprocket assembly 612. As shown in FIGS. 24 and 25, the total number of the sprocket teeth 634 is thirty-six. Of course, the total number of the sprocket teeth can be different number as needed and/or desired.

In the illustrated embodiment, the sprocket S has a multi-layered structure. Specifically, as shown in FIGS. 24 to 26, the sprocket S includes a first layered member 642, a second layered member 644, a third layered member 646, and a coating layer 648. In the illustrated embodiment, the first, second and third layered members 642, 644 and 646 extend radially outward from the inner periphery 638 of the sprocket body 632 to the sprocket teeth 634. The multi-layered structure of the sprocket S is basically identical to that of the sprocket S in accordance with the first embodiment, except that the sprocket body 632 has a plurality of (e.g., six) axially projecting portions 666 and a plurality of (e.g., six) axially recessed portions 668. Of course, it will be apparent to those skilled in the art from this disclosure that the number of the axially projecting portions 666 can be more than or less than six as needed and/or desired, and that the number of the axially recessed portions 668 can be more than or less than six as needed and/or desired. The axially projecting portions 666 and the axially recessed portions 668 are positioned at the sprocket body 632. In other words, the multi-layered structure of the sprocket teeth 634 of the sprocket S is identical to that of the sprocket S in accordance with the first embodiment. Specifically, the configurations of the first, second and third layered members 642, 644 and 646 and the coating layer 648 at the sprocket teeth 634 of the sprocket S are identical to those of the first, second and third layered members 42, 44 and 46 and the coating layer 48 at the sprocket teeth 34 of the sprocket S in accordance with the first embodiment. Furthermore, the materials of the first, second and third layered members 642, 644 and 646 and the coating layer 648 of the sprocket S are same as those of the first, second and third layered members 42, 44 and 46 and the coating layer 48 of the sprocket S in accordance with the first embodiment, respectively. For example, the first layered member 642 has a specific gravity that is less than those of the second layered member 644 and the third layered member 646. Thus, the detailed description of the multi-layered structure of the sprocket S will be omitted for the sake of brevity. It will be apparent to those skilled in the art from this disclosure that the descriptions and illustrations of the parts of sprocket S in accordance with the first embodiment also apply to the parts of the sprocket S having the same name, except as discussed and/or illustrated herein.

In the illustrated embodiment, the first layered member 642 has a first axial surface and a second axial surface opposite to the first axial surface. The second layered member 644 is attached to the first axial surface of the first layered member 642. The third layered member 646 is attached to the second axial surface of the first layered member 642. The coating layer 648 is formed on a radially end surface of the first layered member 642. The first, second and third layered members 642, 644 and 646 and the coating layer 648 are attached with respect to each other in the same fixing manner as discussed in the first embodiment. Thus, the detailed description will be omitted for the sake of brevity.

As shown in FIG. 26, the first and third layered members 642 and 646 are generally a flat plate with planer opposite surfaces being planar between the inner periphery 638 of the sprocket body 632 to the sprocket teeth 634 other than various holes and recesses. On the other hand, the second layered member 644 has the axially projecting portions 666 and the axially recessed portions 668. The axially projecting portions 666 and the axially recessed portions 668 are formed at locations circumferentially spaced from each other at predetermined interval about the inner periphery 638 of the sprocket body 632. Each of the axially projecting portions 666 has a plurality of projections 666a that is formed on one axial side of the second layered member 644. The projections 666a of the axially projecting portions 666 define the axially recessed portions 668 on the other axial side of the second layered member 644. In particular, in the illustrated embodiment, as shown in FIG. 26, each of the axially projecting portions 666 bulges away from the first and third layered members 642 and 646, which defines the axially recessed portions 668 that are recessed away from the first and third layered members 642 and 646. In the illustrated embodiment, the second layered member 644 is integrally formed as a one-piece, unitary member.

As shown in FIG. 24 to 26, the first and second layered members 642 and 644 overlap each other in an axial direction as viewed parallel to the rotational axis X1. Furthermore, in the illustrated embodiment, the first and second layered members 642 and 644 do not overlap each other in a radial direction as viewed perpendicularly to the rotational axis X1. On the other hand, the first and third layered members 642 and 646 overlap each other in the axial direction as viewed parallel to the rotational axis X1. Furthermore, the first and third layered members 642 and 646 do not overlap each other in the radial direction as viewed perpendicularly to the rotational axis X1 at least at the sprocket teeth 634 of the sprocket S. As shown in FIG. 26, the first layered member 642 includes a plurality of (e.g., six) notches 682 that is circumferentially spaced from each other at predetermined interval about the inner periphery 638 of the sprocket body 632. Furthermore, the third layered member 646 includes a plurality of (e.g., six) notches 684 that is circumferentially spaced from each other at predetermined interval about the inner periphery 638 of the sprocket body 632. Of course, it will be apparent to those skilled in the art from this disclosure that the numbers of the notches 682 and 684 can be more than or less than six as needed and/or desired. The notches 682 of the first layered member 642 are formed at locations corresponding to the notches 684 of the third layered member 646. Specifically, in the illustrated embodiment, the first and third layered members 642 and 646 have an identical shape. Thus, inner surfaces of the axially recessed portions 668 of the second layered member 644 are axially exposed through the notches 682 of the first layered member 642 and through the notches 684 of the third layered member 646, respectively, in the axial direction as viewed parallel to the rotational axis X1. In other words, in the illustrated embodiment, the sprocket body 632 includes the first layered member 642, the second layered member 644 and the third layered member 646 at the area except for the axially recessed portions 668. Thus, as shown in FIGS. 24 to 26, the sprocket body 632 only includes the second layered member 644 at the axially recessed portions 668.

As mentioned above, the rear sprocket assembly 612 includes the sprocket S and the adjacent sprocket (e.g., a plurality of bicycle sprockets). The sprocket S and the adjacent sprocket are detachably coupled to each other. Specifically, similar to the rear sprocket assembly 312 shown in FIG. 18B, the axially projecting portions 666 of the sprocket S (e.g., one of the bicycle sprockets) mates with axially recessed portions of the adjacent sprocket (e.g., an adjacent one of the bicycle sprockets) adjacent to the sprocket S (e.g., one of the bicycle sprockets) while the sprocket S and the adjacent sprocket (e.g., bicycle sprockets) are attached to each other. Specifically, in the illustrated embodiment, an outer profile of each of the axially projecting portions 666 of the sprocket S is dimensioned to match with an inner profile of respective one of the axially recessed portion of the adjacent sprocket. Thus, the sprocket S and the adjacent sprocket are fittedly and detachably coupled to each other. Furthermore, an axial height of the axially projecting portions 666 of the sprocket S and an axial depth of the axially recessed portions of the adjacent sprocket are dimensioned such that the sprocket S and the adjacent sprocket are axially spaced from each other at a predetermined interval.

In the illustrated embodiment, the sprocket S includes the first layered member 642, the second layered member 644, the third layered member 646, and the coating layer 648. However, the multi-layered structure of the sprocket S is not limited to this. The sprocket S can only include the first layered member 642, the second layered member 644 and the third layered member 646 without the coating layer 648. Furthermore, the sprocket S can only include the first layered member 642, the second layered member 644 and the coating layer 648 without the third layered member 646. In this case, a third axial surface of the second layered member 644 is attached to the first axial surface of the first layered member 642. However, the second axial surface of the first layered member 642 and a fourth axial surface of the second layered member 644 that is opposite the third axial surface are exposed.

In the illustrated embodiment, the second layered member 644 has the axially projecting portions 666 and the axially recessed portions 668. However, alternatively, the third layered member 646 can have the axially projecting portions and the axially recessed portions. In this case, the axially projecting portions of the third layered member extend through the notches of the first and second layered members 642 and 644, respectively, and protrude beyond the second layered member 644.

Eighth Embodiment

Figure 27:
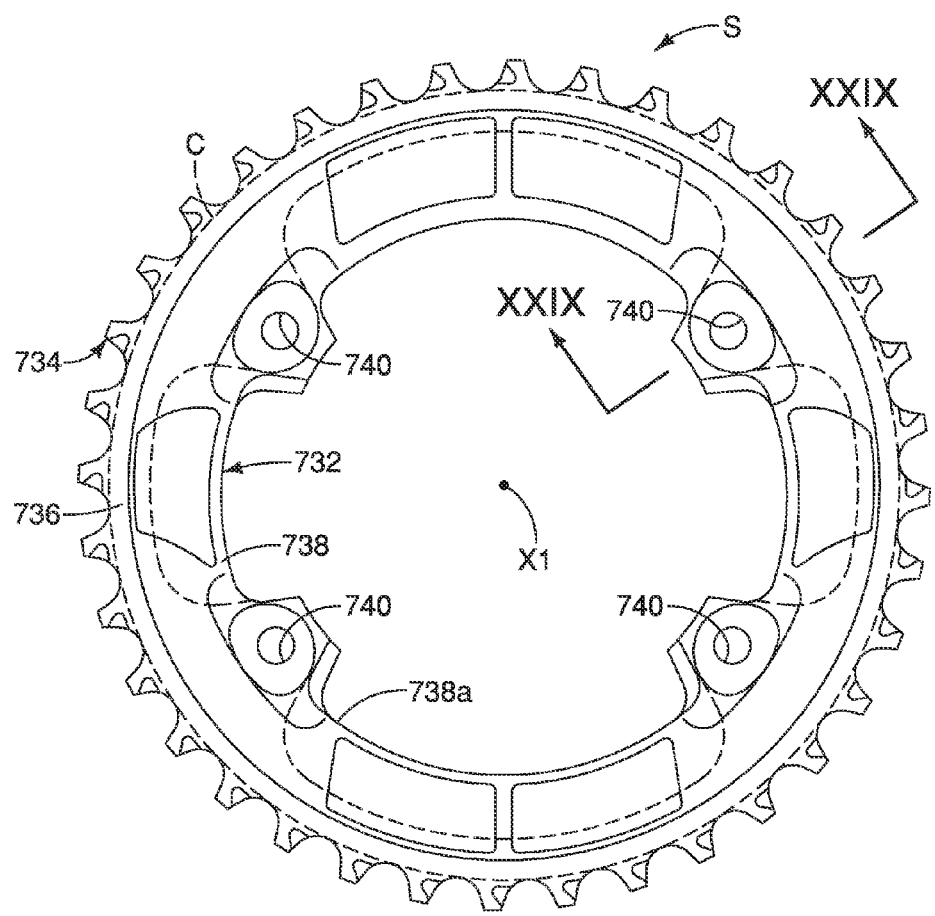
FIG. 27 is a side elevational view of a bicycle sprocket in accordance with an eighth embodiment.
Figure 28:
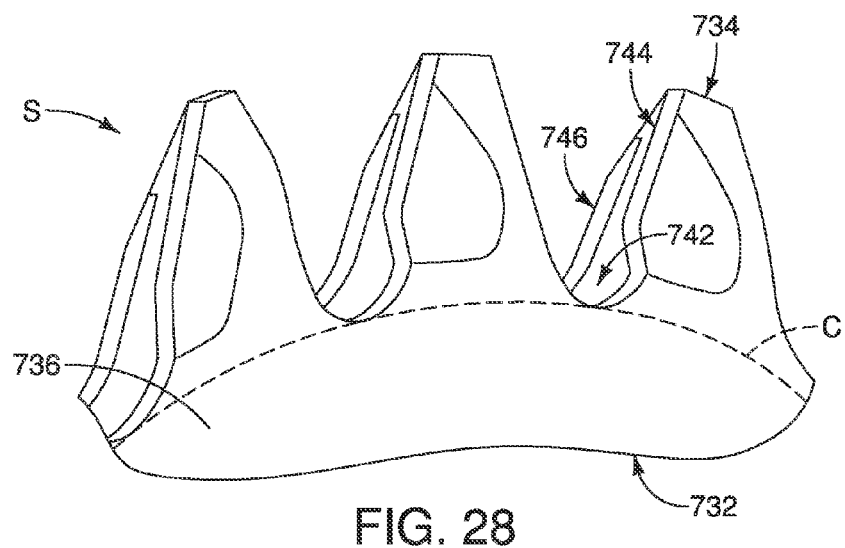
FIG. 28 is an enlarged, partial perspective view of the bicycle sprocket in illustrated in FIG. 27.

Referring now to FIGS. 27 to 31, a front sprocket S is illustrated in accordance with an eighth embodiment. As shown in FIG. 27, the sprocket S (e.g., a bicycle sprocket) basically includes a sprocket body 732, and a plurality of sprocket teeth 734. The sprocket body 732 has a rotational axis X1. The sprocket body 732 includes an outer periphery 736 and an inner periphery 738. Similar to the prior embodiments, the front sprocket S of FIGS. 27 to 31 has a multi-layered structure. The front sprocket S of FIGS. 27 to 31 can be part of a crank arm assembly.

The inner periphery 738 defines an opening 738a. In the eighth embodiment, the sprocket body 732 includes a plurality of fastener holes 740 for attaching the sprocket S to a crank arm. The sprocket teeth 734 extend radially outwardly from the outer periphery 736 of the sprocket body 732. In the eighth embodiment, the sprocket body 732 is defined as a part of the sprocket S that is radially inwardly disposed with respect to an imaginary circle C (i.e., the root circle) connecting innermost positions of gaps circumferentially disposed between the sprocket teeth 734.

In the eighth embodiment, as shown in FIG. 27, the total number of the sprocket teeth 734 is thirty-six. Of course, the total number of the sprocket teeth 734 can be larger or smaller than thirty-six as needed and/or desired. Moreover, any one of a rear sprocket of the rear sprocket assembly can also include the same configuration as the sprocket S illustrated in FIGS. 27 to 31.

Figure 29:
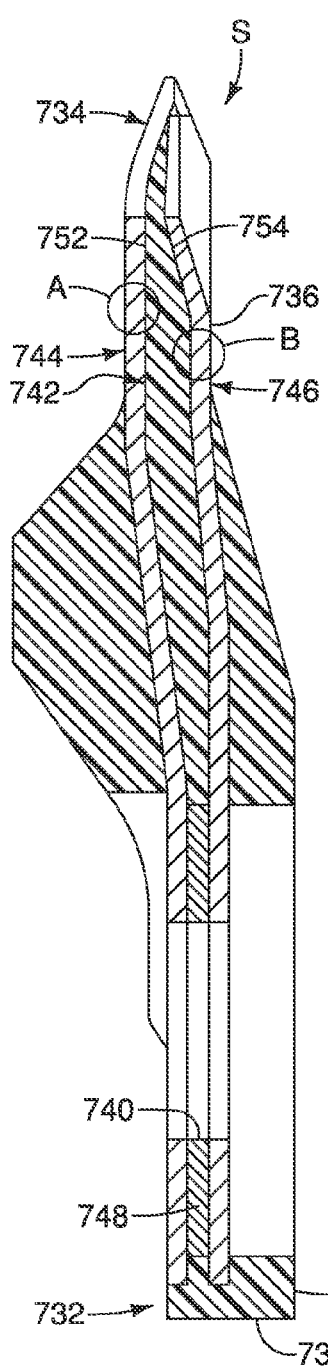
FIG. 29 is a partial cross sectional profile view of a portion of the bicycle sprocket illustrated in FIG. 27 as seen along section line XXIX-XXIX.

In the eighth embodiment, as shown in FIGS. 28 to 31, the sprocket S includes a first layered member 742, a second layered member 744 and a third layered member 746. Preferably, a metallic reinforcement member 748 is provided around each of the fastener holes 740 as seen in FIG. 29. The metallic reinforcement members 748 are disposed between the second and third layered members 744 and 746. The first layered member 742 surrounds the metallic reinforcement members 748 for retaining the metallic reinforcement members 748 in place.

In the eighth embodiment, the first, second and third layered members 742, 744 and 746 extend radially outwardly from the inner periphery 738 of the sprocket body 732 to the sprocket teeth 734. Thus, in the eighth embodiment, all of the sprocket teeth 734 include the first layered member 742 and the second layered member 744. In the eighth embodiment, all of the sprocket teeth 734 further include the third layered member 746. Alternatively or optionally, at least one (e.g., not all) of the sprocket teeth 734 can include the first layered member 742 and the second layered member 744. Likewise, the at least one of the sprocket teeth 734 can also include the third layered member 746. On the other hand, in the eighth embodiment, the sprocket body 732 includes the first layered member 742 and the second layered member 744. Furthermore, the sprocket body 732 includes the third layered member 746. Specifically, in the illustrated embodiment, the first, second and third layered members 742, 744 and 746 radially extend between the inner periphery 738 of the sprocket body 732 and the outer periphery 736 of the sprocket body 732 other than various holes and recesses.

As shown in FIG. 29, the first layered member 742 has a first axial surface 752 and a second axial surface 754 opposite to the first axial surface 752 with respect to the rotational axis X1. The second layered member 744 is attached to the first axial surface 752 of the first layered member 742. The third layered member 746 is attached to the second axial surface 754 of the first layered member 742. In the eighth embodiment, the first, second and third layered members 742, 744 and 746 overlap each other in an axial direction as viewed parallel to the rotational axis X1, while the second and third layered members 744 and 746 do not overlap each other in a radial direction as viewed perpendicularly to the rotational axis X1. In the eighth embodiment, the first layered member 742 is partially exposed with respect to the second and third layered members 744 and 746 in the axial direction. Notwithstanding, the first layered member 742 can be completely covered by the second and third layered members 744 and 746 in the axial direction.

The first layered member 742 has an axial thickness of preferably more than or equal to 0.1 mm. The first layered member 742 has a specific gravity that is less than that of the second and third layered members 744 and 746. The first layered member 742 is made of non-metallic material. Specifically, the non-metallic material of the first layered member 742 can includes resin. For example, the first layered member 742 can be made of a hard plastic resin. Alternatively, the non-metallic material of the first layered member 742 can be a fiber-reinforced resin. For example, the first layered member 742 can be made of a carbon fiber-reinforced plastic or polymer (FRP).

Each of the second and third layered members 744 and 746 has an axial thickness of preferably more than or equal to 0.1 mm. The second and third layered members 744 and 746 are made of metallic material such as a stainless steel alloy, a titanium alloy or an aluminum alloy. Of course, the second and third layered members 744 and 746 can be made of other metallic material such as iron. Preferably, in the eighth embodiment, the second and third layered members 744 and 746 are made of the same material. However, of course, the second and third layered members 744 and 746 can be made of different materials as needed and/or desired.

Figure 30:
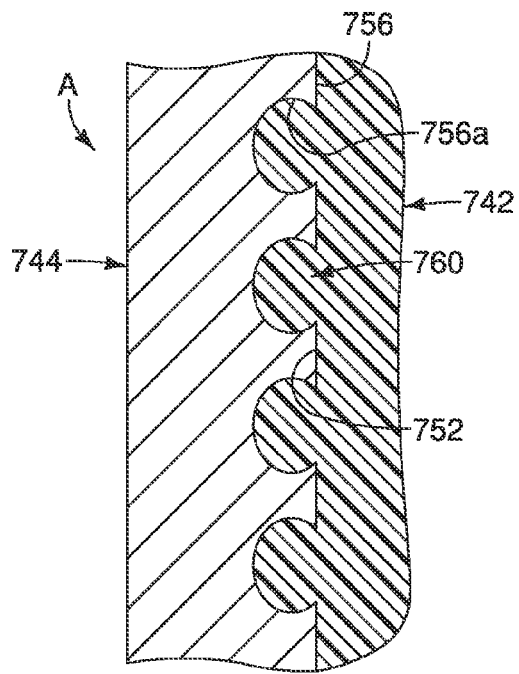
FIG. 30 is an enlarged, partial cross sectional view of portion A of the bicycle sprocket in illustrated in FIG. 29.
Figure 31:
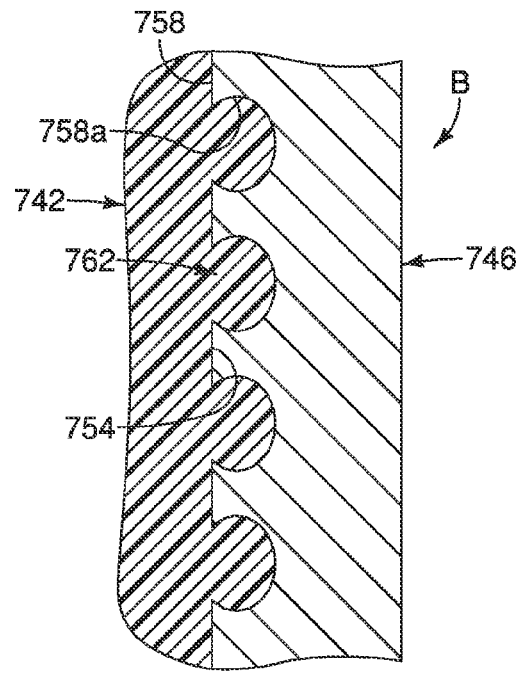
FIG. 31 is an enlarged, partial cross sectional view of portion B of the bicycle sprocket in illustrated in FIG. 29.

The second and third layered members 744 and 746 are fixedly attached to the first layered member 742 in a suitable fixing manner. Preferably, at least one of the second and third layered members 744 and 746 is attached to the first layered member 742 by an integral molding process. In other words, the third layered member 746 and/or the second layered member 744 is attached to the first layered member 742 by an integral molding process. More preferably, in the illustrated embodiment, the first layered member 742 is attached to the second and third layered members 744 and 746 by an integral molding process without using an adhesive so that a process for applying an adhesive can be omitted. In particular, as seen in FIG. 30, the second layered member 744 has an axial surface 756 with a plurality of dimples 756a to aid in the binding between the first and second layered members 742 and 744. Likewise, as seen in FIG. 31, the third layered member 746 has an axial surface 758 with a plurality of dimples 758a to aid in the binding between the first and third layered members 742 and 746. The dimples 756a create a textured portion 760 on the axial surface 756 of the second layered member 744, while the dimples 758a create a textured portion 762 on the axial surface 758 of the third layered member 746. Thus, at least one of the second and third layered members 744 and 746 includes a textured portion that contacts a corresponding one of the first and second axial surfaces 752 and 754 of the first layered member 742. More preferably, as in the eighth embodiment, each of the second and third layered members 744 and 746 includes a textured portion that contacts the first and second axial surfaces 752 and 754 of the first layered member 742, respectively. Thus, the integral molding process can be performed such that the resin of the first layered member 742 can extend into the dimples 756a and 758a of the second and third layered members 744 and 746 during formation of the first layered member 742. In the eighth embodiment, with this integral molding process, the first layered member 742, which is made of resin, is molded while simultaneously attaching the first layered member 742 to the second and third layered members 744 and 746, which include the dimples 756a and 758a for receiving the resin. Such dimples 756a and 758a can be formed by a mechanical process, e.g. such as a shot blasting, a chemical process such as etching and/or an optical process, e.g. such as a laser processing.

Ninth Embodiment

Figure 32:
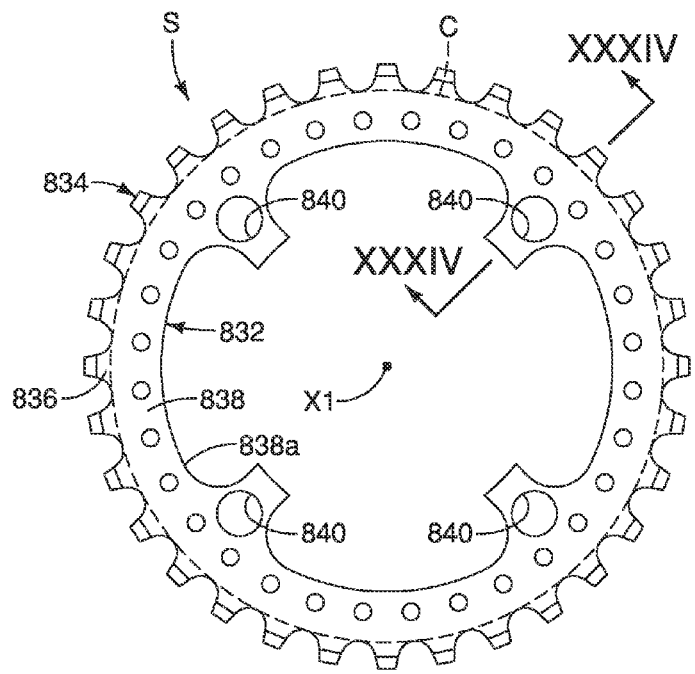
FIG. 32 is a side elevational view of a bicycle sprocket in accordance with a ninth embodiment.
Figure 33:
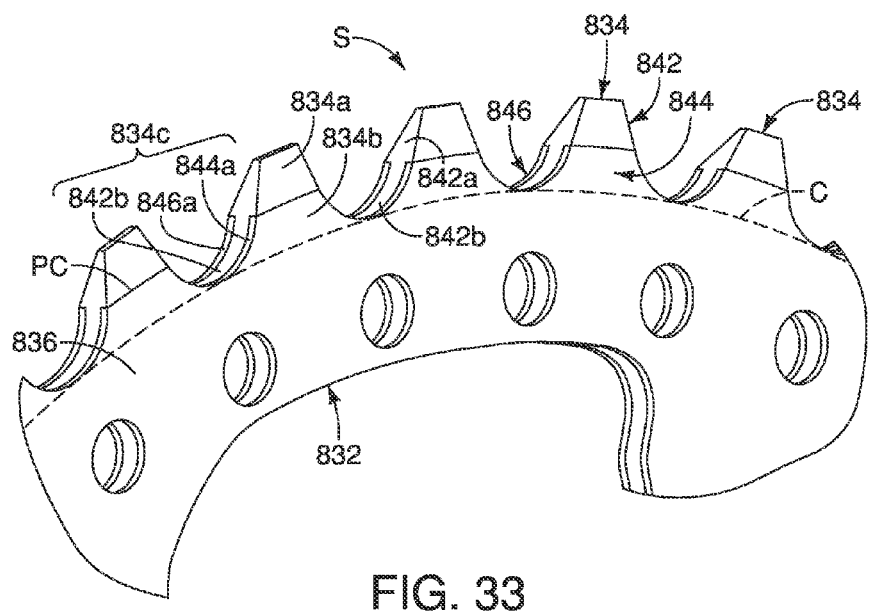
FIG. 33 is an enlarged, partial perspective view of the bicycle sprocket in illustrated in FIG. 32.

Referring now to FIGS. 32 and 33, a front sprocket S is illustrated in accordance with a ninth embodiment. As shown in FIG. 32, the sprocket S (e.g., a bicycle sprocket) basically includes a sprocket body 832, and a plurality of sprocket teeth 834. The sprocket body 832 has a rotational axis X1. The sprocket body 832 includes an outer periphery 836 and an inner periphery 838. Similar to the prior embodiments, the front sprocket S of FIGS. 32 and 33 has a multi-layered structure. The front sprocket S of FIGS. 32 and 33 can be part of a crank arm assembly.

The inner periphery 838 defines an opening 838a. In the ninth embodiment, the sprocket body 832 includes a plurality of fastener holes 840 for attaching the sprocket S to a crank arm. The sprocket teeth 834 extend radially outwardly from the outer periphery 836 of the sprocket body 832. In the ninth embodiment, the sprocket body 832 is defined as a part of the sprocket S that is radially inwardly disposed with respect to an imaginary circle C (i.e., the root circle) connecting innermost positions of gaps circumferentially disposed between the sprocket teeth 834.

In the ninth embodiment, as shown in FIG. 32, the total number of the sprocket teeth 834 is thirty-two. Of course, the total number of the sprocket teeth 834 can be larger or smaller than thirty-two as needed and/or desired. Moreover, any one of a rear sprocket of the rear sprocket assembly can also include the same configuration as the sprocket S illustrated in FIGS. 32 and 33.

Figure 34:
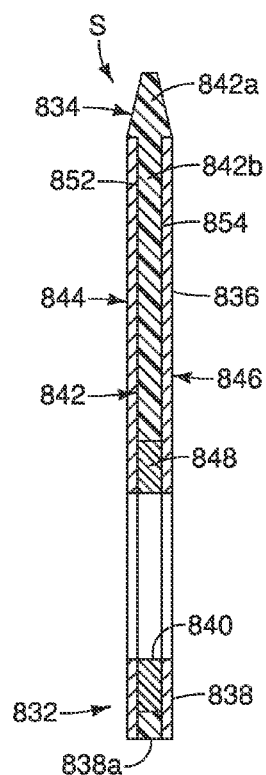
FIG. 34 is a partial cross sectional profile view of a portion of the bicycle sprocket illustrated in FIG. 32 as seen along section line XXXIV-XXXIV.

In the ninth embodiment, as shown in FIG. 33, the sprocket S includes a first layered member 842, a second layered member 844 and a third layered member 846. Preferably, a metallic reinforcement member 848 is provided around each of the fastener holes 840 as seen in FIG. 34. The metallic reinforcement members 848 are disposed between the second and third layered members 844 and 846. The first layered member 842 surrounds the metallic reinforcement members 848 for retaining the metallic reinforcement members 848 in place.

In the ninth embodiment, the first, second and third layered members 842, 844 and 846 extend radially outwardly from the inner periphery 838 of the sprocket body 832 to the sprocket teeth 834. Thus, in the ninth embodiment, all of the sprocket teeth 834 include the first layered member 842 and the second layered member 844. In the ninth embodiment, all of the sprocket teeth 834 further include the third layered member 846. Alternatively or optionally, at least one (e.g., not all) of the sprocket teeth 834 can include the first layered member 842 and the second layered member 844. Likewise, the at least one of the sprocket teeth 834 can also include the third layered member 846. On the other hand, in the ninth embodiment, the sprocket body 832 includes the first layered member 842 and the second layered member 844. Furthermore, the sprocket body 832 includes the third layered member 846. Specifically, in the illustrated embodiment, the first, second and third layered members 842, 844 and 846 radially extend between the inner periphery 838 of the sprocket body 832 and the outer periphery 836 of the sprocket body 832 other than various holes and recesses.

As shown in FIG. 34, the first layered member 842 has a first axial surface 852 and a second axial surface 854 opposite to the first axial surface 852 with respect to the rotational axis X1. The second layered member 844 is attached to the first axial surface 852 of the first layered member 842. The third layered member 846 is attached to the second axial surface 854 of the first layered member 842. In the ninth embodiment, the first, second and third layered members 842, 844 and 846 overlap each other in an axial direction as viewed parallel to the rotational axis X1, while the second and third layered members 844 and 846 do not overlap each other in a radial direction as viewed perpendicularly to the rotational axis X1. In the ninth embodiment, the first layered member 842 is partially exposed with respect to the second and third layered members 844 and 846 in the axial direction.

The first layered member 842 has a plurality of outer portions 842a and an inner portion 842b. The outer portions 842a project radially outward from the second and third layered members 844 and 846 at each of the sprocket teeth 834. The inner portion 842b is sandwiched between the second and third layered members 844 and 846. The outer portions 842a taper to a tip from the inner portion 842b. The inner portion 842b has an axial thickness of preferably more than or equal to 0.2 mm. The first layered member 842 has a specific gravity that is less than that of the second and third layered members 844 and 846. In the ninth embodiment, the inner portion 842b is generally a planar member. The first layered member 42 is made of non-metallic material. Specifically, the non-metallic material of the first layered member 842 can includes resin. For example, the first layered member 842 can be made of a hard plastic resin. Alternatively, the non-metallic material of the first layered member 842 can be a fiber-reinforced resin. For example, the first layered member 842 can be made of a carbon fiber-reinforced plastic or polymer (FRP).

Each of the second and third layered members 844 and 846 has an axial thickness of preferably more than or equal to 0.1 mm. The second and third layered members 844 and 846 are made of metallic material such as a stainless steel alloy, a titanium alloy or an aluminum alloy. Of course, the second and third layered members 844 and 846 can be made of other metallic material such as iron. Preferably, in the ninth embodiment, the second and third layered members 844 and 846 are made of the same material. However, of course, the second and third layered members 844 and 846 can be made of different materials as needed and/or desired.

The second and third layered members 844 and 846 are fixedly attached to the first layered member 842 in a suitable fixing manner. Specifically, in the illustrated embodiment, the first layered member 842 is attached to the second and third layered members 844 and 846 by an integral molding process without using an adhesive so that a process for applying an adhesive can be omitted. Preferably, the second and third layered members 844 and 846 are provided with textured portions (e.g., a plurality of dimples) to aid in the binding the second and third layered members 844 and 846 to the first layered member 842 in the same manner as seen in FIGS. 30 and 31 of the eighth embodiment. Alternatively, the second and third layered members 844 and 846 can be made without textured portions.

Here, in the ninth embodiment, each of the sprocket teeth 834 has a tip portion 834a and a base portion 834b. Preferably, the tip portion 834a and the base portion 834b meet at a pitch circle line PC of the sprocket S in the ninth embodiment. In other words, in the illustrated ninth embodiment, the tip portions 834a correspond to the addendums of the sprocket teeth 834 and the base portion 834b correspond to the dedendums of the sprocket teeth 834. The tip portions 834a are solely formed by the first layered member 842, while the base portion 834b are formed by the first, second and third layered members 842, 844 and 846. In the way, during chain engagement, less noise will occur when a chain first contacts the resin material of the tip portions 834a of the sprocket teeth 834 while keeping necessary rigidity of a tooth to resist pedaling force by the base portion 834b.

While all of the sprocket teeth 834 are illustrated with this tooth construction shown in FIGS. 33 and 34, only at least one (e.g., not all) of the sprocket teeth 834 can be provided with the tooth construction shown in FIGS. 33 and 34. Thus, in illustrated ninth embodiment, the at least one of the sprocket teeth 834 includes a tip portion having the first and second axial surfaces 852 and 854 exposed in the axial direction, and a base portion having the first and second axial surfaces 852 and 854 covered by the second and third layered members 844 and 846 in the axial direction. Also the second and third layered members 844 and 846 form an edge portion of a tooth flank 834c of the at least one of the sprocket teeth 834. In other words, the second and third layered members 844 and 846 have outer peripheral edges 844 and 846, respectively, which define the tooth flank 834c. In the way, the metal material of the second and third layered members 844 and 846 will contact a chain roller during use.

At the tip portions 834a of each of the sprocket teeth 834, the outer peripheral edges 844 and 846 are covered by an outer part 842a of the first layered member 842. Thus, the outer part 842a of the first layered member 842 is has a larger width than an inner portion 842b of the first layered member 842.

Preferably, at least one of the second and third layered members 844 and 846 includes a textured portion that contacts a corresponding one of the first and second axial surfaces 852 and 854 of the first layered member 842 in the same manner as seen in FIGS. 30 and 31 of the eighth embodiment. The second and third layered members 844 and 846 are fixedly attached to the first layered member 842 in a suitable fixing manner. Preferably, at least one of the second and third layered members 844 and 846 is attached to the first layered member 842 by an integral molding process. In other words, the third layered member 846 and/or the second layered member 844 is attached to the first layered member 842 by an integral molding process. More preferably, in the illustrated embodiment, the first layered member 842 is attached to the second and third layered members 844 and 846 by an integral molding process without using an adhesive so that a process for applying an adhesive can be omitted. Alternatively, the second and third layered members 844 and 846 can be made without textured portions.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "attached" or "attaching", as used herein, encompasses configurations in which an element directly secured to another element by affixing the element is directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. The term "layered member", as used herein, means structure comprising a plurality of substantial layers that are overlapped with each other, but such substantial layers do not encompass very thin coating such as plated membranes. Also, the terms "part," "section," "portion," "member" or "element" when used in the singular can have the dual meaning of a single part or a plurality of parts. Also, it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, this invention can be applied for not only a type of a bicycle sprocket such as described in the illustrated embodiments but can also be applied to any kind of bicycle sprocket. Moreover, the size, shape, location or orientation of the various components can be changed as needed and/or desired so long as they do not substantially their intended function. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. For example, in each of the disclosed embodiments, the axial surfaces of the metallic layered members can be provided with a textured portion (e.g., a plurality of dimples) to aid in the binding one or more of the non-metallic layered members to the metallic layered member. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle sprocket comprising:
a sprocket body having a rotational axis; and
a plurality of sprocket teeth extending radially outwardly from an outer periphery of the sprocket body,
at least one of the sprocket teeth including a first layered member, a second layered member and a third layered member,
the first layered member having a first axial surface and a second axial surface opposite to the first axial surface,
the second layered member being attached to the first axial surface of the first layered member such that the first and second layered members overlap each other in an axial direction as viewed parallel to the rotational axis,
the third layered member being attached to the second axial surface of the first layered member such that the first and third layered members overlap each other in the axial direction as viewed parallel to the rotational axis, at least one of the second and third layered members including a textured portion that contacts a corresponding one of the first and second axial surfaces of the first layered member, the first layered member extending into the textured portion by an integral molding process to attach the first layered member to the textured portion that includes at least one dimple,
the first layered member having a specific gravity that is less than those of the second layered member and the third layered member.

2. The bicycle sprocket according to claim 1, wherein each of the first, second and third layered members has an axial thickness more than or equal to 0.1 mm.

3. The bicycle sprocket according to claim 1, wherein the first and second layered members do not overlap each other in a radial direction as viewed perpendicularly to the rotational axis, and the first and third layered members do not overlap each other in the radial direction as viewed perpendicularly to the rotational axis.

4. The bicycle sprocket according to claim 1, wherein the sprocket body includes the first layered member, the second layered member and the third layered member.

5. The bicycle sprocket according to claim 1, wherein the first layered member is made of a material selected from the group consisting of aluminum, titanium, magnesium and beryllium.

6. The bicycle sprocket according to claim 5, wherein the second and third layered members are made of iron.

7. The bicycle sprocket according to claim 6, wherein the second and third layered members are made of stainless steel.

8. The bicycle sprocket according to claim 5, wherein the first layered member is made of quenched aluminum.

9. The bicycle sprocket according to claim 1, wherein the first layered member is made of non-metallic material.

10. The bicycle sprocket according to claim 9, wherein the non-metallic material of the first layered member includes resin.

11. The bicycle sprocket according to claim 10, wherein the non-metallic material of the first layered member is fiber-reinforced material.

12. The bicycle sprocket according to claim 10, wherein the first layered member and the second layered member are attached to each other by an integral molding process, and
the first layered member and the third layered member are attached to each other by an integral molding process.

13. The bicycle sprocket according to claim 9, wherein the second and third layered members are made of iron.

14. The bicycle sprocket according to claim 13, wherein the second and third layered members are made of stainless steel.

15. The bicycle sprocket according to claim 1, wherein the second and third layered members are made of iron.

16. The bicycle sprocket according to claim 15, wherein the second and third layered members are made of stainless steel.

17. The bicycle sprocket according to claim 16, wherein the second and third layered members have Vickers hardness larger than or equal to 400 (HV), respectively.

18. The bicycle sprocket according to claim 1, wherein the first layered member and the second layered member are attached to each other by diffusion bonding, and
the first layered member and the third layered member are attached to each other by diffusion bonding.

19. The bicycle sprocket according to claim 1, wherein the first layered member and the second layered member are attached to each other with an adhesive, and
the first layered member and the third layered member are attached to each other with an adhesive.

20. The bicycle sprocket according to claim 1, wherein the plurality of sprocket teeth includes the first layered member, the second layered member and the third layered member.

21. The bicycle sprocket according to claim 1, wherein the second layered member has a specific gravity that is equal to that of the third layered member.

22. The bicycle sprocket according to claim 1, wherein the at least one of the sprocket teeth further includes a coating layer formed on a radially end surface of the first layered member.

23. The bicycle sprocket according to claim 22, wherein the coating layer is an intermetallic compound layer.

24. The bicycle sprocket according to claim 23, wherein the intermetallic compound layer is made of aluminum, and one of nickel and iron.

25. The bicycle sprocket according to claim 22, wherein the coating layer is a plated layer.

26. The bicycle sprocket according to claim 25, wherein the coating layer is a nickel-plated layer.

27. The bicycle sprocket according to claim 1, wherein the first layered member extends radially inwardly from an inner periphery of the sprocket body, and
the first layered member has an axially projecting portion and an axially recessed portion, the axially projecting portion and the axially recessed portion being positioned radially inwardly from the inner periphery of the sprocket body.

28. The bicycle sprocket according to claim 27, wherein the first layered member has a bicycle hub engaging profile at a location of a radially inner end of the first layered member.

29. A multiple sprocket assembly comprising:
a plurality of the bicycle sprockets according to claim 27,
the axially projecting portion of one of the bicycle sprockets mating with the axially recessed portion of an adjacent one of the bicycle sprockets adjacent to the one of the bicycle sprockets while the bicycle sprockets are attached to each other.

30. The bicycle sprocket according to claim 1, wherein the sprocket body has an axially projecting portion and an axially recessed portion, the axially projecting portion and the axially recessed portion being positioned at the sprocket body.

31. A multiple sprocket assembly comprising:
a plurality of the bicycle sprockets according to claim 30,
the axially projecting portion of one of the bicycle sprockets mating with the axially recessed portion of an adjacent one of the bicycle sprockets adjacent to the one of the bicycle sprockets while the bicycle sprockets are attached to each other.

32. A multiple sprocket assembly comprising:
a plurality of the bicycle sprockets according to claim 1; and
a sprocket support member to which the bicycle sprockets are mounted.

33. The multiple sprocket assembly according to claim 32, wherein
the sprocket support member has a unitary one-piece structure.

34. The bicycle sprocket according to claim 1, wherein the second layered member includes the textured portion that is a first textured portion, the third layered member including a second textured portion, the first and second textured portions contacting the first and second axial surfaces of the first layered member, respectively.

35. The bicycle sprocket according to claim 1, wherein the at least one of the sprocket teeth includes a tip portion having the first and second axial surfaces exposed in the axial direction, and a base portion having the first and second axial surfaces covered by the second and third layered members in the axial direction.

36. The bicycle sprocket according to claim 35, wherein the second and third layered members form an edge portion of a tooth flank of the at least one of the sprocket teeth.

37. The bicycle sprocket according to claim 1, wherein the at least one of the second and third layered members is attached to the first layered member by an integral molding process.

38. The bicycle sprocket according to claim 1, wherein the first layered member is made of resin and the textured portion includes at least one dimple.

39. A bicycle sprocket comprising:
a sprocket body having a rotational axis, and
a plurality of sprocket teeth extending radially outwardly from an outer periphery of the sprocket body,
at least one of the sprocket teeth including a first layered member and a second layered member, the first layered member having a first axial surface and a second axial surface opposite to the first axial surface, the second layered member having a third axial surface and a fourth axial surface opposite to the third axial surface, the third axial surface of the second layered member being attached to the first axial surface of the first layered member such that the first and second layered members overlap each other in an axial direction as viewed parallel to the rotational axis and such that the first layered member is partially exposed with respect to the second layered member in the axial direction and the fourth axial surface of the second layered member is exposed,
the first layered member having a specific gravity that is less than that of the second layered member.

40. The bicycle sprocket according to claim 39, wherein each of the first and second layered members has an axial thickness more than or equal to 0.1 mm.

41. The bicycle sprocket according to claim 39, wherein the first and second layered members do not overlap each other in a radial direction as viewed perpendicularly to the rotational axis.

42. The bicycle sprocket according to claim 39, wherein the sprocket body includes the first layered member and the second layered member.

43. The bicycle sprocket according to claim 39, wherein the at least one of the sprocket teeth further includes a coating layer formed on a radially end surface of the first layered member.

44. The bicycle sprocket according to claim 43, wherein the coating layer is an intermetallic compound layer.

45. The bicycle sprocket according to claim 44, wherein the intermetallic compound layer is made of aluminum, and one of nickel and iron.

46. The bicycle sprocket according to claim 43, wherein the coating layer is a plated layer.

47. The bicycle sprocket according to claim 46, wherein the coating layer is a nickel-plated layer.

48. The bicycle sprocket according to claim 39, wherein the first layered member is made of a material selected from the group consisting of aluminum, titanium, magnesium and beryllium.

49. The bicycle sprocket according to claim 48, wherein the first layered member is made of quenched aluminum.

50. The bicycle sprocket according to claim 39, wherein the second layered member is made of iron.

51. The bicycle sprocket according to claim 50, wherein the second layered member is made of stainless steel.

52. The bicycle sprocket according to claim 51, wherein the first layered member is made of a material selected from the group consisting of aluminum, titanium, magnesium and beryllium.

53. The bicycle sprocket according to claim 51, wherein the second layered member has Vickers hardness larger than or equal to 400 (HV).

54. The bicycle sprocket according to claim 39, wherein the first layered member is made of non-metallic material.

55. The bicycle sprocket according to claim 54, wherein the non-metallic material of the first layered member includes resin.

56. The bicycle sprocket according to claim 55, wherein the non-metallic material of the first layered member is fiber-reinforced material.

57. The bicycle sprocket according to claim 55, wherein the first layered member and the second layered member are attached to each other by an integral molding process.

58. The bicycle sprocket according to claim 54, wherein the second layered member is made of iron.

59. The bicycle sprocket according to claim 58, wherein the second layered member is made of stainless steel.

60. The bicycle sprocket according to claim 39, wherein the first layered member and the second layered member are attached to each other by diffusion bonding.

61. The bicycle sprocket according to claim 39, wherein the first layered member and the second layered member are attached to each other with an adhesive.

62. The bicycle sprocket according to claim 39, wherein the plurality of sprocket teeth includes the first layered member and the second layered member.

63. The bicycle sprocket according to claim 39, wherein the first layered member extends radially inwardly from an inner periphery of the sprocket body, and
the first layered member has an axially projecting portion and an axially recessed portion, the axially projecting portion and the axially recessed portion being positioned radially inwardly from the inner periphery of the sprocket body.

64. The bicycle sprocket according to claim 63, wherein the first layered member has a bicycle hub engaging profile at a location of a radially inner end of the first layered member.

65. The bicycle sprocket according to claim 64, wherein the sprocket body includes the first layered member and the second layered member.

66. The bicycle sprocket according to claim 63, wherein the sprocket body includes the first layered member and the second layered member.

67. A multiple sprocket assembly comprising:
a plurality of the bicycle sprockets according to claim 63,
the axially projecting portion of one of the bicycle sprockets mating with the axially recessed portion of an adjacent one of the bicycle sprockets adjacent to the one of the bicycle sprockets while the bicycle sprockets are attached to each other.

68. The bicycle sprocket according to claim 39, wherein the sprocket body has an axially projecting portion and an axially recessed portion, the axially projecting portion and the axially recessed portion being positioned at the sprocket body.

69. A multiple sprocket assembly comprising:
a plurality of the bicycle sprockets according to claim 68,
the axially projecting portion of one of the bicycle sprockets mating with the axially recessed portion of an adjacent one of the bicycle sprockets adjacent to the one of the bicycle sprockets while the bicycle sprockets are attached to each other.

70. A multiple sprocket assembly comprising:
a plurality of the bicycle sprockets according to claim 39; and
a sprocket support member to which the bicycle sprockets are mounted.

71. The multiple sprocket assembly according to claim 70, wherein the sprocket support member has a unitary one-piece structure.

72. The bicycle sprocket according to claim 39, wherein the third axial surface of the second layered member includes a textured portion that contacts the first axial surface of the first layered member.

73. The bicycle sprocket according to claim 72, wherein the second layered member is attached to the first layered member by an integral molding process.

* * * * *